US012239605B2

(12) United States Patent
Vollen et al.

(10) Patent No.: US 12,239,605 B2
(45) Date of Patent: Mar. 4, 2025

(54) AMPOULE CLOSURE

(71) Applicant: RABMED A/S, Heidal (NO)

(72) Inventors: Martin Vollen, Heidal (NO); Kevin Geers, Oslo (NO); Marius Andresen, Oslo (NO); Joachim Wallem Rasmussen, Oslo (NO); Jan Anders Ekroll, Oslo (NO)

(73) Assignee: RABMED A/S, Heidal (NO)

( * ) Notice: Subject to any disclaimer, the term of this patent is extended or adjusted under 35 U.S.C. 154(b) by 1296 days.

(21) Appl. No.: 16/493,907

(22) PCT Filed: Mar. 16, 2018

(86) PCT No.: PCT/EP2018/056775
§ 371 (c)(1),
(2) Date: Sep. 13, 2019

(87) PCT Pub. No.: WO2018/167321
PCT Pub. Date: Sep. 20, 2018

(65) Prior Publication Data

US 2020/0268604 A1 Aug. 27, 2020

(30) Foreign Application Priority Data

Mar. 17, 2017 (GB) ..................................... 1704309

(51) Int. Cl.
*A61J 1/14* (2023.01)
*A61J 1/06* (2006.01)
*A61J 1/20* (2006.01)

(52) U.S. Cl.
CPC ............. *A61J 1/1412* (2013.01); *A61J 1/065* (2013.01); *A61J 1/1456* (2015.05); *A61J 1/2037* (2015.05); *A61J 1/2055* (2015.05)

(58) Field of Classification Search
CPC .. A61J 1/1412; A61J 1/065; A61J 1/06; A61J 1/2037; A61J 1/2075; A61J 1/1425;
(Continued)

(56) References Cited

U.S. PATENT DOCUMENTS 3,720,341 A 3/1973 Greenfield et al.
3,750,645 A * 8/1973 Bennett .................. A61J 1/065
604/403

(Continued)

FOREIGN PATENT DOCUMENTS

CN 101223086 A 7/2008
CN 101588781 A 11/2009

(Continued)

OTHER PUBLICATIONS

Notification of Transmittal of the International Search Report and Written Opinion (Form PCT/ISA/220), International Search Report (Form PCT/ISA/210), and Written Opinion of the International Searching Authority (Form PCT/ISA/237) for International Application No. PCT/EP2018/056775, mailed Sep. 19, 2018, 19 pages.

(Continued)

*Primary Examiner* — Ariana Zimbouski
(74) *Attorney, Agent, or Firm* — Withrow + Terranova, PLLC; Vincent K. Gustafson

(57) ABSTRACT

A closure for an ampoule, the closure comprising: a cap portion arranged to engage with a broken neck of an opened ampoule; and a cylindrical skirt portion extending from the cap portion, the skirt portion being elastically deformable and being arranged to move from a first position in which it is at least partially folded back on itself to a second position in which it is unfolded and extends away from the cap portion. The closure can close off an opening such as that formed in an ampoule when the neck is snapped and the top removed. As the cap portion engages with the broken neck, (Continued)

it reduces the chances of users receiving lacerations from the sharp edges. The cap portion also seals the ampoule, preventing the contents from being spilled and/or wasted. The closure also provides a degree of impact protection, reinforcement and strengthening to the now weakened open end of the ampoule, e.g. in case the ampoule is dropped. The skirt portion not only provides a seal around the ampoule body by being in close contact therewith, but also holds the cap portion firmly against the broken rim of the open ampoule, thus holding the closure in place by means of the friction between the skirt portion and the outer surface of the ampoule body.

3 Claims, 43 Drawing Sheets

(58) Field of Classification Search
CPC ...... A61J 1/2055; A61J 1/2086; A61J 1/2096; A61J 1/2089; A61J 1/2082; B65D 1/09
See application file for complete search history.

(56) References Cited

U.S. PATENT DOCUMENTS

| | | | | |
|---|---|---|---|---|
| 4,826,025 | A * | 5/1989 | Abiko | A61J 1/065 215/49 |
| 5,423,440 | A * | 6/1995 | Castaneda | A61J 1/065 215/49 |
| 5,554,134 | A | 9/1996 | Bonnichsen | |
| 5,595,326 | A | 1/1997 | Bougamont et al. | |
| 6,832,703 | B1 * | 12/2004 | Scott | B67B 7/92 222/541.6 |
| 7,497,390 | B2 * | 3/2009 | Beller | A61M 15/08 222/83.5 |
| 2002/0139373 | A1 * | 10/2002 | Griffiths | A61F 6/00 128/844 |
| 2007/0282279 | A1 | 12/2007 | Wiley et al. | |
| 2009/0001042 | A1 | 1/2009 | Sever et al. | |
| 2009/0178998 | A1 | 7/2009 | Knight | |
| 2010/0301089 | A1 | 12/2010 | Muller | |
| 2014/0251942 | A1 | 9/2014 | Waeben et al. | |
| 2015/0329339 | A1 | 11/2015 | Oberli et al. | |
| 2016/0194114 | A1 * | 7/2016 | Luna | A61J 1/16 220/732 |
| 2017/0158381 | A1 * | 6/2017 | Holland | B65D 35/46 |
| 2018/0147115 | A1 | 5/2018 | Nishioka et al. | |

FOREIGN PATENT DOCUMENTS

| | | | |
|---|---|---|---|
| CN | 101626958 | A | 1/2010 |
| CN | 102311079 | A | 1/2012 |
| CN | 203112472 | U | 8/2013 |
| CN | 104364165 | A | 2/2015 |
| CN | 105008234 | A | 10/2015 |
| DE | 3212685 | A1 | 10/1983 |
| EP | 0898951 | A2 | 3/1999 |
| EP | 2842884 | A1 | 3/2015 |
| FR | 2209291 | A5 | 6/1974 |
| FR | 2516480 | A1 | 5/1983 |
| FR | 2689101 | A1 | 10/1993 |
| JP | 2010029598 | A | 2/2010 |
| JP | 2015512361 | A | 4/2015 |
| JP | 2015142736 | A | 8/2015 |
| WO | 2013053384 | A1 | 4/2013 |
| WO | 2015051428 | A1 | 4/2015 |
| WO | 2015193772 | A1 | 12/2015 |
| WO | 2016174925 | A1 | 8/2017 |

OTHER PUBLICATIONS

Combined Search and Examination Report under Sections 17 and 18(3) for United Kingdom Patent Application No. GB1704309.2 mailed Jul. 11, 2017, 6 pages.
Search Report under Section 17(6) for United Kingdom Patent Application No. GB1704309.2 mailed Sep. 15, 2017, 2 pages.
Examination Report for Indian Patent Application No. 201947041594, mailed Jan. 17, 2022, 6 pages.
First Office Action for Chinese Patent Application No. 201880018766.9, mailed Apr. 6, 2022, 8 pages.
Intention to Grant for European Patent Application No. 18714988.5, mailed Apr. 12, 2022, 127 pages.
Decision to Grant for Japanese Patent Application No. 2019571791, mailed Jun. 7, 2022, 5 pages.
Examination Report No. 1 for Australian Patent Application No. 2018235030, mailed Jan. 17, 2023, 5 pages.
Second Office Action for Chinese Patent Application No. 201880018766.9, mailed Dec. 5, 2022, 8 pages.
Request for Submission of an Opinion for Korean Patent Application No. 1020197030543, mailed Dec. 21, 2022, 6 pages.
Notice of Reasons for Refusal for Japanese Patent Application No. 2019-571791 mailed Dec. 21, 2021, 4 pages including English translation.
Search Report and Technical Opinion for Brazilian Patent Application No. BR112019019259-0, mailed Jul. 21, 2022, 8 pages including English machine translation.

* cited by examiner

Top
Front
Bottom
13
12
11

10
2

3
4

1

100
10
2

100
12
11
2

111
110
100
11
2

111
110
11
100
10
2

AMPOULE CLOSURE

This application is a 35 U.S.C. § 371 national phase filing of International Application No. PCT/EP2018/056775 filed on Mar. 16, 2018, and further claims priority to United Kingdom Patent Application No. 1704309.2 filed on Mar. 17, 2017, wherein the disclosures of the foregoing applications are hereby incorporated by reference herein in their respective entireties.

The invention relates to a closure device for an ampoule to facilitate and improve the use thereof. In particular, the invention relates to a sealing device for ampoules with a break off top and in some embodiments a content transfer device for extracting content from an ampoule.

An ampoule is a small sealed vial which is typically used to contain and preserve a sample. The sample is usually either a solid (e.g. a powder or granules) or liquid. Ampoules are commonly made of glass, although plastic ampoules do also exist.

Modern ampoules are most commonly used to contain pharmaceuticals and chemicals that must be protected from air and contaminants and UV light for example. Glass ampoules are often used so as to avoid reaction of the sample with the container material during storage. They are usually hermetically sealed by melting the thin top with an open flame, and are typically opened by snapping off the neck (which may be deliberately formed as a point of weakness). If properly done, this last operation creates a clean break without any extra glass shards or slivers; however this is not guaranteed and small glass shards can fall into the ampoule leaving sharp edges and “shark teeth” that can present a cutting hazard to the user. Therefore the contents (e.g. liquid or solution) may be filtered for greater assurance. The space above the chemical may be filled with an inert gas before sealing. The walls of glass ampoules are usually sufficiently strong to be brought into a glovebox without any difficulty.

Glass ampoules are more expensive than vials or bottles and other simple containers, but there are many situations where their superior imperviousness to gases and liquids and all-glass interior surface are worth the extra cost. Examples of chemicals sold in ampoules are injectable pharmaceuticals (e.g. morphine and adrenaline), air-sensitive reagents like tetrakis(triphenylphosphine)palladium(0), hygroscopic materials like deuterated solvents and trifluoromethanesulfonic acid, and analytical standards.

There are several problems with these ampoules as follows:

One of the major challenges for today’s healthcare globally is the spreading of infections through patient care. 35-37% of Hepatitis A and B infection occurs as a result of cuts/needle stick during patient treatment situations. (Source WHO). Research has revealed that there are many unrecorded incidences of needle stick injuries. Today’s procedures and existing products do not provide effective solutions to this problem in a safe and user-friendly manner, and they generate large amounts of costly waste which is hazardous to the environment and an over-use of expensive pharmaceuticals.

Problems arise when a glass ampoule is broken and a sharp glass edge is exposed at the break point (usually the neck). This can be sharp and serrated and can easily cause lacerations with the associated risk of blood contamination. There is also a risk of injuries and blood contamination when using a needle to draw content out from within the ampoule due to the risk of needle stick when attempting to insert the needle into the small opening in the glass ampoule which is held with two or more fingers.

Once opened, the contents of the ampoule must be used immediately before the contents can become contaminated or spilled. However, as the quantity of substance will vary from use to use (e.g. with the size of patient or type/severity of treatment), ampoules often contain more substance than the required dose. Thus after the required dose has been withdrawn from the ampoule there is still a quantity of substance remaining within the ampoule. As the ampoule is not sealed there is a risk of spillage and wastage of vital drugs from an opened ampoule, as well as unnecessary exposure of the content (e.g. to air and/or UV light).

As mentioned above, there is a risk during breaking open the ampoule that small shards of glass may fall into the ampoule and its contents. If these are not adequately filtered out then there is a risk of these glass particles being accidentally drawn into a syringe and injected into a patient. A common filtering technique at present is to use a needle (or possibly a straw) to draw out the contents from the ampoule into a syringe, relying on the narrow diameter of the needle to prevent glass shards from being drawn up. However very small particles may still be able to pass through. In some countries and for some procedures it is recommended to use a filter for extraction, but in emergencies the use of a filter can often be bypassed for speed, just using the needle to provide the filtering function.

The current solutions are also not optimal for the handling of hazardous waste. For example there is risk of the contents spilling as described above. In particular the patient treatment will likely be carried out before any remaining ampoule and contents are disposed of. During this time there is a risk of the ampoule being knocked and broken or the content spilled. Additionally, in cases where injection is not via a catheter port (i.e. without a needle), the needle that is used to draw contents from the ampoule cannot be re-used for injection into the patient. Thus two needles are required for every use which is wasteful as well as increasing the risk of needle stick injuries through changing of the needle.

A lot of effort has been put into solutions that ensure a safe breaking of the neck of a glass ampoule, because this is a particularly risky operation. Therefore, there are a significant number of products that attempt to solve one or more of these problems. However each has its limitations and/or disadvantages.

For example, US 2007/0282279 describes an ampoule opener with a receiving body sized to receive the ampoule cap and a shield to protect the user’s hand when breaking the cap from the main ampoule body. US 2010/0301089 describes another ampoule breaking aid with a body portion that receives and holds the main body of the ampoule and a cap portion that receives the ampoule’s cap and that can be rotated relative to the body portion to snap the ampoule cap off the ampoule body. Neither of these devices provide a reliable seal of the ampoule after the cap has been broken off.

FR 2209291 describes another device for breaking the ampoule cap from the ampoule body. Once separated, the cap is retained within the device as the contents flow past and through an outflow orifice. Thus the device is not sterile. US 2015/0329339 describes another ampoule cap breaking device where the cap is retained by a head holder which pivots it to one side once separated. However, again the broken cap part is held in the outflow path leading to potential contamination.

U.S. Pat. No. 6,832,703 describes a cover for an ampoule that covers both the main body and the cap and is designed to retain the cap after the cap has been broken away from the body. An outflow channel is also provided to allow the contents to be poured out of the ampoule, optionally through a filter. However, this arrangement will not be sterile if the sleeve is fitted to the ampoule after the ampoule leaves a sterile manufacturing environment as the contents may contact the outside of the ampoule and the inside of the sleeve during pouring. The design is also not convenient for syringe access. U.S. Pat. No. 5,423,440 describes another ampoule sheath that is designed to be fitted prior to shipping and can be used to break the cap from the main body with lower risk of injury. However the sheath must be removed to access the contents of the ampoule, thus removing the sealing properties and allowing for potential spillage, contamination and further injury.

U.S. Pat. No. 5,595,326 describes a metering pump with a dip tube to be inserted into an ampoule after the cap has been broken off and an elastically deformable skirt arranged to seal around an outside wall of the ampoule. However the skirt does not fully seal the outer surface of the ampoule from the contents and thus still has a contamination risk.

It will be appreciated that the users of ampoules include several different groups. Ampoules are particularly important for paramedics, but are also used by other medical or medical-related professionals, such as those who work for vaccination programs, researchers, ER/HEMS/EMT personnel, anesthesiologists, pharmacists, veterinarians (for pets, farms and aquaculture). Ampoules are sold in billions annually for storage of medication in small volumes. Typical drugs that may be found in glass ampoules (purely by way of example) are morphine and adrenaline. Ampoules may be various shapes and sizes. Some typical ampoules for drugs range from about 1 ml to about 30 ml. Larger ampoules are also used for storage of other materials, e.g. Mercury. Such ampoules may have a volume of a litre or more. Also, while the majority of ampoules are circular in cross-section (broadly a circular cylinder), other shapes such as oval or rectangular cross-sections are also possible.

According to a first aspect, the invention provides a closure for an ampoule, the closure comprising: a cap portion arranged to engage with a broken neck of an opened ampoule; and a cylindrical skirt portion extending from the cap portion, the skirt portion being elastically deformable and being arranged to move from a first position in which it is at least partially folded back on itself to a second position in which it is unfolded and extends away from the cap portion.

The term closure is used here to mean something that closes off an opening (i.e. the opening that is formed in an ampoule when the neck is snapped and the top removed). It may include a cap or a sealing device or a protection device (for protecting against the sharp edge formed upon removal, and/or for protecting the contents from exposure or spillage). It may also provide a sealing function.

As the cap portion engages with the broken neck, it reduces the chances of users receiving lacerations from the sharp edges. The cap portion also seals the ampoule, preventing the contents from being spilled and/or wasted. The closure also provides a degree of impact protection, reinforcement and strengthening to the now weakened open end of the ampoule, e.g. in case the ampoule is dropped.

The skirt portion not only provides a seal around the ampoule body by being in close contact therewith, but also holds the cap portion firmly against the broken rim of the open ampoule, thus holding the closure in place by means of the friction between the skirt portion and the outer surface of the ampoule body.

While the skirt portion may be simply folded so as to form a single bend when in the first position, the skirt portion may be folded more times or may be rolled back on itself.

The cap portion is preferably wider than the broken neck's diameter so as to ensure that the broken rim is easily and fully sealed.

In the absence of an ampoule, the skirt portion is preferably arranged to extend downwards from the outer edge of the cap portion when it is in the second position and forms a cylinder with an internal diameter that is less than the diameter of the ampoule(s) that it is designed for. When the skirt is then rolled or folded into the first position, the lower surface of the cap portion preferably extends continuously into the inner surface of the skirt portion ('inner' here referring to the surface that will be the inner surface when the skirt is in the second position). This allows the contact surface for the rim to be wide and allows easy placement of the closure against the opened ampoule. The smooth surface then facilitates easy unrolling or unfolding of the skirt portion which can smoothly wrap into contact with the external surface of the ampoule. As the skirt portion is rolled or folded down into the second position, it constricts around the ampoule and holds the ampoule firmly through friction.

In some preferred embodiments the cap portion may comprise a circumferential groove in which the skirt portion sits when in the first position. The groove provides a seat in which the skirt material can rest before it is deployed into the second position. This reduces the stretch that is applied to the skirt while the closure is at rest in this position (the closure will typically be stored and supplied in this configuration prior to use, with the skirt only being deployed to the second position when the closure is used).

The skirt may have an enlarged rim which is seated in the groove when in the first position. The enlarged rim, which is formed at the distal end of the skirt, i.e. distal from the cap portion, provides extra reinforcement at the end portion for gripping the ampoule, but also helps to hold the skirt in the groove as it nestles into the groove. In embodiments where the skirt is rolled rather than folded it will be appreciated that this enlarged rim (or bead) may not be in direct contact with the groove, but may still press into the groove indirectly through one or more intervening layers of the rolled skirt. In such embodiments the enlarged rim also provides a convenient surface around which to roll the skirt during initial manufacture.

In preferred embodiments the surface of the cap portion inside the skirt portion is shaped such that when the cap portion is pressed against a broken neck of an opened ampoule, the force is transmitted through the cap portion to encourage the skirt portion out of the groove. A number of mechanisms may operate here. As the closure is pressed against the broken rim of the ampoule in order to form a seal, that force may be transmitted through the cap portion and deforms the groove so as to push the skirt portion out of the groove and may also reduce the retaining effect of the groove on the skirt portion. At the same time, the force of pressing the closure against the broken neck of the ampoule creates tension along the surface of the skirt portion, pulling the skirt portion out of the groove. The combination of these mechanisms may also cause the lower part of the groove to deform, making it easier for the rolled or folded skirt portion to exit the groove. In other words the deformation that occurs in the cap due to contact with the rim can result in deformation in the groove, enabling the skirt to move away from the groove. This facilitates and encourages deployment of the skirt portion into the second position, thus making for quick and easy sealing of the closure onto an ampoule. In some embodiments, squeezing the side of the cap portion hard enough may provide enough deformation in the cap portion, and therefore in the groove, that the skirt portion is no longer retained in the groove and thus is released and deploys into its second position. Depending on the particular design of the closure, it may be that only one of these mechanisms is effective in the deployment of the skirt or more than one mechanism may operate simultaneously, possibly with one of these mechanisms being dominant and with others providing contributing effects. The deformation may be sufficient that no further action is required to effect deployment of the skirt portion. In other words the change of shape may be enough to make the skirt portion unstable in the first position such that it automatically deploys itself into the second position, i.e. automatically unrolling or unfolding into the deployed state in which it grips the ampoule. Even if the deformation is not quite enough to effect this deployment automatically, the force required from the user to move the skirt into the second position is reduced by the deformation such that deployment of the skirt is easy and fast. Of course the skirt portion can be arranged such that it is designed to be activated by direct contact, e.g. by pushing with fingers to effect deployment. Once deployed, the inner surface of the skirt portion engages with the outer surface of the ampoule to grip it. As long as the inner diameter of the skirt in its relaxed state is smaller than the outer diameter of the ampoule that it is attached to, the skirt portion will remain in a slightly stretched configuration in use, i.e. it never returns fully to its relaxed state (its manufactured state, prior to rolling or folding into the first position) and thus provides a gripping force on the ampoule to hold the closure in place.

The surface of the cap portion inside the skirt portion preferably comprises a cone shape. The cone shape may point (or extend) away from the main body of the cap portion, i.e. extending towards and into the ampoule that is to be closed by the closure. The cone shape ensures that a good seal is formed against the rim of the ampoule (i.e. against the broken surface of the ampoule after the top has been removed). As the rim surface is typically rough and/or jagged, sealing against it can be difficult. However the conical surface ensures that the cap portion extends into the opening formed by the rim and ensures that the cap portion can make contact around the whole surface of the rim. It will be appreciated that the cone shape may be a truncated cone or may have a rounded end and it may have a hole through it for content extraction as described later. More generally it may be any projection with a tip that is narrower than the ampoule opening so that the projection extends into the ampoule and a base that is wider than the ampoule opening so that as the projection is inserted substantially axially into the opening, the sloping side of the projection first contacts the inner diameter of the broken neck which is a sterile surface. The projection may be a dome. The projection may taper from its base (adjacent to the cap portion) towards its tip (distal from the cap portion, being the part that is inserted into the neck of the ampoule). As the projection is further pressed onto the ampoule, the line of contact between the projection and the broken neck will move radially outwardly, i.e. from the sterile inner surface towards the non-sterile outer surface. This ensures that the seal between the cap portion and the ampoule maintains the sterility of the ampoule, thus allowing the contents of the ampoule to remain usable over a longer period of time.

As the cone shape extends into the opening of the ampoule and the skirt extends down the outside of the ampoule, the cone shape (or projection) preferably forms a concave region around it, i.e. between the cone and the skirt. This concave region receives the rim of the ampoule and forms the seal around the rim and round the external edge of the ampoule (i.e. shoulders and/or sides). In some preferred embodiments a trench in the cap portion may be formed around the cone to receive the rim portion more deeply into the cap portion, thus providing more contact area with the rim. The conic shape is preferably sterile as it is designed to be inserted into the ampoule where it may come into contact with the contents of the ampoule and it is therefore preferable that it does not risk contamination of the contents.

Preferably the underside of the cap portion inside the skirt portion is formed from a deformable material. The deformable material allows the broken (and typically jagged/serrated rim to press, or even cut into it to form a seal. The more that the deformable material can mould to the shape of the broken rim, the better the seal will be. Allowing the sharpest portions of the rim to cut into the cap portion is preferred as it ensures good material contact between the rim and the cap portion, thus improving the seal. The deformable material preferably has a thickness of at least 0.5 mm, preferably at least 1 mm, more preferably at least 2 mm, at least 3 mm, at least 4 mm, at least 5 mm, at least 6 mm, at least 7 mm or at least 8 mm. Thicker material can accommodate greater variations in the surface of the rim, i.e. larger serrations. The amount of variation in the surface (i.e. the size of serrations) may vary significantly in use, depending on just how the ampoule top breaks off the main body. The deformable material is thus preferably arranged to accommodate the largest serrations that are expected to be found on a given ampoule rim for which the closure is designed so that the serrations do not hinder sealing of the closure against the rim at any point around the circumference of the rim.

While the closure could simply be used to stop up an ampoule after its contents have already been accessed, that leaves the broken edge of the ampoule exposed while the ampoule is being used. Therefore it is preferred to bring the closure into use, i.e. into sealing contact with the ampoule immediately after opening and before the ampoule's contents have been accessed. Thus preferably the closure comprises a channel extending through the cap from a lower surface of the cap inside the skirt portion to an upper surface of the cap. The channel allows the contents of the ampoule to be withdrawn through the closure after it has been sealed to the ampoule, covering the sharp broken edge and thereby reducing injury potential. As mentioned above, ampoules may contain solid, granulated or liquid contents. The channel is preferably sized so as to prevent accidental extraction or unwanted flow of contents through the channel. For example in the case of fluids, the fluid channel is preferably small enough that the fluid meniscus formed by surface tension prevents fluid from flowing through the channel in the absence of an external biasing force (such as a pressure difference). Thus the channel effectively seals the ampoule as the contents cannot escape unbidden.

In other embodiments the channel may be provided with a one-way valve that permits content extraction from the inside of the ampoule, but blocks transfer of any material back into the ampoule. As an example such a one-way valve may be formed by one or more flaps (e.g. flexible flaps) extending diagonally across the channel (i.e. not perpendicular to the channel axis) so as to close off the channel such that flow in one direction will lift the flap away from closing off the channel while flow in the opposite direction will press the flap into firmer contact, strengthening the contact and maintaining the channel closed. A single flap extending across the channel may be sufficient. In other embodiments, A pair of flaps may be provided that meet substantially on the channel axis and separate away from the channel axis to permit flow or press against each other to prevent flow in the opposite direction. For redundancy and improved valve performance, several such flaps (or pairs of flaps) may be provided at different axial locations along the channel, all operating to permit and prevent flow in the same direction. While such flaps may be integrally formed with the rest of the cap portion, such integral formation may be difficult (e.g. in a moulding process) and therefore the one-way valve may be formed as a separate element that is later inserted into a suitable corresponding cavity in the cap portion along the path of the content extraction channel.

The channel may connect to a connector element mounted on or formed in the upper surface of the cap portion. While the channel could be used to draw the contents from the ampoule using a needle as is currently often the case, the provision of an appropriate connector on the upper surface of the closure allows a syringe to be connected directly to the closure in communication with the interior of the ampoule through the channel so that the contents can be drawn directly into the syringe. This has several advantages. For example it reduces the number of needles that are used in the process of treating a patient (no needle is used for ampoule content extraction) and consequently the risk of needle stick injuries is further reduced. There is much lower risk from sharps (neither from the broken ampoule body nor a content extraction needle) during the process of filling the syringe. Any suitable type of connector element may be used according to the particular intended use. However in some preferred embodiments the connector element is a syringe connector, for example a luer tip connector or a luer lock connector or the like. The channel is preferably centrally formed in the cap portion, i.e. on or close to the axis of symmetry. It may in some embodiments extend from the tip of the conic shape discussed above to the upper surface of the cap portion. The connector element may be a separate piece that is fitted to the cap portion or it may be integrally formed in the cap portion, e.g. as part of the moulding of the cap portion. The connector element and cap portion may be formed in a two step moulding process where the connector element is moulded first and the cap portion (and skirt portion) are moulded around the connector.

When the content extraction channel extends through the closure to the centre of the projection (e.g. substantially conic projection) that is inserted into the neck of the ampoule, there will typically be a region surrounding the projection, between the radially outer surface of the projection and the inner surface of the ampoule, that may not be easily extractable through the channel. For example, when the ampoule is turned upside down, the contents could collect in this region around the projection at a level that is lower than the entrance to the channel. This reduces the amount of content that can be extracted and is therefore inefficient. While the amount in question may be quite small, an improvement in efficiency can be achieved by providing additional branches that connect the main channel to the sides of the projection and can thus allow content to be drawn out from around the projection for improved efficiency. These additional branches may in some embodiments take the form of one or more through holes that connect the main axial channel to the radially outer surface of the projection. In other embodiments the branches may take the form of one or more gullies connecting the channel to the radial outer surface of the projection along a length from the tip of the projection. The length may be selected so as to remain within the ampoule even for the smallest insertion length (which will typically occur on the smallest ampoule with the smallest diameter neck opening). In the case of through holes, to accommodate several different possible insertion lengths of the projection, through holes may be provided at different axial positions so as to ensure that when used on larger ampoules there is still a through hole close to the neck for optimal content extraction. Preferably the through holes are angled from the projection towards the upper surface of the closure, i.e. angled in the same general direction as that in which content is to be extracted. The through holes or gullies may be moulded as part of the closure moulding or they may be formed in a post-moulding step.

As discussed above, when an ampoule is opened by breaking the top form the main body, there is a risk that small shards of the ampoule material (usually glass) can break off and fall inside the ampoule. It is desirable to prevent these from being removed along with the contents of the ampoule and therefore preferably a filter is provided in the channel. The filter preferably has pores or channels or openings large enough to allow the ampoule contents to pass while preventing small shards of glass through. The filter may be positioned anywhere in the flow path, e.g. at either end of the channel or somewhere in the middle. The filter may be an integral part of the closure or it may be a removable element (and thus may also be an optional element that can be fitted if required, or not fitted otherwise). Purely by way of example the filter may take the form of a sponge, a mesh (e.g. a mat or weave of fibres) or a bunch of very narrow parallel tubes. In embodiments in which a luer tip is used, the filter may be a part of the luer tip. In some embodiments the one-way valve described above could also form part of the luer tip.

The cap portion and skirt portion may be formed separately and joined or attached to each other. However, they are preferably integrally formed. The cap portion and the skirt portion are preferably formed (e.g. moulded) from a single material, and may for example be formed from an elastomer. In some preferred embodiments they are formed from silicone as this has good properties in terms of elasticity, deformation (provides good sealing when cut by a sharp rim) and is readily moldable. Preferably the material also has deformation characteristics that remain stable over a significant period of time. Typical ampoules may have a shelf life of a year or more and therefore it is preferred that the closure will have a similar shelf life so that it can be supplied with an ampoule with the expectation of working throughout the same time period. Thus it is preferred that the elasticity and/or deformability characteristics of the material will remain functional (e.g. the skirt portion can remain folded or rolled up and will still unroll or unfold appropriately) over a long time, e.g. for at least a year.

Preferably the skirt portion is transparent so that when the skirt portion is in the second position, it does not obscure any important labelling or information that may be provided on the ampoule. This is important in the case of pharmaceuticals, e.g. to prevent the accidental administration of the wrong drug to a patient.

The skirt portion may have any suitable thickness such that the rolling or folding and unrolling or unfolding can be achieved. In some preferred embodiments the skirt portion may have a thickness of at least 0.1 mm or at least 0.2 mm or at least 0.5 mm. The skirt portion may in some embodiments have a thickness no more than 5 mm, preferably no more than 4 mm, more preferably no more than 2 mm. The thickness of material (as well as the elastic properties and surface friction properties) affects the sealing properties and also the way that the skirt portion moves between its stored configuration and its deployed configuration. A thicker material encourages more of a “snap”-type deployment in which the skirt portion deploys rapidly once dislodged from its stored state. Alternatively, a more rigid material may be used or a material with a strong tendency to regain its natural shape and position may be used instead of a thicker material, The cap and/or skirt portion may in some preferred embodiments comprise shaping on its exterior surface that inhibits rolling when the skirt is in the second position (e.g. when deployed onto an ampoule). Such shaping may comprise a variable thickness of the cap and/or skirt portion. This can be beneficial for example when ampoules are being used in unstable surroundings, e.g. in the back of an ambulance where the ampoule is much more likely to be knocked over or it may be difficult to stand it on end. While a normal ampoule is round in cross-section such that it will roll freely if placed on its side, if the closure gives the ampoule a non-round shape, e.g. a slightly squared profile, rolling will be inhibited and the ampoule is less likely to move, less likely to gain momentum and less likely to drop from a high surface such as a table or shelf onto a floor for example. The shaping may comprise one or more ribs. These ribs may extend axially so as to alter the cross-sectional shape (in a cross-section taken perpendicular to the ampoule’s main axis). A single rib may suffice, but preferably 2, 3 or 4 ribs are provided, evenly spaced around the cap and/or skirt so as to minimise the distance that the ampoule can roll before a rib hinders it. The ribs may be provided on the skirt, the cap or both, but preferably at least on the cap portion. In some preferred embodiments axial ribs are provided only on the cap portion so that they do not interfere with the rolling up of the skirt portion.

In some preferred embodiments one or more ribs may extend in a spiral around the skirt. The spiral ribs provide less of an obstruction when the skirt is rolled or folded up into the first position as the volume of rib is distributed more evenly around the circumference of the skirt. The angle of the spiral may be chosen depending on the dimensions of the device and the intended aim of reducing rolling, but in some examples it is preferably less than 45 degrees to the main closure/ampoule axis. These spiral skirt ribs assist with the automatic deployment once it is dislodged from the stability of the first (stored) position.

The friction between the material of the skirt (e.g. silicone in some embodiments) and the material of the ampoule (typically glass) will in most circumstances provide adequate force to hold the closure firmly onto the opened ampoule and form an excellent seal around the broken rim. However, in other cases, it may be desirable to supplement this contact force to ensure the seal is maintained. Thus the interior surface of the skirt may be coated at least in part with a gripping material or an adhesive. The gripping material may be a material that is designed for better friction with the ampoule material. The adhesive may be a permanent or temporary adhesive. In some embodiments the interior surface of the skirt may be provided with at least one circumferential rib. This internal rib may also be used to increase friction making it harder to remove the skirt portion from the ampoule once it has been deployed to the second position. The or each interior circumferential rib may be asymmetric such that it resists removal of the closure more than it resists placement of the closure on an ampoule. Such asymmetric ribs make it easy to install the skirt portion to the second position, but difficult to remove it due to the shape of the rib.

Where the cap is made from an elastic material, the skirt is deployed while the cap portion is pressed against the broken neck of the ampoule. After deployment and when the application pressure is removed from the cap portion, the elastic material will cause the skirt portion to stretch slightly with the friction of the skirt against the outside of the ampoule maintaining a pull on the cap portion against the broken neck of the ampoule and thus maintaining the seal against the broken neck.

The closure may further comprise a ring positioned circumferentially around the closure and around which the skirt portion is rolled or folded when in the first position. The ring helps the skirt portion to unfold or ‘snap’ into place around the ampoule when force is applied to the inside of the closure by pressing the closure against the ampoule. The ring essentially provides an extra surface around which the skirt must pass, stretching it further as it passes over the ring, folding back on itself. This extra stretch changes the stability of the skirt between the first and second positions. Thus, while the skirt is stable in both the first and second positions, the ring makes a less stable transitional point closer to the first position such that the skirt is quickly encouraged to begin movement towards the second position. The skirt’s elasticity will generally help to deploy the skirt all the way to the second position once it has passed the intermediate unstable position, but if it does not then, if the ring is separate it can be used to push the skirt further down onto the ampoule to finish the deployment. In other embodiments the ring may be formed integrally with the cap portion rather than separately. In other words it forms a flange around which the skirt folds when in the first position.

In some embodiments the closure may further comprise a dispenser arranged to hold the skirt portion in the first position and being capable of releasing the skirt portion such that it can move to the second position. Such a dispenser provides a removable tool which can be supplied with the closure and remain with it until the closure is used. The dispenser then facilitates mounting of the closure to the ampoule and releasing the skirt portion. Afterwards the dispenser may be disposed of.

The dispenser may comprise a ring having a narrow diameter section sized to contact the cap portion and a wider diameter section sized to hold the skirt portion in the first position. The dispenser may comprise a split ring. The split ring provides a biasing force that helps to maintain the folded or rolled skirt portion in the first position, but can also be left in place after mounting to add to the sealing force against the ampoule body. The ring may also be used to assist with application of the skirt portion to the ampoule body by pushing the ring axially down the ampoule body. The split in the split ring accommodates any changes in size of the ampoule, e.g. an enlarged shoulder portion may cause the split ring to expand.

The dispenser may comprise a gripper arranged to grip the skirt portion in the first position. The gripper may comprise a release mechanism arranged to release the skirt portion such that it can move from the first position to the second position. The gripper may comprise at least one pivoted arm that releases the skirt portion when squeezed so as to pivot about a pivot point.

The cap portion may further comprise a gripping device arranged to be capable of gripping a break off top of an ampoule to facilitate removal of the top from the rest of the ampoule. Providing such a structure removes the user’s hands further from the breaking action and keeps the user’s fingers further from any sharp edges that result from that breaking. The gripping device may be a ring sized to receive an ampoule top. The ring may have an inner surface formed from an elastic material, or other gripping material designed to engage the ampoule material with good friction so as to hold the cap once removed.

In some embodiments the closure may further comprise a lid arranged to cover the upper surface of the cap portion. The lid may be hinged to the closure so that it does not become separated. It may of course be integrally formed with the closure. It will be understood that the upper surface of the closure means the surface facing away from the ampoule, i.e. the surface that is uppermost of the ampoule is stood upright in normal use. The lid may form an air tight seal, thus protecting and preserving the contents of the ampoule. In embodiments where the cap portion is provided with a connector such as a luer connector, the lid may engage with the connector and may be hinged to the connector. As the connector may be formed from a more rigid material than the rest of the cap portion, this may enable a more secure engagement for the lid.

It can be appreciated from the above that the closure described here will provide an all over safer treatment situation for patients and healthcare personnel with reduced risk of injury and contamination as well as reduced wastage.

At least in the preferred embodiments the closure provides a combined flexible cap/seal/fluid transfer device that facilitates the drawing of liquid content from a glass ampoule into a syringe without using a needle. It shields the sharp edges, filters the content, prevents spilling and allows a user to draw the exact amount of content into a syringe and to maintain full control of the bolus given to the patient.

A further advantage of the seal is that where an ampoule contains enough content for more than one dose, the contents can be kept sterile and prevented from spilling long enough to allow a second (and possibly further) dose to be extracted from the ampoule, thus making better and more efficient use of the contents. This can be particularly beneficial for expensive pharmaceuticals or reagents. For certain products the contents may have to be used within a certain timeframe after opening, e.g. some pharmaceuticals have to be used within 24 hours of opening according to the regulations in some countries. However, this still provides a time window in which a second (or further) dose can be extracted if the ampoule is properly closed and/or sealed during this timeframe.

The cap portion may be provided with a shield rib separating the skirt portion from the upper surface of the closure. The shield rib may be provided around the outer surface of the cap portion and allows force to be applied to the closure onto the ampoule with a reduced risk of accidentally deploying the skirt early. When the closure is pressed onto the ampoule by fingers, the fingers may slip down the sides of the cap portion and are at risk of deploying the skirt portion from its first position into its second position. The shield rib protects the skirt portion from the fingers (or other force applier, e.g. when it is being taken out of a packaging) until it is desired to deploy the skirt portion. As discussed above, this deployment preferably happens automatically upon application of sufficient pressure if it is not accidentally triggered early.

The skirt portion may be provided with one or more support projections positioned such that when the skirt is in its second position the support projections engage with the outer surface of the ampoule, in the region of a shoulder of the ampoule. A typical ampoule may be considered to have a neck portion, being a concave (when viewed from the outside) region which connects the break off cap to a shoulder portion, the shoulder portion being a convex region (when viewed from the outside) which connects the neck portion to a side wall, the side wall being a substantially vertical wall of the ampoule body. When the skirt portion is in its first position, the one or more support projections are preferably located on the underside of the closure on a circle of larger diameter than the ampoule opening. Thus as the closure is pressed against the ampoule, the support projection will be deployed onto the outer surface of the ampoule at a position that will depend on the size of the ampoule. The purpose of the one or more support projections is to allow the closure to adapt to different diameters of ampoule by preventing the skirt portion from shrinking in diameter too early in the deployment process before it has passed the shoulder of the ampoule. In order to seal against a range of ampoule diameters, the cap portion is preferably formed wider than the largest diameter to be sealed and the skirt portion is preferably formed with a natural diameter (i.e. if deployed unstretched, not on an ampoule) less than the diameter of the smallest ampoule to be sealed. During the deployment of the skirt portion, as the skirt portion rolls or unfolds off the cap portion (a position in which it is rolled up in a larger diameter than its natural diameter), it starts to shrink towards its natural diameter until it engages with the outer surface of the ampoule. For smaller diameter ampoules the engagement of the skirt portion with the outer surface of the ampoule will tend to be lower down the outer surface than the shoulder that connects the main body of the ampoule with the neck part. The skirt will then deploy easily along the outer body. However, in the case of a larger diameter ampoule, in the absence of any support projections as discussed above, the skirt portion starts to narrow in diameter, but then comes into contact with the wide shoulder of the ampoule which hinders further deployment. The skirt portion can still be pushed over the shoulder manually, but the automatic (or 'snap') deployment may be prevented. The one or more support projections discussed above are arranged to contact the shoulder of a larger ampoule and thus prevent the skirt portion from narrowing in diameter before it has passed axially down past the shoulder of the ampoule. The support projection(s) thus essentially support the skirt portion on the shoulder in its earliest phase of deployment. Once past the shoulder, deployment proceeds as normal. The support projections are preferably arranged to engage only on the shoulder portion of the ampoule as engagement higher up on the neck portion may not provide sufficient support to maintain the diameter of the skirt during deployment. When deployed on smaller ampoules (of the range that the closure is intended to fit) the support projections may not touch the ampoule at all. Preferably a plurality of such support projections are provided around the skirt portion, all on the circle of larger diameter than the ampoule opening. A single annular support projection may be used, but it has been found that such an annular ring can in some cases produce tension that makes it difficult to hold the skirt portion in the first position. Therefore in preferred embodiments a plurality of support projections are provided around the opening with gaps between them. This reduces the tension, allowing the skirt portion to be held in the first position, while still achieving the required support that facilitates deployment onto larger ampoules. The support projections may be tapered towards the centre of the closure (e.g. triangular or trapezoidal shaped).

As the closure seals against the ampoule, when content is extracted from within the ampoule, the pressure within the ampoule is lowered. This lowering of pressure tends to increase the sealing strength, thus maintaining the seal despite the pressure difference across the closure. This pressure difference is thus generally an advantage. However, in the case of larger ampoules when a significant amount of content needs to be extracted in one go, the pressure drop can make it hard or inconvenient to extract enough content. For example, as the pressure difference increases, a syringe used to extract a drug from an ampoule experiences suction that makes it harder to pull the syringe. A one-way valve may go some way towards mitigating this by preventing extracted content from being sucked back in, but there may still be an inconvenience if the suction makes the syringe difficult to use one-handed. Therefore in some embodiments it may be desirable to provide one or more air channels that connect the outside to the inside of the ampoule, i.e. that connect the region inside the ampoule body to the outside of the closure. These channels would allow air to enter the ampoule thus relieving the pressure difference. However, in order to maintain sterility of the inside of the ampoule, it is preferred that any such channels have a filter to prevent non-sterile foreign objects from entering the ampoule.

The structure of the closure that engages the broken rim of the ampoule is considered to be inventive independently of the folded skirt portion. Therefore according to another aspect of the invention there is provided a closure for an ampoule, the closure comprising: a cap portion arranged to engage with a broken neck of an opened ampoule; and a skirt portion extending from the cap portion, the skirt portion being arranged to grip the sides of an ampoule; wherein the surface of the cap portion that is arranged to engage the broken neck comprises a convex shape arranged to project inside the open neck of the ampoule; and wherein the cap portion is formed from a deformable material so as to deform and seal against the broken neck.

It will be appreciated that all of the preferred features that are described above apply equally to this invention and that in the most preferred embodiments both inventions are employed.

In particular, the convex shape is preferably a cone or truncated cone shape as described above. Also, a trench may be provided around the convex shape.

A skirt portion may be provided as is described above, although in other embodiments the ampoule may be gripped by a different skirt portion that does not necessarily fold back on itself. For example a push-on or slide-on skirt portion may be used that may be either made from the same elastic material or may be of a more rigid material. The skirt portion may be formed from a flexible material that can radially expand as it is pressed over an ampoule. In such cases, the skirt portion is preferably formed with a natural (unstretched) diameter that is smaller than the smallest ampoule intended to be sealed by the closure. The skirt preferably has enough elasticity to expand radially to accommodate the largest ampoule intended to be sealed by the closure.

In the case of a push-on or slide-on skirt portion, as soon as the closure is pressed onto the ampoule, the skirt portion forms a seal against the outer surface of the ampoule body. As the closure is moved further onto the ampoule, if this seal is airtight (as it typically is), air pressure will build up within the skirt portion. This may be to the extent that it is difficult to press the closure all the way onto the ampoule, thus hindering the formation of a good seal against the broken neck of the ampoule. Therefore preferably one or more air canals connect the region inside the skirt portion to the outside of the closure so that air can escape thus reducing the pressure build up. As it is important that these air canals do not connect to the inside of the ampoule itself, they connect to the region inside the skirt at a location that is outside of the contact point with the ampoule neck (i.e. inside the closure but outside the ampoule). As a seal is formed against the neck portion, that seal still separates the sterile interior of the ampoule from the region which is connected to the outside by the air canals. In some preferred embodiments the air canals connect to a point radially outward from the projection that projects inside the ampoule.

A push-on or slide-on skirt may have one or more internal ribs as described above to increase the friction between the skirt portion and the outside surface of the ampoule. In some preferred embodiments, the one or more internal ribs may be in the form of lamellae that deflect and/or bend substantially parallel with the ampoule body surface as they are pressed over the ampoule body. These lamellae are formed form an elastic or otherwise deformable material with a natural diameter smaller than the ampoule body so that they are deflected and/or bent during the push-on application process. It has been found that in some cases, the friction created with smaller ribs formed from an elastic material can push the closure back slightly from the position of maximum overlap with the ampoule, slightly reducing the effectiveness of the seal that is formed at the neck. The lamellae that bend substantially parallel to the surface of the ampoule body tend to maintain an axial pressure better, thus resulting in an improved seal.

The skirt portion may be provided with a brim extending radially outwardly from the skirt portion to provide a surface against which to push the closure onto the ampoule. The brim may be provided at the end of the skirt portion (at the end distal from the cap portion) or it may be provided closer to the cap portion or indeed on the cap portion itself.

In other embodiments the skirt may effect a good grip without fully encircling the ampoule, e.g. opposed gripping fingers may squeeze against the ampoule. The gripping or squeezing force may be provided by a more rigid structure (e.g. sprung metal) that may be covered by a softer, grippier material such as silicone. In the case of sprung gripping members, the closure may be arranged to provide a means of separation of the sprung members for fitting to the ampoule. For example, the gripping members may be pivoted such that they may move between an open position and a closed or gripping position and they are preferably biased towards the closed or gripping position such that a good seal is maintained in the absence of other forces.

The closure may further comprise a rigid structure that is arranged to bias the skirt portion radially inwardly against the sides of the ampoule. The rigid structure may comprise at least one leg pivoted around a pivot structure such that it can be pivoted radially outwardly to release the skirt portion for mounting to or demounting from an ampoule.

The skirt portion may alternatively have a stiff, but flexible (or sprung) outer material on the outside with a softer, grippier inner material such as silicone on the inside.

The outer material may be separated into a plurality of gripping fingers as described above while the inner material fully encircles the ampoule. Alternatively both the outer material and the inner material may be divided into separate fingers so long as a full seal is formed around the broken neck of the ampoule when in use.

Viewed from an alternative perspective, the invention provides a closure for an ampoule, the closure comprising: a cap portion arranged to engage with a broken neck of an opened ampoule; and a skirt portion extending from the cap portion, the skirt portion being arranged to grip the sides of an ampoule; wherein the surface of the cap portion that is arranged to engage the broken neck is formed from a deformable material that is arranged to deform and seal against the broken neck.

As discussed above, the skirt portion may be a flexible skirt portion that is rolled or folded into a stored position and that can be activated or deployed into a use position on an ampoule. It will be appreciated that the preferred and optional features discussed above may equally be applied to this definition of the invention.

The cap portion may be arranged to form a seal against the broken rim of the neck of the ampoule around the full circumference of the rim so as to provide a separation between a sterile inside of an ampoule from a non-sterile outside. As discussed above, the rim (i.e. the broken edge surface) of the ampoule connects the interior of the ampoule with the exterior of the ampoule. The interior is typically sterile and the exterior is typically non-sterile. The broken surface that connects them (and which used to be part of the ampoule body wall) is also sterile and therefore sealing against that surface and fully around the circumference of that surface separates the sterile parts from the non-sterile parts, thus preventing contamination during content extraction.

The surface of the cap portion that is arranged to engage the broken neck is preferably arranged to accommodate and seal against a broken neck having a surface that varies in height by at least 0.5 mm, preferably at least 1 mm, more preferably at least 2 mm, at least 3 mm, at least 4 mm, at least 5 mm, at least 6 mm, at least 7 mm or at least 8 mm. The amount of variation in the surface may vary significantly in use, depending on just how the ampoule top breaks off the main body. It may reveal a fairly smooth rim or it may leave a sharp and jagged rim. The sealing surface is thus preferably arranged to accommodate the largest serrations that are expected to be found on a given ampoule rim for which the closure is designed so that the serrations do not hinder sealing of the closure against the rim at any point around the circumference of the rim. Larger ampoules may have larger potential serrations and may therefore need larger (thicker) sections of material in the cap portion facing the broken neck. In some embodiments, ampoules with volume from 1 ml to 5 ml have been found to have serrations up to 6 mm, while ampoules with volumes from 10 ml to 30 ml have been found to have serrations up to 8 mm. Accordingly, it is preferred that the cap portions designed for these sizes of ampoule can accommodate the corresponding sizes of serrations.

It will be appreciated that the invention is considered to extend to an opened ampoule having a rim (typically broken as part of the opening process) around its opening and comprising a closure as described above (optionally including any of the preferred features also described above) fitted against the rim.

According to a further aspect, the invention provides packaging for an ampoule closure, the packaging comprising: a first blister arranged to enclose the ampule closure; and a second blister arranged to receive an ampoule top.

The provision of a second blister to receive the ampoule top provides a convenient way to remove the top of the ampoule safely and with minimal mess. The user can open the second blister (which is empty), place it over the ampoule top and break the ampoule while the top is retained within the second blister. This protects the users fingers from the sharp edges of the broken neck of the ampoule and also allows the ampoule (and any residue from the ampoule contents) to be retained within the blister safely and with minimal mess.

Preferably the second blister is larger than the ampoule top and formed from a sufficiently deformable material that the blister can be twisted so as to retain and seal the ampoule top within the blister. Once the top has been removed, it is desired to retain it and prevent it from falling out of the second blister. Thus the ability to twist the blister so as to effectively reseal the blister quickly allows the sharp top to be kept safely within the blister and out of harm's way. The material from which the second blister is formed is preferably sufficiently pliable and non-springy that it stays in its twisted form readily.

Preferably a removable sealing strip or cover is provided to seal the first blister until use. This keeps the ampoule closure sterile until it is required. Preferably the removable sealing strip also seals the second blister until it is time for use. This ensures that if part of the packaging (i.e. the inside of the second blister) comes into contact with the broken edge, it is a sterile surface that makes contact thereby reducing the chances of contamination. It is also easier for production to seal both blisters at the time of manufacture. In some embodiments the strip may be resealable, allowing the broken top to be resealed inside the second blister by the sealing strip, thus preventing the sharp or serrated edge of the top being a cutting hazard to users.

The invention also extends to a method of sealing an ampoule, comprising: pressing a closure as discussed above (in any of its variations and optionally including any of the preferred or optional features also described above) onto a broken neck of an ampoule; and deploying the skirt portion from the first position to the second position.

The invention also extends to a method of making a closure comprising:

forming a closure with a cap portion and a cylindrical skirt portion extending from the cap portion, wherein the forming includes moulding over at least a first mould piece which defines the inner surface of the cylindrical skirt portion; and before removing the first mould piece, rolling up the cylindrical skirt portion onto the cap portion.

The rolling may be performed by hand or it may be performed by a rolling machine. The rolling may be performed by one or more moving frictional surfaces brought into contact with the skirt portion so as to provide a force on the outer surface of the skirt portion towards the cap portion. The moving frictional surface may be a wheel or a part wheel (e.g. a circular arc) that is rotated so as to roll up the skirt portion. The wheel may be translated axially towards the cap portion as the rolling takes place so as to maintain contact with the rolled skirt as it rolls towards the cap portion.

The first mould piece may be formed from two or more parts which can be separated so as to induce rolling of the skirt portion. The two or more parts may be separated from one another at the ends distal from the cap portion while remaining substantially unseparated at the ends adjacent to the cap portion. This splitting causes the end of the skirt portion distal from the cap portion to stretch more than the end attached to the cap portion and thus encourages the skirt portion to roll towards the narrower diameter and thus towards the cap portion. The two or more parts may be separated by driving a wedge between them substantially along the axis of the skirt from the end distal from the cap portion.

Preferred embodiments of the invention will now be described, by way of example only, and with reference to the accompanying drawings in which:

FIG. 1 illustrates an example process of a closure according to the invention being applied to an ampoule;

Figures 1A, 1B, 1C, 1D, 2:
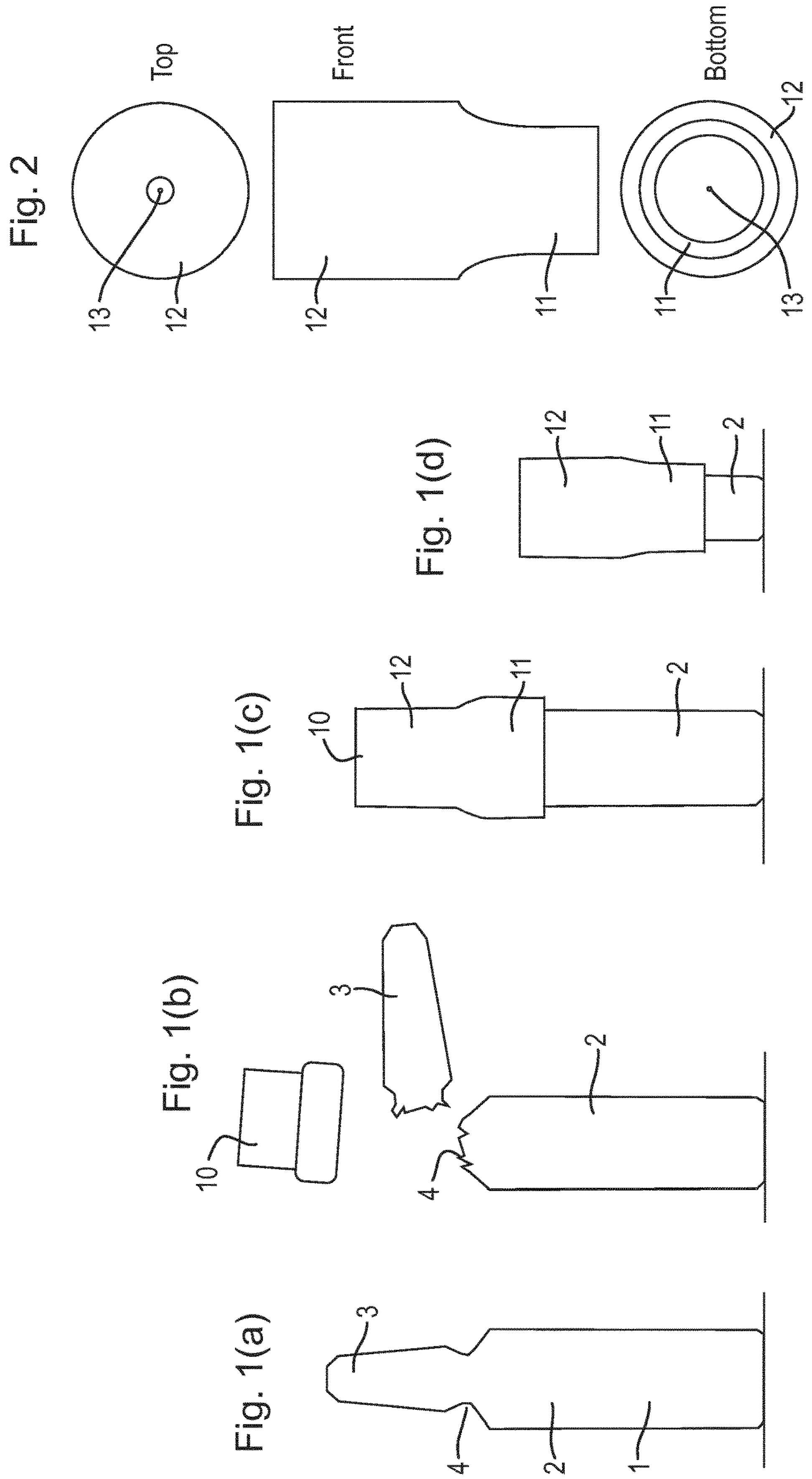
FIG. 2 shows a top view, front view and bottom view of a closure in its fully relaxed state.
Figure 3A:
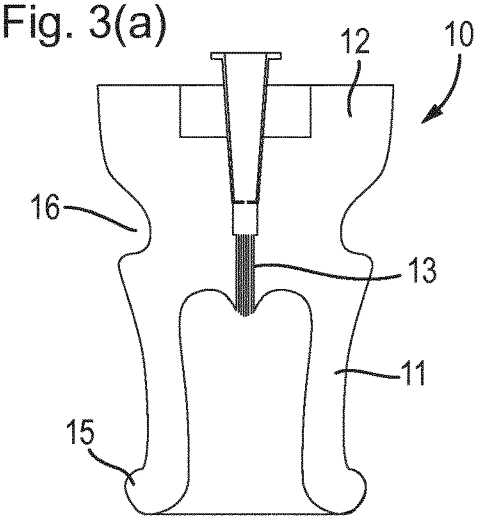
FIG. 3 shows various views and cross-sections of a closure according to certain embodiments.
Figure 3B:
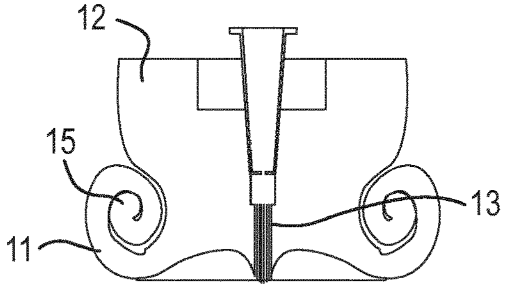
Figure 3C:
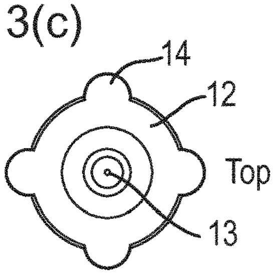
Figure 3D:
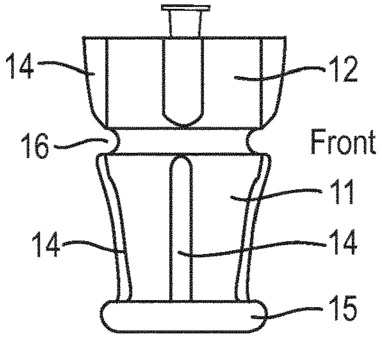
Figure 3E:
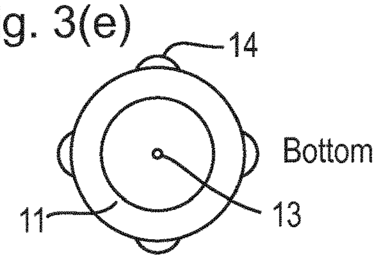

FIG. 1 shows an ampoule 1 which is typical of the type used to store pharmaceuticals such as morphine or adrenaline (purely by way of example). The ampoule 1 has a main body 2 which is typically cylindrical with a flat base so that it can stand on end and a top part 3 which is separated from the main body 2 by a neck 4. The neck 4 may be formed as a point of weakness (e.g. of thinner cross-section or with a weakness such as a scratch or groove) so that it will break in preference to other parts of the ampoule when a force is applied to the top part 3.

FIG. 1(*a*) shows the ampoule 1 in its sealed state, typically filled with some content such as a pharmaceutical or other chemical. FIG. 1(*b*) shows the ampoule after the top part 3 has been broken off from the main body 2, e.g. by applying a lateral force to the top part 3. This is typically performed by hand. This may be done simply by grasping the top part 3 and bottom part 2 and applying a lateral force or torque until the neck 4 breaks. Sometimes a tool may be used such as an empty syringe cylinder, or tissue/gauze may be used for protection. It can be seen here that the neck 4 is typically irregular, forming a serrated surface with potentially sharp projections that present a cutting hazard to the user.

After the top part 3 has been separated from the main body 2 and before content is extracted from the main body 2, a closure 10 is applied to the broken neck 4 of the main body 2 so as to cover the broken edge and protect the user. FIG. 1(*b*) shows the closure 10 in a folded or rolled-up state. This is the state in which it is typically supplied to the user and is ready for immediate deployment onto the ampoule body 2. FIG. 1(*c*) shows the closure 10 after it has been deployed onto the ampoule body 2. It can be seen that the closure 10 fully covers the broken and sharp neck part 4 and that a skirt portion 11 of the closure 10 is wrapped around the external surface of the ampoule main body 2, thereby gripping the body 2 and holding the closure 10 firmly in place.

FIG. 1(*d*) shows how the closure 10 can be applied to a smaller ampoule 1 providing that the skirt portion 11 remains slightly stretched, i.e. the "rest" position of the skirt portion 11 is smaller diameter than the ampoule body 2.

FIG. 2 shows a top view, front view and bottom view of a closure 10 in its fully relaxed state (in its deployed state, but not deployed on an ampoule). The closure 10 is divided into a cap portion 12 and a skirt portion 11. A content transfer channel 13 is formed through the cap portion 12 substantially along the central axis, allowing for extraction of content from within the ampoule main body 2 after the closure 10 has been affixed thereto.

FIG. 3 shows various views of a closure 10 according to certain embodiments. The closure 10 has ribs 14 formed on the external surface thereof, designed to prevent the closure 10 from rolling when placed on its side on a flat surface.

FIG. 3(*a*) shows a cross-section of the closure 10 in its fully relaxed state with the skirt portion 11 in the deployed position, but not engaged with an ampoule 1. As can be seen here, the bottom rim 15 of the skirt portion 11 has a slightly enlarged cross-section. This provides two functions. Firstly in the deployed state it provides additional gripping strength to help seal against the ampoule 1 and secondly in the stored state (shown in FIG. 3(*b*)) it helps to hold the skirt portion 11 in its rolled-up state. A groove 16 is provided in the cap portion 12 to at least partially accommodate the skirt portion 11 when the skirt portion 11 is rolled or folded back for storage. In this stored state the closure 10 is ready for fast and easy deployment from the stored state shown in FIG. 3(*b*) into the deployed state shown in FIG. 3(*a*) (or more specifically a similar state, but stretched around an ampoule 1).

The content transfer channel 13 can also be clearly seen in FIGS. 3(*a*) and 3(*b*). In this embodiment the content transfer channel 13 is formed from a plurality of small diameter parallel tubes so that it provides a filtering function as well as a content transfer function. It will be appreciated that this type of filter is predominantly suitable for liquid contents rather than solid or powdered or granulated contents.

FIGS. 3(*c*), (*d*) and (*e*) show respectively a top view, front view and bottom view of the closure 10 of this embodiment.

Figure 4A:
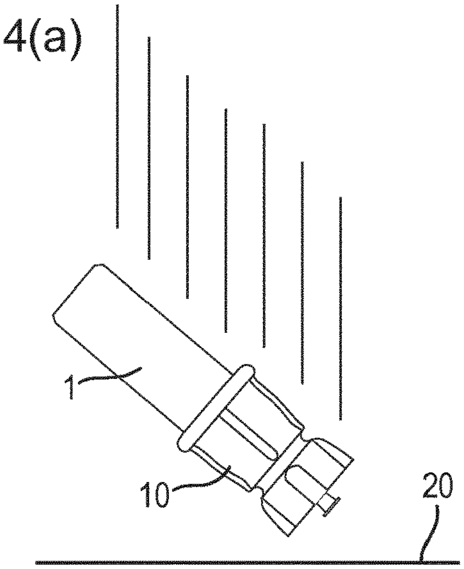
FIG. 4 illustrates protection from impact and rolling.
Figure 4B:
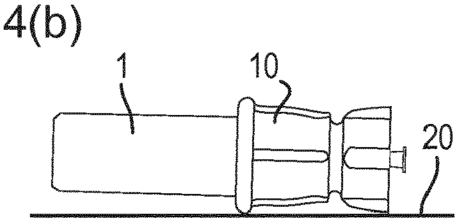
Figure 4C:
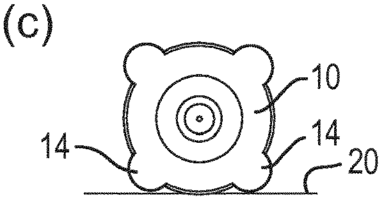
Figure 5A:
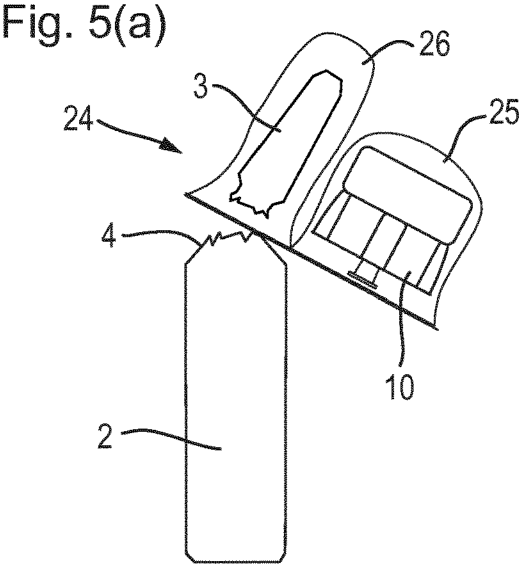
FIG. 5 illustrates another example process for using the closure, including unpacking, applying the closure to an ampoule and withdrawing content from the ampoule.
Figure 5B:
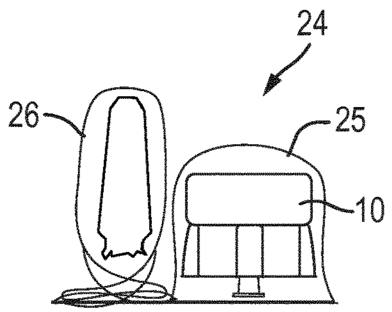
Figure 5D:
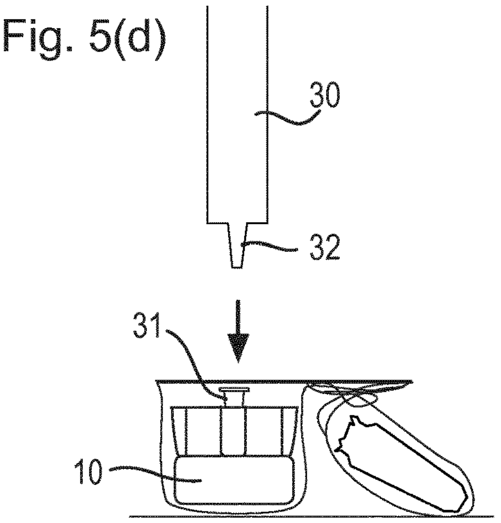
Figure 5C:
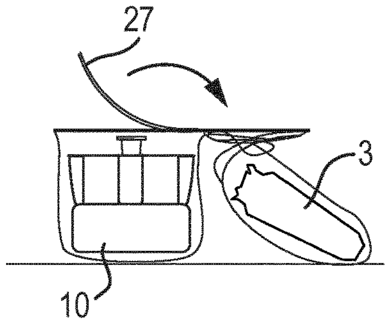
Figure 5E:
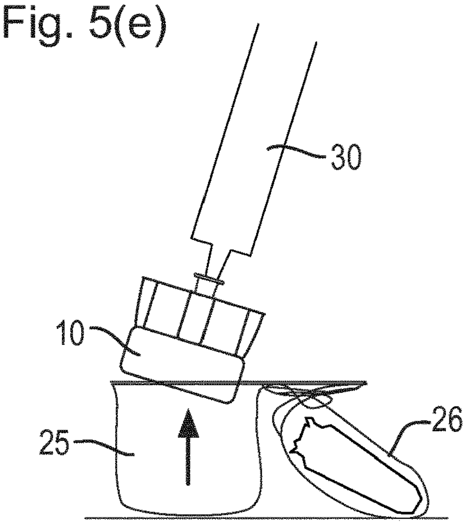
Figure 5F:
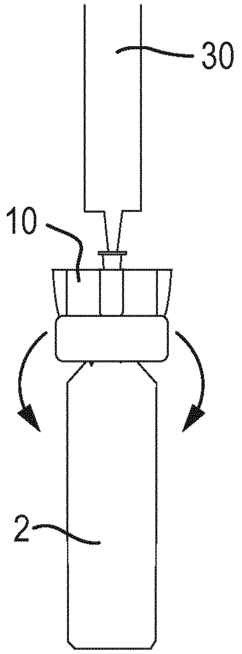
Figure 5G:
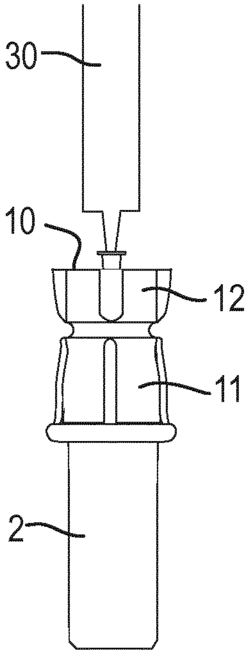
Figure 5H:
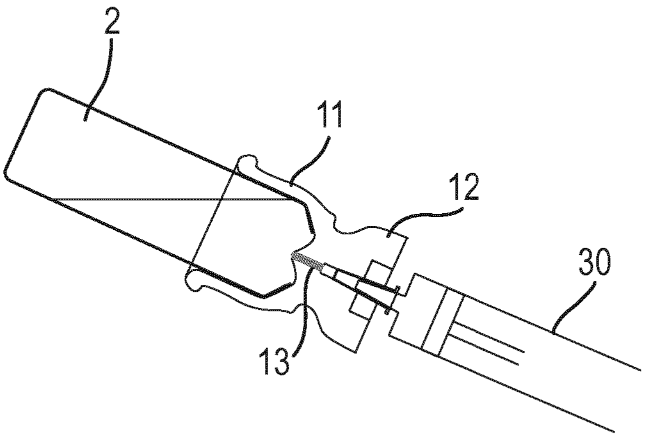

FIG. 4 illustrates how the closure 10 provides protection to the ampoule body 2 from impacts and how the ribs 14 provide protection against rolling. The closure 10 is typically formed from a soft and/or elastic material such as silicone that will absorb shocks upon impact, reducing the chances of ampoule breakage. FIG. 4(*a*) shows an ampoule body 2 falling with the closure 10 impacting against a surface 20. FIG. 4(*b*) shows the ampoule 1 and closure 10 at rest on the surface 20 with the ampoule body 2 raised off the surface and protected from impact. FIG. 4(*c*) shows an end view of the closure 10 resting on the surface 20 with the ribs 14 hindering rolling motion and thus increasing stability of the sealed ampoule.

FIG. 5 illustrates a process for applying the closure 10 to an ampoule 1 using a packaged closure device 10. As shown in FIG. 5(*a*) the closure device 10 is in its stored state with the skirt portion 11 rolled or folded up around part of the cap portion 12. The closure device 10 is sealed within a first sterile blister 25 being part of a packaging 24 and being sized and shaped to accommodate the closure 10. The other part of the packaging 24 is a second blister 26 which may also be sterile and which is sized and shaped to accommodate an ampoule top part 3. The second blister 26 may be generously sized so that it can accommodate a wide range of sizes and thus a large range of ampoules 1 from different manufacturers (the tops 3 being one of the more variable parts of ampoules). In other embodiments the second blister 26 may be provided with a protection device (e.g. tissue or gauze) or a tool for breaking the ampoule neck 4 while protecting the fingers. In FIG. 5(*a*) the second blister 26 has been opened and the ampoule top part 3 inserted into the second blister 26. As shown in FIG. 5(*b*) the second blister 26 is then twisted so as to seal and retain the broken top part 3 within the blister, thus preventing injury from the sharp broken neck of the top part 3 (in alternative embodiments the second blister 26 may be resealed in another fashion, e.g. by resealing with a sealing strip).

In FIG. 5(*c*) the first blister 25 is opened by peeling back a sealing strip or cover 27. A syringe 30 is then used to connect to an appropriately shaped content transfer connection 31 on the cap part of the closure 10 in FIG. 5(*d*). In FIG. 5 the content transfer connection 31 is a female luer type connection to which the male luer type connector 32 of the syringe 30 can be applied and locked. As shown in FIG. 5(*e*), the syringe 30 is used to transport the closure 10 from the packaging 24 to the ampoule main body 2, thus reducing non-sterile contact with the closure 10. In FIG. 5(*f*) the closure 10 is applied to the broken neck 4 of the ampoule main body 2 and in FIG. 5(*g*) the skirt portion 11 of the closure 10 is unfolded or unrolled from its stored state to its deployed state. In its deployed state, the cap portion seals against the broken neck 4 of the ampoule body 2 and the skirt portion 11 grips tightly against the outside surface of the ampoule body 2.

FIG. 5(*h*) shows the ampoule being inverted so that the content (in this example a fluid) is in contact with the content transfer channel 13 (fluid channel) ready to be drawn through the channel 13 and into syringe 30.

The sealed ampoule (ampoule body 2 plus closure 10 fitted thereon) and an attached syringe form a closed system. As the syringe draws content out of the ampoule body 2 through the channel 13, the pressure inside the ampoule is lowered. This suction effect pulls the skirt portion 11 and cap portion 12 tighter onto the ampoule body 2 and neck 4 respectively, thus improving the seal and maintaining a sterile environment. This is particularly beneficial where a rapid extraction of content may cause turbulence within the liquid content, requiring a more robust seal. By forming and maintaining a good seal around the ampoule body 2 during content extraction, the ampoule body 2 can be turned upside down for content extraction. Thus the contents (typically liquid) contact the bottom surface of the cap portion 12 and contact the extraction channel 13. This allows a greater quantity (substantially all if desired) of the contents to be extracted easily. Additionally, withdrawing the contents in this manner, any air drawn into the syringe is near the tip and can be expelled readily.

Figure 6A:
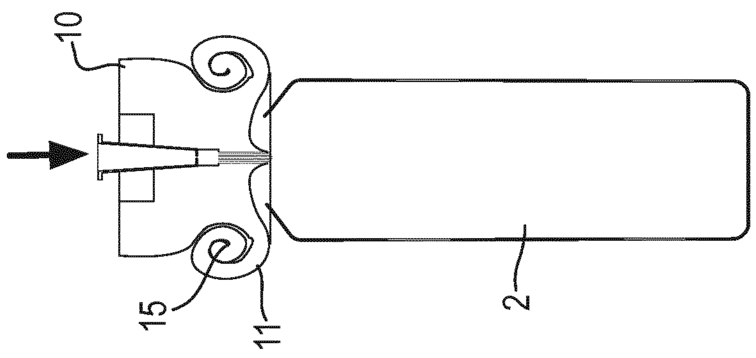
FIG. 6 illustrates in cross-section a deployment process of certain embodiments.
Figure 6B:
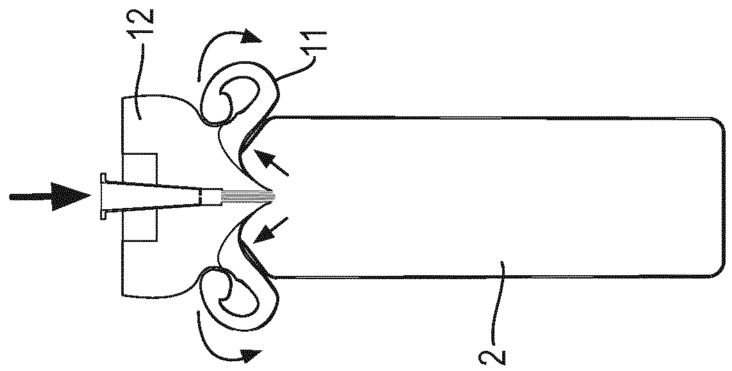
Figure 6C:
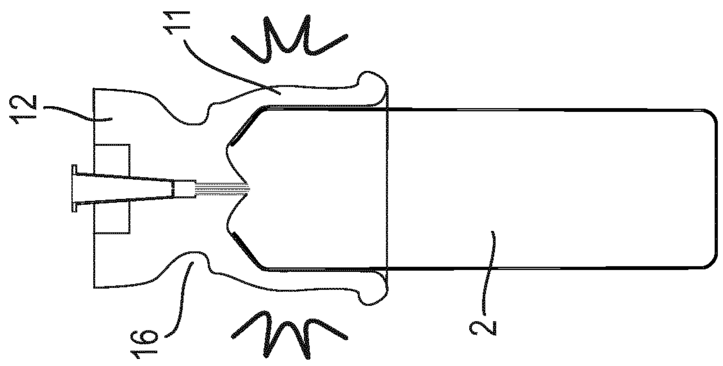

FIG. 6 illustrates in cross-section a deployment process of certain embodiments. FIG. 6(*a*) shows the closure 10 in its stored state in which the skirt portion 11 is rolled up around its enlarged rim 15 and stored in groove 14. This is a stable state from which the skirt portion will not move without some biasing force. Thus the closure 10 can remain in this state for an extended period of time until it is required for use. In preferred embodiments this may be for a year or more so as to match the shelf life of products with which the closure 10 may be used. The shelf life may of course by greater than this. The material of the closure 10 is selected so as to maintain its elasticity and deformability throughout this period of time.

FIG. 6(*b*) shows the closure 10 in the process of being applied to the ampoule main body 2. The closure 10 has been pressed against the broken neck 4 of the ampoule body 2. The cap portion 12 is shaped such that as the closure 10 is pressed against the neck 4, the force is transmitted through the elastic material of the cap portion 12, deforming the cap portion in the vicinity of groove 14 and pushing the skirt portion 11 out of the groove 14. This facilitates deployment of the skirt portion 11 by changing the shape of the outer surface of the cap portion 12 so that the skirt portion is either no longer in a stable stored state or is barely in such a state. From this state, the skirt portion 11 can easily by encouraged (e.g. pushed) into its deployed state, unfolding or unrolling down the outer side surface of the ampoule body 2 and sealing therewith. In some embodiments the force of pressing against the ampoule neck 4 may be sufficient to cause the skirt portion 11 to fully deploy into its deployed state without any further encouragement.

FIG. 6(*c*) shows the closure 10 after the skirt portion 11 has snapped into place in its deployed position with the inner surface of the skirt portion 11 in close gripping contact with the outer surface of the ampoule body 2. It can be seen that the skirt portion 11 is in a stretched state around the ampoule body 2 compared with the fully relaxed state shown in FIG. 3(*a*) and thus the skirt portion 11 grips firmly against the ampoule body 2.

Figure 7A:
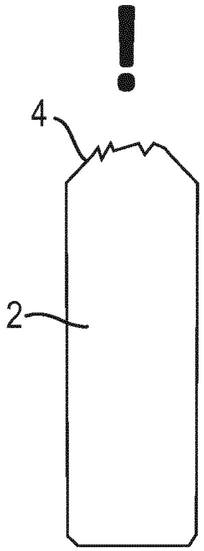
FIG. 7 illustrates in cross-section the protection from an ampoule with a broken neck.
Figure 7B:
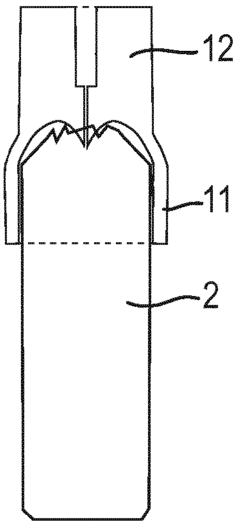

FIG. 7(*a*) shows an ampoule body 2 with the serrated neck portion 4 after the cap part 3 has been broken off leaving a cutting hazard. FIG. 7(*b*) illustrates the protection that is provided by the closure 10 when installed on the ampoule body 2, covering the broken neck 4.

Figure 8A:
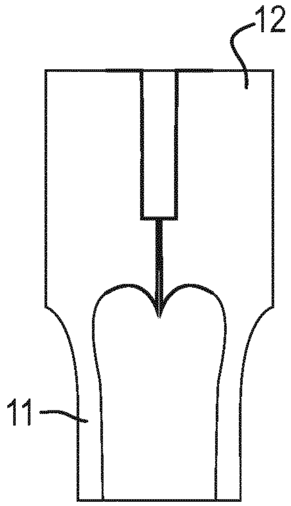
FIG. 8 illustrates in cross-section the main important sterile surfaces of a closure.
Figure 8B:
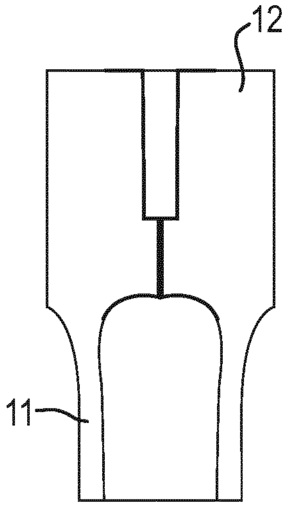
Figure 8C:
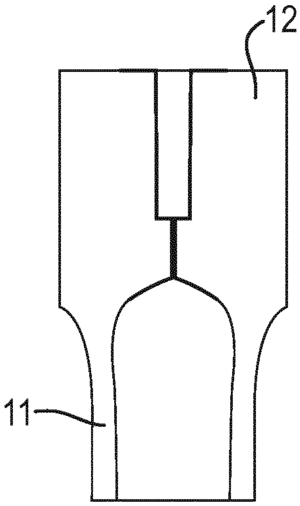

FIG. 8 shows the surfaces of the closure 10 that may come into contact with the contents of the ampoule 1 and which therefore need to be sterile surfaces for certain applications, in particular medical or other chemical applications. These surfaces are shown in thicker line compared with the rest of the drawing for illustrative purposes only. The lower surface of the cap portion 12 inside of the skirt will be inserted into the ampoule through the neck 4 and thus will contact the contents of the ampoule during the extraction process. Likewise, the content transfer channel 13 and the connection part for transfer of the content to another receptacle, e.g. a syringe, other reservoir or other content transfer conduit. FIGS. 8(*a*), (*b*) and (*c*) illustrate different shapes of the lower surface of the cap portion 12 inside the skirt portion 11. In FIG. 8(*a*) this surface projects down into the ampoule body 2 through the neck 4, whereas in FIG. 8(*b*) the lower surface of cap portion 12 is substantially flat and in FIG. 8(*c*) it is sloped away from the centre of cap portion towards the skirt portion 11, following the shape of a typical ampoule. FIGS. 8(*b*) and (*c*) will facilitate withdrawal of maximum content from the ampoule 2 as there is no place for the content to collect around the projection of FIG. 8(*a*) when the ampoule is turned upside down for content extraction.

Figure 9:
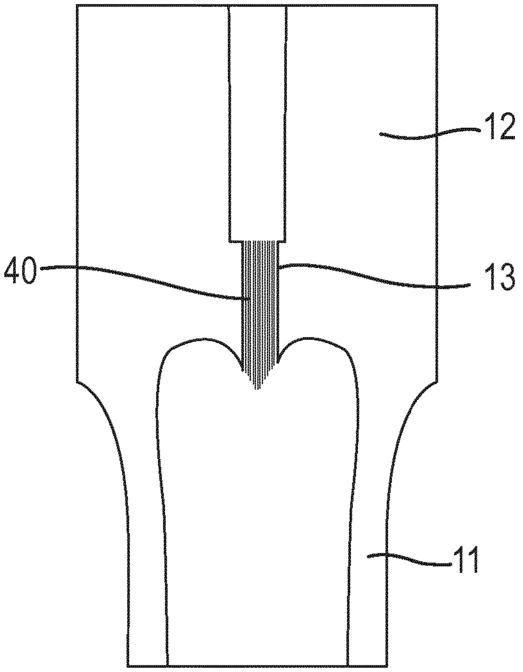
FIG. 9 illustrates a cross-section of a filter in a closure.

FIG. 9 illustrates a filter 40 in a closure 10. In this example the filter 40 is a plurality of thin tubes as discussed above and thus forms the content transfer channel 13 extending through the cap portion 12 from the lower surface thereof (within the deployed skirt portion 11) and the upper surface thereof (for connection and transfer to other devices). As will be illustrated later, the filter 40 may take other forms. The process of breaking the ampoule top 3 from the main body 2 may result in small slivers of material (e.g. glass or plastic) detaching and falling into the interior of the ampoule body 2 along with the content of the ampoule. The filter 40 provides the benefit of preventing glass shards or fragments from being drawn out of the ampoule body 2 along with the other content. Moreover, the filter being an integral part of the closure 10 means that it is not likely to be bypassed for efficiency as it does not add an additional step to the content extraction process.

Figure 10:
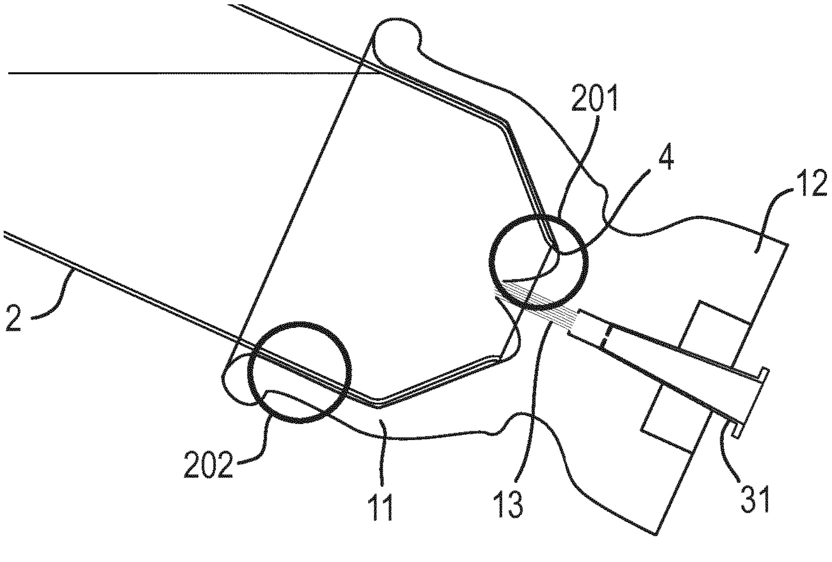
FIG. 10 illustrates in cross-section the sealing of a closure against an ampoule.

FIG. 10 illustrates the sealing of a closure against an ampoule. The closure 10 forms a seal with the ampoule body 2 in two ways. Firstly a seal is formed by pressing the bottom surface of the cap portion 12 against the broken neck 4 of the ampoule body 2. With the closure 10 being formed from a deformable material, the closure 10 can deform and seal against the irregular surface of the broken neck 4, thus moulding to that surface and sealing against it. As discussed above, the neck 4 may be sharp and may cut into the closure 10 which aids in forming a close seal between the two components. This seal is highlighted by the circle indicated by reference number 201. Secondly, the tight engagement of the skirt portion 11 with the external surface of the ampoule body 2 also forms a seal around the ampoule body 2. This is a liquid-tight seal formed by the constriction of the skirt portion 11 against the ampoule body 2 (as the ampoule body 2 is larger in diameter than the inner diameter of the skirt portion in its fully relaxed position). This seal is highlighted by the circle indicated by reference number 202.

As can be seen in FIG. 10, the lower surface of cap portion 12, inside skirt portion 11 has a projection formed thereon that extends into the ampoule 1 through the neck 4, i.e. it extends inside the opening formed in the ampoule 1 at the neck 4. This projection ensures that a concave shape is formed in the surface of the closure 10 that faces the ampoule neck 4. The projection extends inside the opening while the skirt portion 11 extends outside the opening. This shape ensures that the broken neck 4 comes into contact with the closure 10 and seals against it.

As shown in FIG. 10, content is extracted from the ampoule 1 by tipping it upside down so that the content comes into contact with the extraction channel 13. As content is drawn out from the ampoule 1, e.g. by a syringe, the pressure inside the ampoule is lowered. This lowering of the pressure relative to the pressure outside of the ampoule serves to create a suction effect pulling the closure 10 tighter against the ampoule body 2, thus improving its sealing properties.

Figure 11:
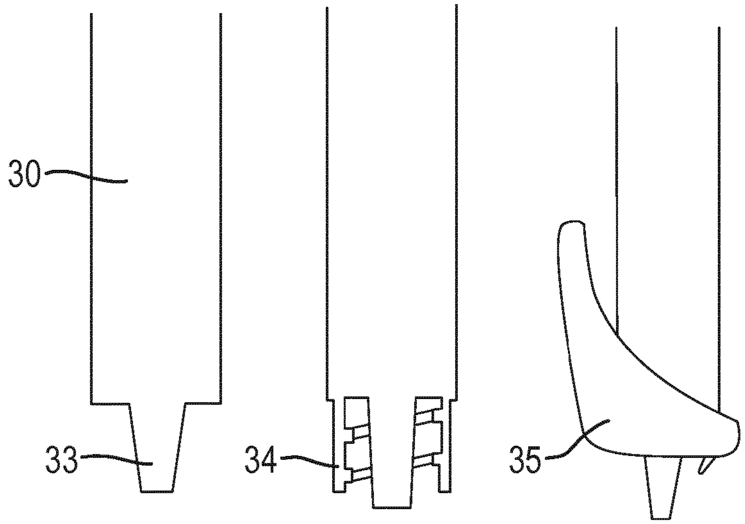
FIG. 11 shows different fluid transfer connection options.
Figure 12A:
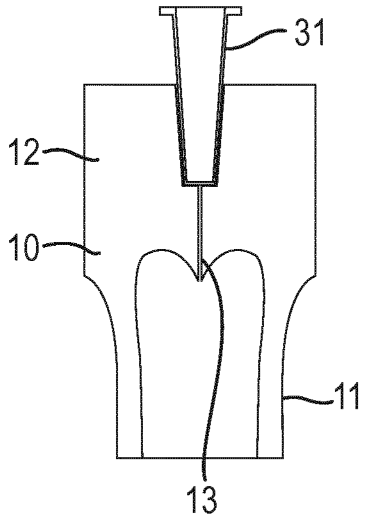
FIG. 12 shows a luer fluid transfer connection integrated into a closure.
Figure 12B:
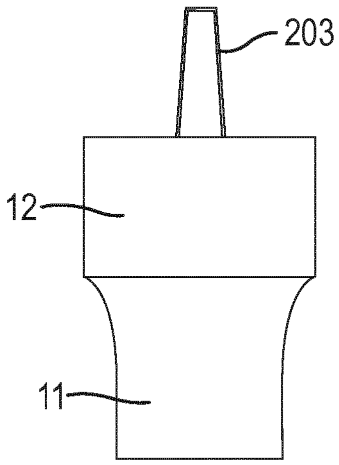

FIG. 11 shows different fluid transfer connection options on a syringe 30. The three options shown in FIG. 11 are the male connector parts for Luer-Slip® (left) 33, Luer Lock (middle) 34 and Luer Jack® (right) 35. Each of these is capable of connecting to a female Luer type connector such as shown at 31 in FIG. 5 and also shown in FIG. 12(*a*). As an alternative to the female Luer type connector, the closure 10 may have a male connector such as those shown in FIG. 11. FIG. 12(*b*) shows a closure 10 with a male Luer type connector 203 provided on the upper surface of the cap portion 12 for engagement with a female Luer connector on other apparatus.

Figure 13:
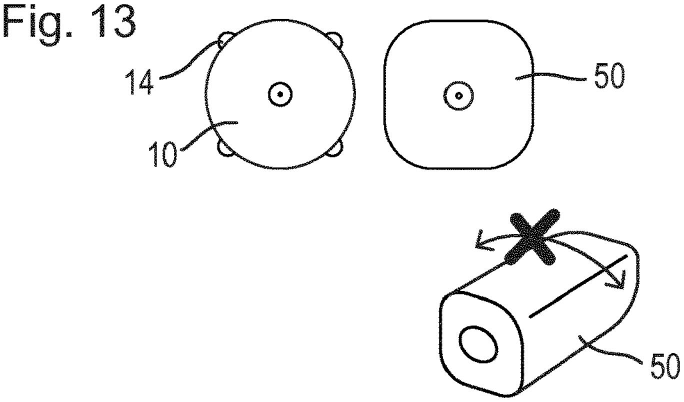
FIGS. 13 and 14 illustrate examples of anti-roll mechanisms.
Figure 14:
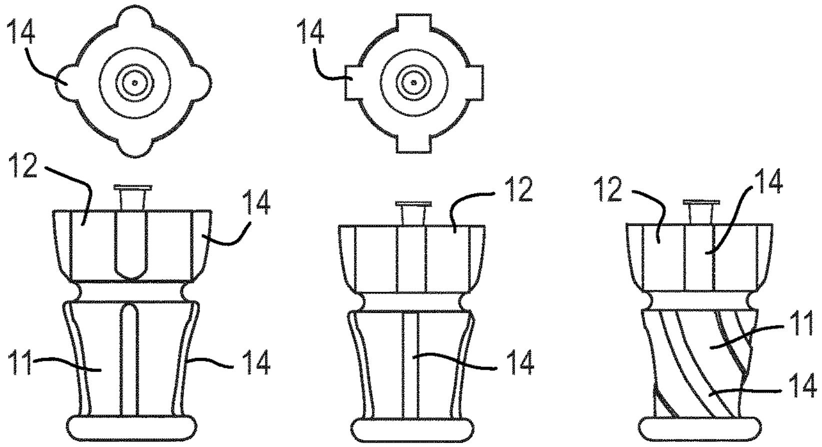

FIGS. 13 and 14 illustrate anti-roll mechanisms. FIG. 13 shows a circular cross-section closure 10 with ribs 14 as discussed above and also shows a substantially square cross-section closure 50 (with rounded corners) which also achieves the goal of preventing rolling of the closure 50. FIG. 14 shows some variations of the ribs 14. On the left, the ribs 14 have a rounded profile, in the middle the ribs 14 have a square profile and on the right is shown a closure 10 in which the ribs 14 on the skirt portion 11 have a spiral or helical shape. This spiral shape spreads the material of the ribs 14 in a circumferential direction so that when the skirt portion 11 is rolled or folded into its stored position, the ribs 14 are not rolled or folded fully back upon themselves. The ribs 14 (both spiral and non-spiral form) also have a positive effect on the rolling out of the skirt portion 11 onto the outer surface of the ampoule body 2. The ribs 14 provide regions of material that are thicker in cross-section than other regions of the skirt portion 11. These thicker portions affect the stiffness of the skirt portion 11. Once the rolling out of the skirt portion 11 is started, the ribs 14 help to continue that motion towards the fully deployed position on the ampoule body 2. It may be noted that the ribs 14 on the cap portion 12 need not have such a spiral form.

Figure 15A:
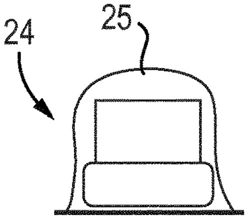
FIGS. 15 and 16 show examples of packaging for a closure.
Figure 15B:
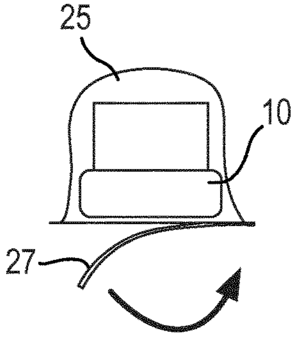
Figure 15C:
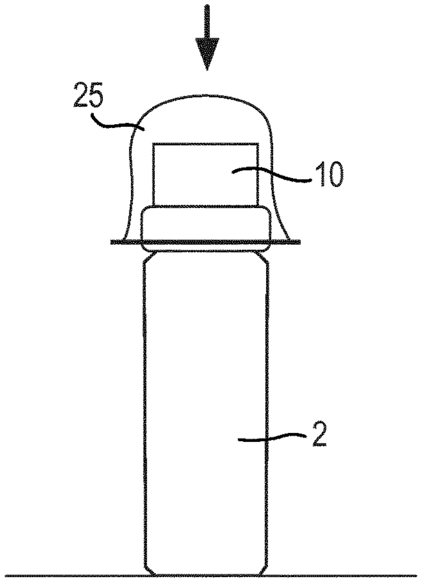
Figures 16A, 16B, 16C, 16D, 16E, 16F, 16G:
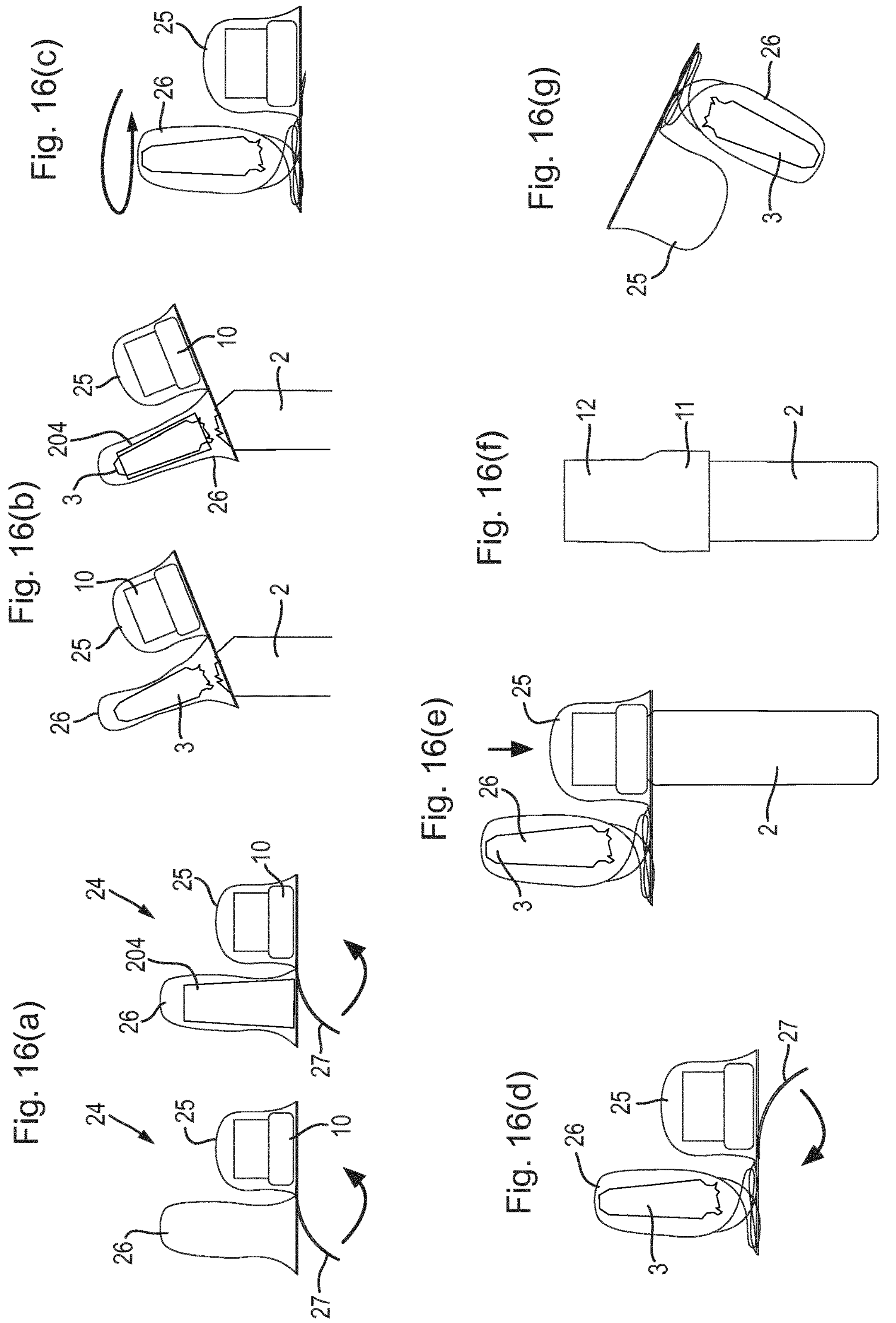
Figure 17A:
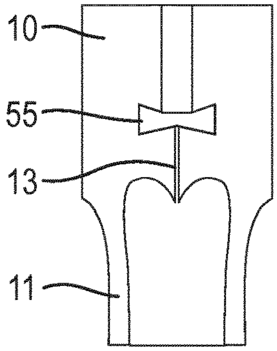
FIG. 17 shows filtering options for a closure.
Figure 17B:
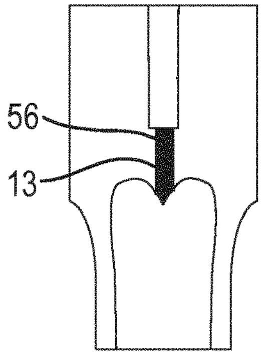
Figure 17C:
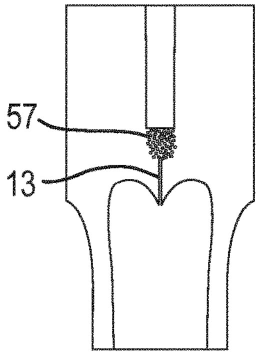
Figure 17D:
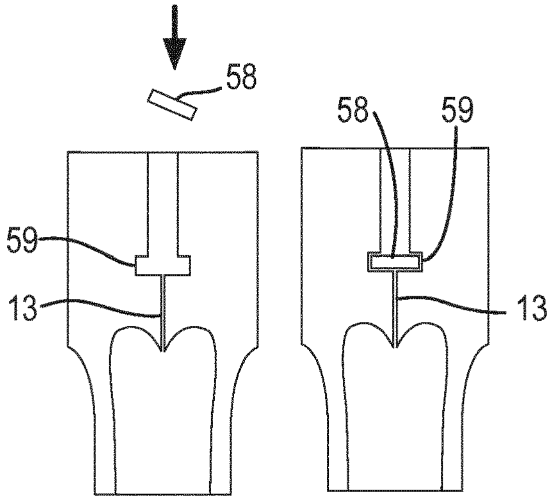
Figure 17E:
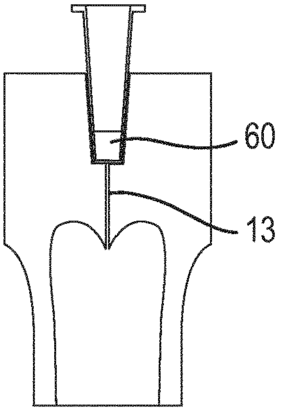

FIGS. 15 and 16 show examples of packaging for a closure similar that depicted in FIG. 5. FIG. 15(*a*) shows a packaging 24 with only a single blister 25 for housing the closure 10 in a sterile environment sealed by sealing strip 27. FIG. 15(*b*) shows the sealing strip 27 being removed by peeling it away from the blister 25. FIG. 15(*c*) show how the closure 10 can be installed onto the ampoule body 2 using the opened blister 25 to hold the closure 10 thereby minimising contact with the closure 10 and maintaining its sterility during installation.

FIG. 16 illustrates the process of FIG. 5 in more detail. FIG. 16 shows the use of a double blister package 24. In FIG. 16(*a*) the second blister 26 is opened by peeling back the sealing strip 27 (which is common to both blisters 25, 26). Two alternatives are shown in FIG. 16(*a*); on the left hand side the second blister 26 is empty, while on the right hand side the second blister 26 contains a tool 204 for breaking the ampoule neck 4 while protecting the fingers. The tool 204 takes the form of a tube designed to fit over the ampoule top part 3 and hold it securely after breaking. In FIG. 16(*b*), the second blister 26 is used to grasp and break the ampoule top part 3 away from the main body 2. The user is protected from the broken neck 4 by the second blister 26. Again, two versions are shown. In the left hand version the second blister 26 is empty, while in the right hand version the tool 204 is shown holding the ampoule top part 3 after breaking and thus providing additional protection. In FIG. 16(*c*) the second blister 26 is twisted so that the broken top 3 is held securely within the second blister 26. In FIG. 16(*d*) the first blister 25 is opened by peeling back the sealing strip 27. In FIG. 16(*e*) the first blister 25 is used to apply the closure 10 to the ampoule body 2 while maintaining the sterility of the closure 10. In FIG. 16(*f*) the skirt portion 11 of the closure 10 is moved from its stored position to its deployed position (e.g. by unfolding or unrolling) so that the skirt portion 11 grips the outer surface of the ampoule body 2. In FIG. 16(*g*) the packaging 24 with the broken top part 3 can be discarded safely without any cutting risk to the user.

FIG. 17 shows filtering options for a closure 10. FIG. 17(*a*) shows a filter 55 that is integrally moulded with the closure 10. This may be by bi-injection moulding or other moulding techniques. FIG. 17(*b*) shows a filter 56 formed from a plurality of small diameter parallel tubes which also form the content extraction channel 13. FIG. 17(*c*) shows a filter 57 formed from a network of small holes, i.e. a porous section. FIG. 17(*d*) shows a removable (and thus replaceable) filter 58 that can be inserted into a cavity 59 formed in the closure 10 adjacent to the content extraction channel 13. An advantage of a removable filter is that it can be omitted if not required for certain procedures, or different filters can be provided with different filter grades for different applications. Also, although the closure 10 is generally expected to be a one-use, disposable product, especially for sterile uses, this need not be the case and the invention is not so limited and thus the filter 58 can be replaced and the closure 10 reused. FIG. 17(*e*) shows the filter 58 installed in the cavity 59. FIG. 17(*f*) shows a luer type connection element 31 with an integral filter 60.

Figure 18A:
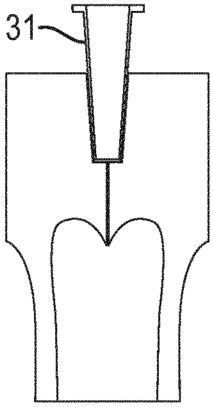
FIG. 18 shows alternative integrated fluid transfer connections for a closure.
Figure 18B:
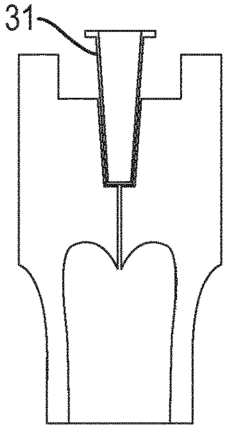
Figure 18C:
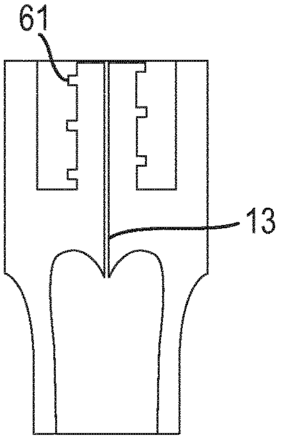
Figure 19A:
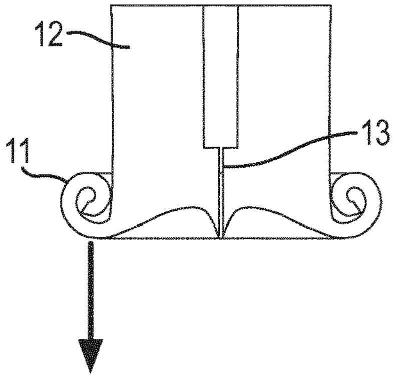
FIG. 19 illustrates variations of a closure device, including different material thicknesses.
Figure 19B:
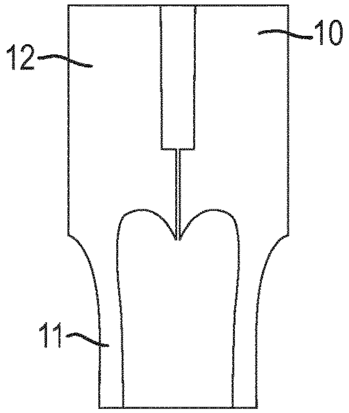
Figure 19C:
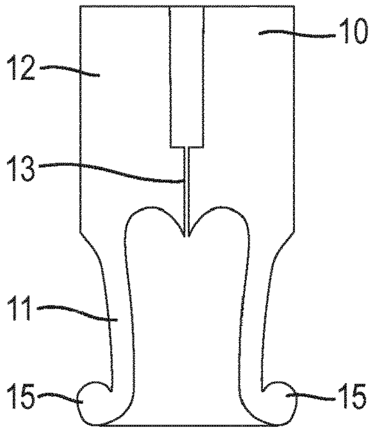
Figure 19D:
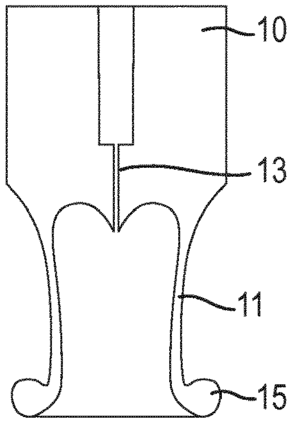

FIG. 18 shows alternative fluid transfer connections for a closure 10 as discussed above. FIGS. 18(*a*) and 18(*b*) show a female luer type connection 31. FIG. 18(*b*) has a raised lip around the upper surface of the cap portion 12 to provide a degree of protection to the luer connector.

FIG. 18(*c*) shows a threaded connection 61 designed to receive a correspondingly threaded connector to mate with the content extraction channel 13.

FIG. 19 illustrates variations of a closure device 10. FIG. 19(*a*) shows a rolled skirt portion 11 (or "sleeve") in the rolled or stored position ready to be deployed onto an ampoule body 2. FIG. 19(*b*) shows the closure 10 of FIG. 19(*a*) in its deployed (unrolled) position, but without an ampoule 1 being present so that the fully relaxed state is shown. FIG. 19(*c*) shows an enlarged rim 15 at the bottom edge of the skirt portion 11 that helps to increase the gripping strength against the ampoule body 2 and also provides a convenient shape around which to roll the skirt portion 11 after manufacture and when configuring the closure 10 into its stored (rolled up) state. In FIG. 19(*c*), the skirt portion 11 also has a slight inward taper from the bottom of the cap portion 12 towards the enlarged rim 15 so that the gripping force against the ampoule body 2 is highest at the rim 15. FIG. 19(*d*) shows a much thinner skirt portion 11 that is easier to roll up and uses less material. In certain exemplary embodiments the skirt portion 11 may have a thickness of about 0.5 mm or about 1 mm.

Figure 20:
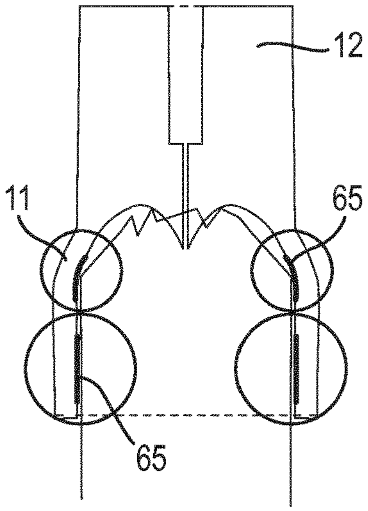
FIGS. 20 and 21 illustrate additional features of certain embodiments.
Figure 21:
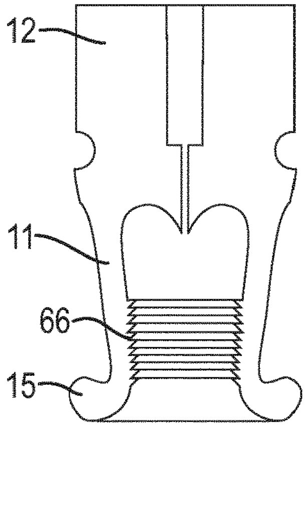
Figure 22A:
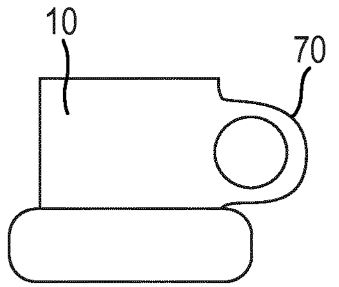
FIG. 22 shows an example of an integral ampoule breaking feature.
Figure 22B:
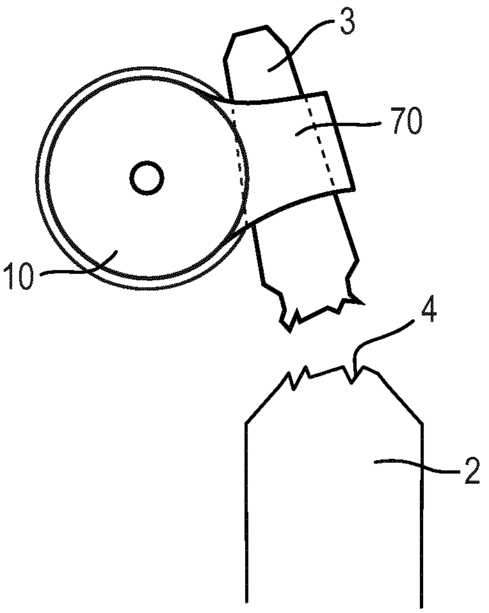
Figure 22C:
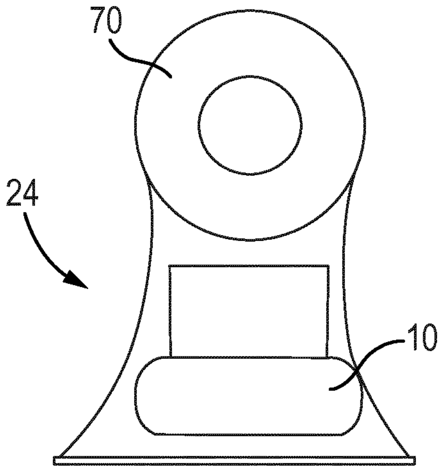
Figure 22D:
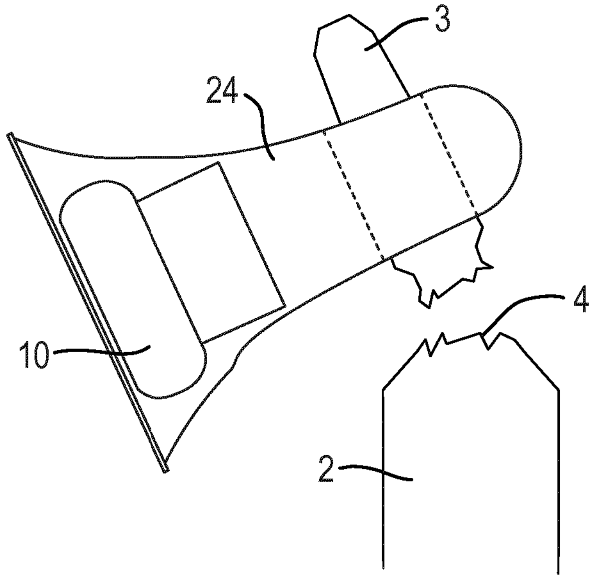
Figure 23A:
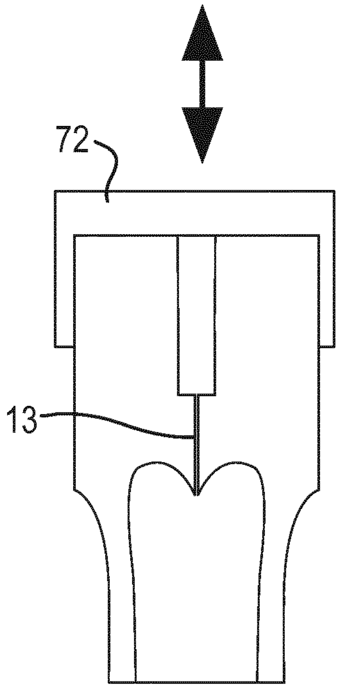
FIG. 23 shows additional protective or sealing elements of a closure.
Figure 23B:
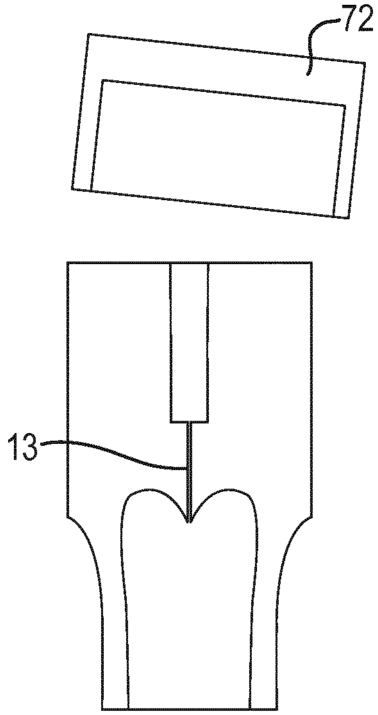
Figure 23C:
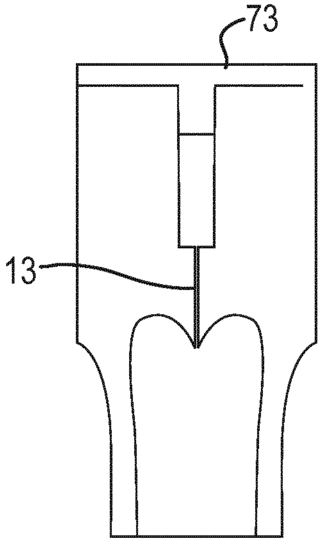
Figure 23D:
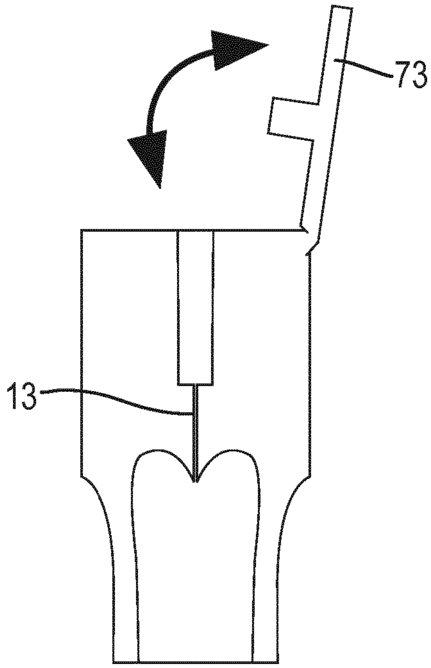

FIGS. 20 and 21 illustrate additional features of certain embodiments. FIG. 20 shows adhesive surfaces 65 provided on the inner surface of the skirt portion 11 for contact and adhesion with the ampoule body 2. The adhesive provides sealing and also prevents movement of the closure 10 once it has been installed onto an ampoule body 2. The adhesive thus allows the skirt portion 11 to have a looser fit as the seal is no longer reliant entirely on frictional engagement between the skirt portion 11 and the ampoule body 2.

FIG. 21 shows ribs 66 or other projections formed on the inner surface of the skirt portion 11, preferably circumferential ribs, optionally with an asymmetrical profile that are arranged to increase the gripping of the skirt portion 11 against the ampoule body 2 so as to make it more difficult to remove the closure 10 after application. This helps to maintain the seal even in the face of rough handling during use, e.g. during use in an emergency vehicle such as an ambulance.

FIG. 22 shows an example of an integral ampoule breaking feature. This provides an alternative to the use of the second blister 26 described above. The closure 10 is provided with a ring 70 which may be integrally moulded with the cap portion 12 and is sized so as to allow insertion of at least part of an ampoule cap part 3. FIG. 22(*a*) shows an example of the ring 70 provided on the side wall of the cap portion 12. FIG. 22(*b*) shows the ring 70 being used to snap the top part 3 of an ampoule 1 from the main body 2. The use of the ring 70 allows the user to keep their fingers clear of the broken neck 4, thus reducing the chance of injury.

FIG. 22(*c*) shows an alternative arrangement in which the ring 70 is formed as part of the packaging 24 instead of being formed as part of the closure 10. FIG. 22(*d*) shows the ring 70 of FIG. 22(*c*) in use.

FIG. 23 shows additional protective or sealing elements of a closure 10. FIGS. 23(*a*) and (*b*) shows a lid 72 that can be fitted to the upper surface of the cap portion 12 so as to close off the content extraction channel 13 and protect it from contaminants. The lid 72 is simply removed when access is required. FIG. 23(*c*) shows a hinged lid 73 that works on a similar principle, but remains attached to the cap portion 12 when not in use to protect the channel 13. The hinged lid 73 may be integrally formed with the closure 10.

Figure 24A:
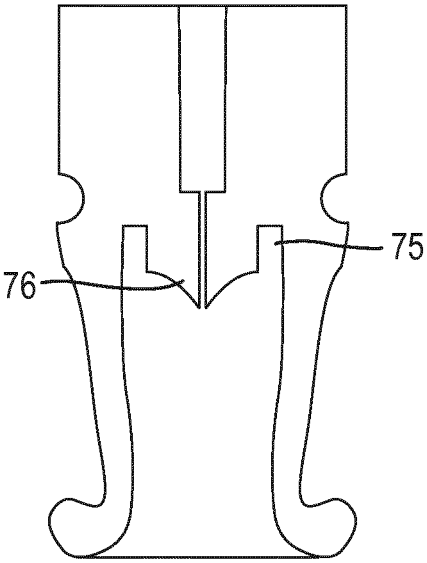
FIG. 24 shows a trench seal in certain embodiments of a closure.
Figure 24B:
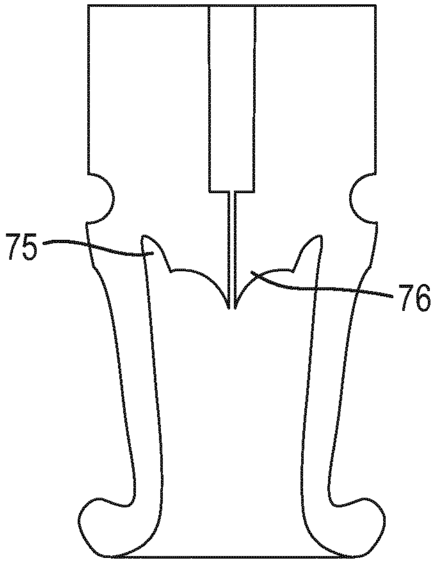

FIG. 24 shows a trench seal 75 in certain embodiments of a closure 10. The trench or groove 75 is formed circumferentially around the conic projection 76 that extends from the bottom surface of the cap portion 12 inside the skirt portion 11. The groove 75 is sized and shaped to receive the broken neck 4 of the ampoule body 2 after the cap part 3 has been removed. The groove 75 provides a deeper recess into which the broken neck 4 can be inserted thus improving the sealing against the broken neck 4. As the neck 4 can be inserted deep into the groove 75, sealing is provided across the whole broken surface of the neck, i.e. across the thickness of the ampoule wall, thus improving the sealing contact that is made with the inner wall of the ampoule body 2 by the projection 76. FIG. 24(*a*) shows a rectangular groove 75 (i.e. with rectangular cross-section) while FIG. 24(*b*) shows an angular groove 75 (which in this example has a substantially triangular cross-section being of greater extent at its radially outward end, tapering to a lower extent at its radial inward end.

Figure 25A:
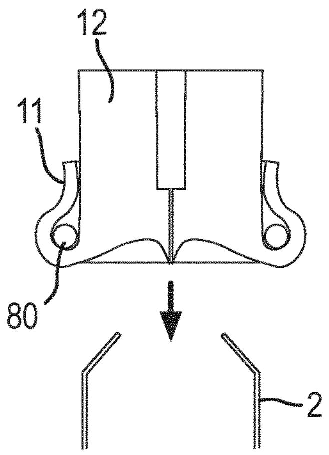
FIG. 25 shows a ring for use in deployment of a closure skirt.
Figure 25B:
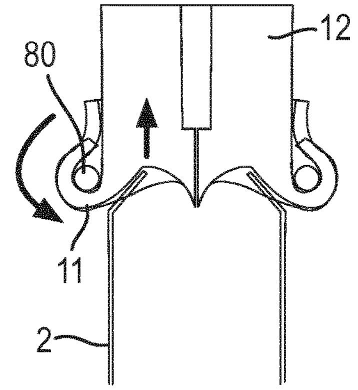
Figure 25C:
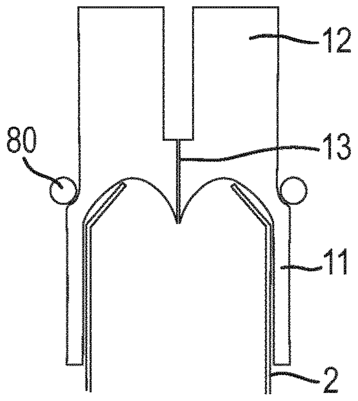

FIG. 25 shows a ring for use in deployment of a closure skirt. The ring 80 of FIGS. 25(*a*)-(*c*) provides a feature around which to fold or roll the skirt portion 11 in the stored configuration. The ring 80 can also be used to provide some assistance in the unfolding or unrolling process by pushing the ring axially down towards the ampoule body 2, thus forcing the skirt portion 11 to be rolled down onto the outer surface of the ampoule body 2 and into sealing contact therewith. FIG. 25(*a*) shows the ring 80 and skirt 11 in their rest positions in the stored configuration. FIG. 25(*b*) shows the ring 80 being used to help push the skirt portion 11 down onto the ampoule body 2 and FIG. 25(*c*) shows the skirt portion 11 fully deployed into the deployed configuration. As was described earlier, the action of pressing the closure 10 against the neck 4 of the ampoule body 2 may transmit forces through the closure 10 that cause the skirt 11 and the ring 80 to be displaced and which may be enough to encourage the skirt 11 and the ring 80 to fully deploy onto the ampoule body 2.

Figure 26A:
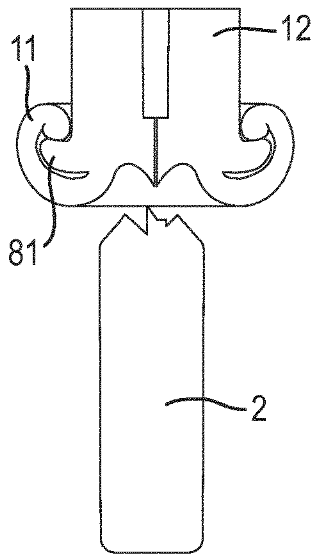
FIG. 26 shows an integral ring or rim performing a similar function to the ring of FIG. 25.
Figure 26B:
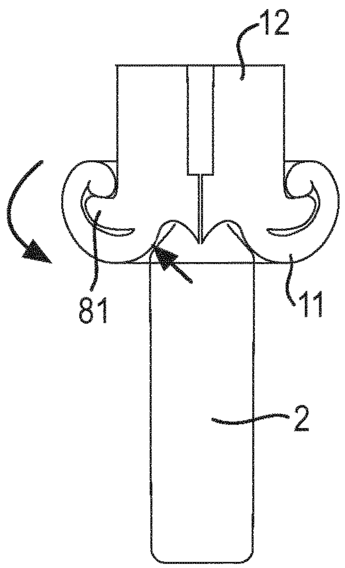
Figure 26C:
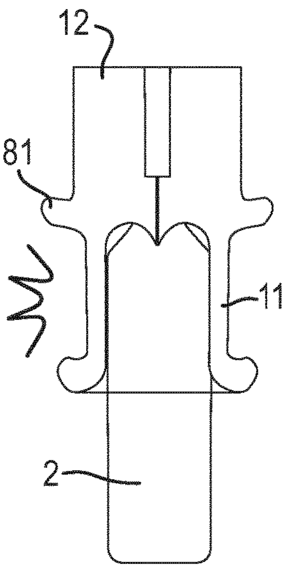

FIG. 26(*a*)-(*c*) are similar to FIG. 25(*a*)-(*c*), but with a ring 81 in the form of a rim that is integrally formed with the cap portion 12 and thus provides a convenient surface around which to roll or fold the skirt portion 11, but which cannot be displaced axially down the closure 10 to provide additional assistance with deployment of the skirt portion 11.

Figure 27A:
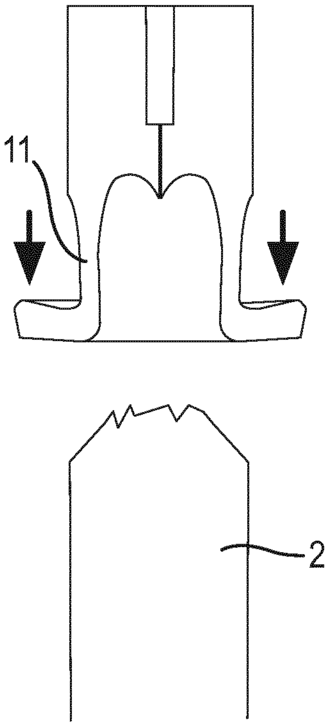
FIGS. 27 and 28 show alternative arrangements for deployment of a skirt portion.
Figure 27B:
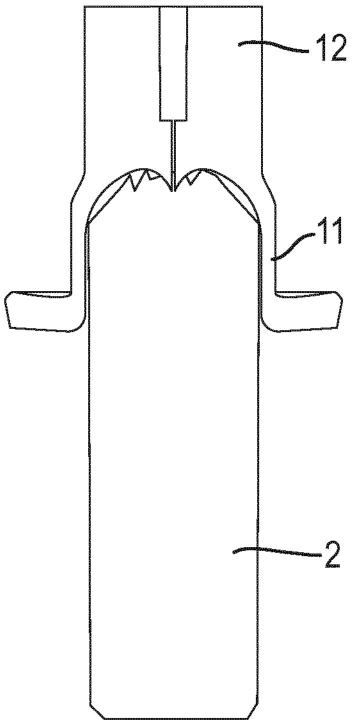
Figure 28A:
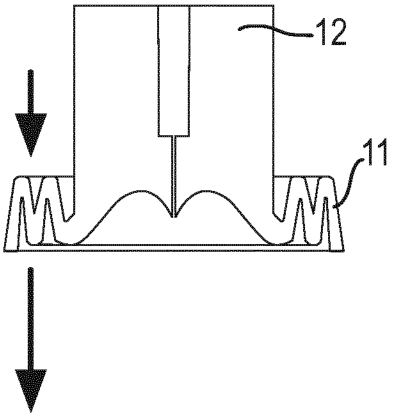
Figure 28B:
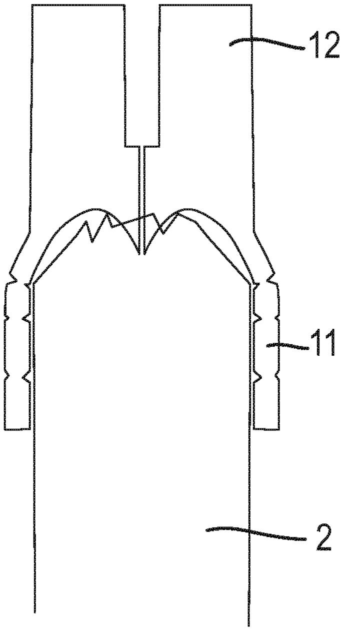
Figure 29A:
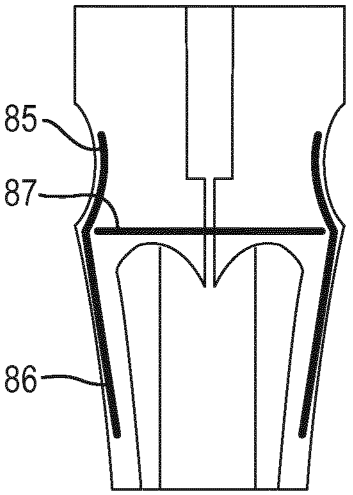
FIG. 29 shows an alternative gripping arrangement for a closure.
Figure 29B:
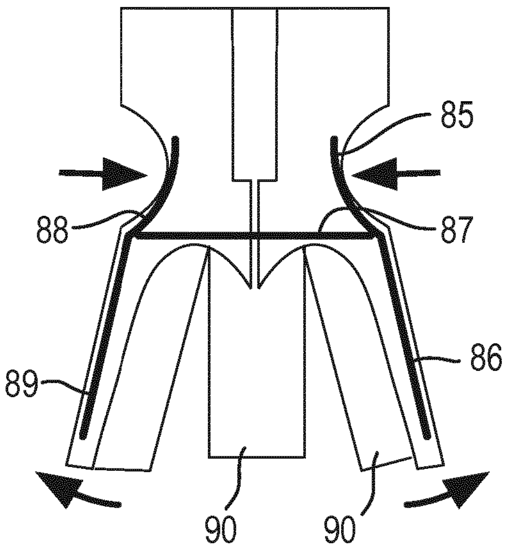
Figure 29C:
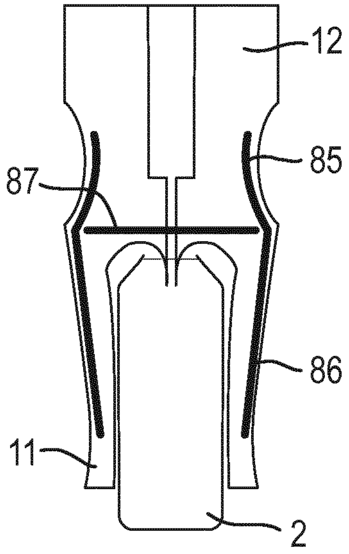
Figure 29D:
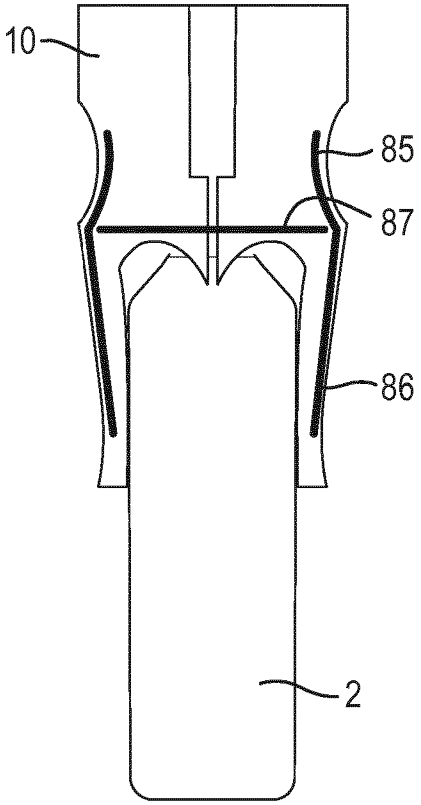

FIGS. 27 and 28 show alternative arrangements for deployment of a skirt portion other than via rolling and/or folding. FIG. 27 shows a skirt portion 11 that is preformed in the deployed state ready to be slipped over the ampoule body 2. The skirt portion 11 is of narrower internal diameter than the outer diameter of the ampoule body 2 to which it is to be applied and thus will grip tightly against the ampoule body 2, providing the required seal. FIG. 27(*a*) shows the closure 10 before deployment on an ampoule body 2 and FIG. 27(*b*) shows the closure 10 deployed on an ampoule body 2.

FIG. 28 shows a skirt portion 11 that is folded into a concertina arrangement in the stored configuration shown in FIG. 28(*a*) and which is unfolded onto the ampoule body 2 as shown in FIG. 28(*b*).

FIG. 29 shows an alternative gripping arrangement for a closure 10 in which a rigid structure 85 is provided inside the closure 10 and which biases the skirt portion 11 against the ampoule body 2. The rigid structure 85 has a number of rigid arms 86 that are pivoted around a rigid ring or disc element 87 such that when upper parts 88 of the arms 86 (the parts above the ring 87 and formed in the cap portion 12) are pressed radially inwardly, the lower parts 89 of the arms 86 (the parts below the ring 87 and formed in the skirt portion 11) are biased outwardly so as to expand the skirt portion 11 allowing the skirt portion 11 to be mounted on or removed from the ampoule body 2. In this example the skirt portion 11 may be formed from a number of separate legs 90, each with its own rigid arm 86, although a full skirt portion 11 may still be used. FIGS. 29(*c*) and (*d*) show the closure 10 of FIGS. 29(*a*) and (*b*) mounted on two different sized ampoule bodies 2, illustrating how this arrangement can accommodate smaller ampoules by providing an additional radially inward biasing force in addition to any elasticity of the skirt portion 11.

Figure 30A:
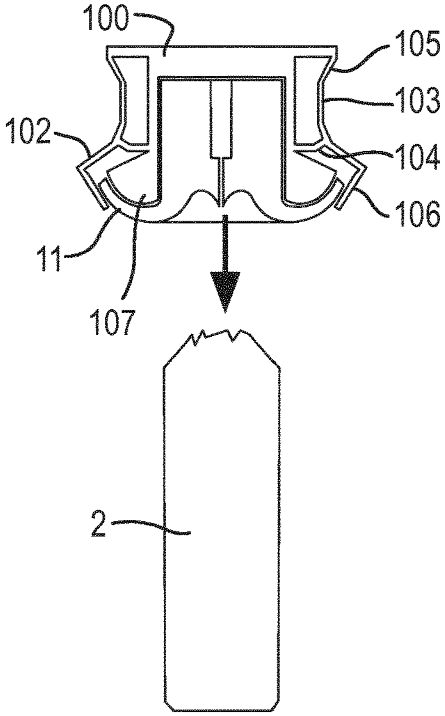
FIGS. 30 to 33 show alternative methods and devices for applying a closure to an ampoule.
Figure 30B:
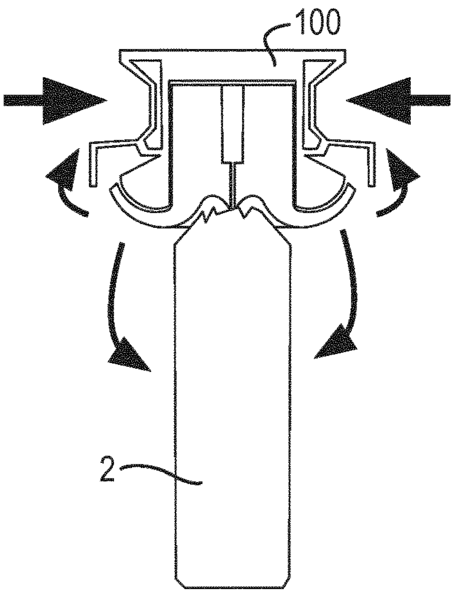
Figure 30C:
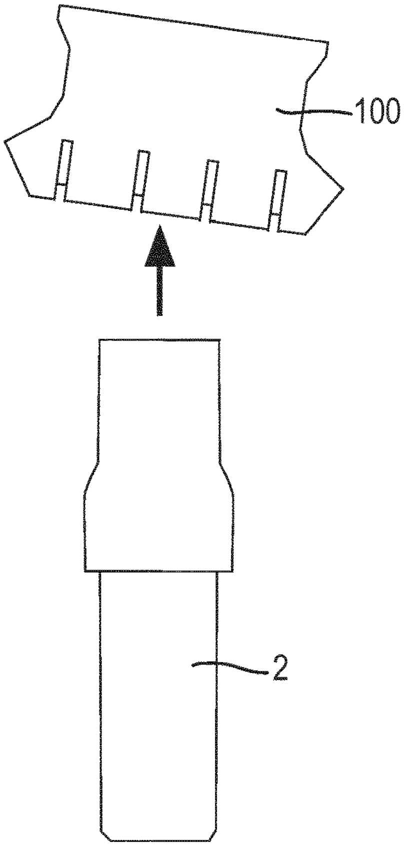

FIG. 30 shows a dispenser 100 that can be used to hold the closure 10 in a storage configuration and which can also be used to deploy the closure 10 onto an ampoule body 2. The dispenser 100 has a shaped portion 101 around which the skirt portion 11 is wrapped, slightly folded back on itself. A release mechanism 102 is also provided that in the stored configuration holds the skirt portion 11 against the shaped portion 101 thereby retaining the skirt portion 11 in the stored configuration until it is needed for use. FIG. 30(*a*) shows the dispenser 100 and closure 10 in this stored configuration. FIG. 30(*b*) shows the release mechanism 102 being activated. The release mechanism 102 comprises a number of gripping arms 103 each pivoted about a pivot 104 such that when the upper part 105 is squeezed radially inwardly the lower part 106 is displaced radially outwardly, releasing the skirt portion 11. The skirt portion 11 then deploys automatically onto the outer surface of the ampoule body 2 as discussed above. FIG. 30(*c*) shows the closure 10 installed on an ampoule body 2 and the dispenser 100 being removed. The dispenser 100 can be discarded or reused.

Figures 31A, 31B, 31C, 31D:
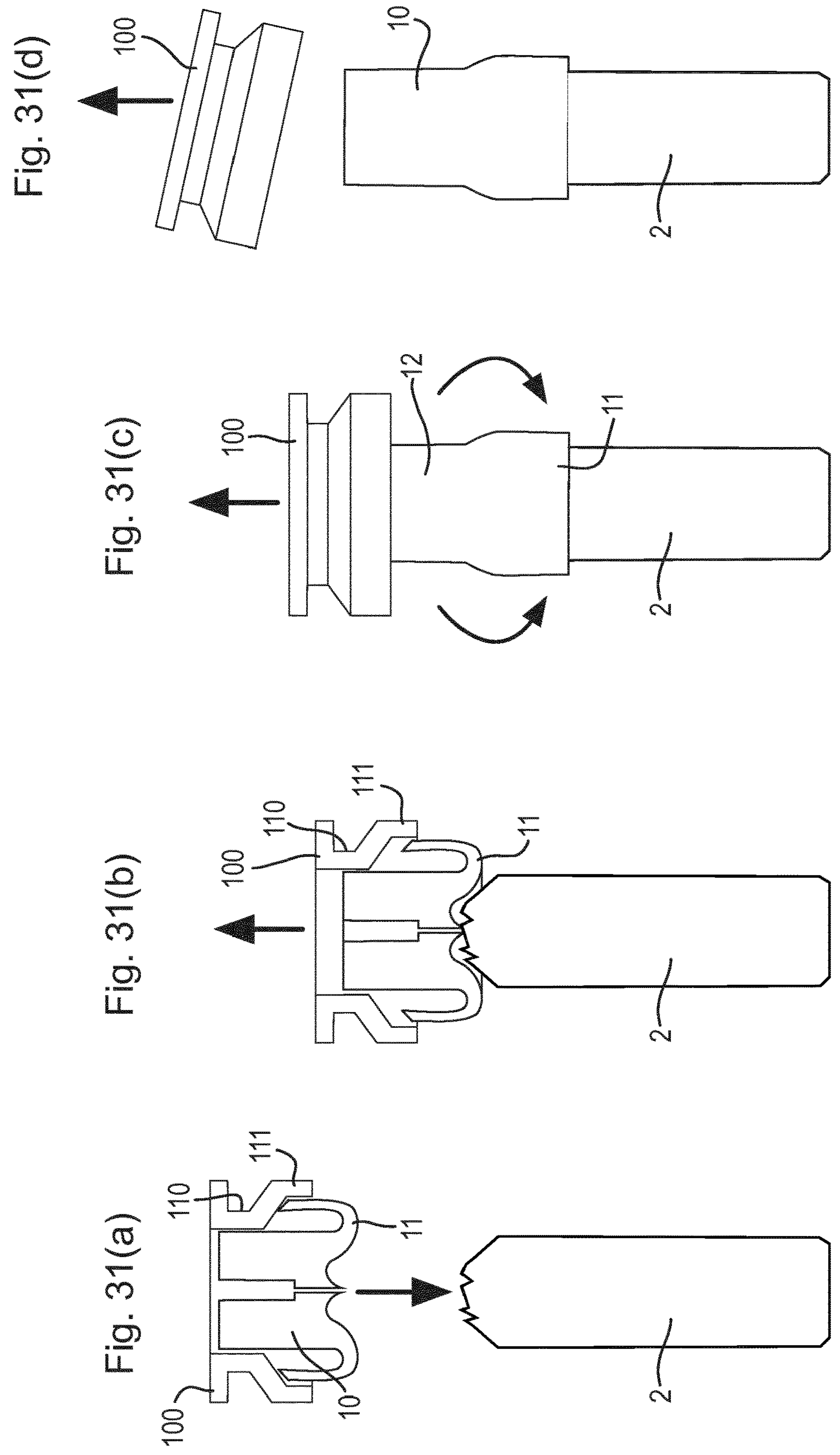

FIG. 31 shows an alternative dispenser 100 of simpler construction. The dispenser 100 of this example is formed as a simple ring with a narrow section 110 sized to fit around the cap portion 12 and a wider (greater diameter) portion 111 sized to hold the skirt portion in a folded back (or rolled back) position for storage, ready for deployment. FIG. 31(*a*) shows the dispenser 100 in the stored arrangement. FIG. 31(*b*) shows the closure 10 being applied to the ampoule body 2 and the dispenser 100 in the process of being removed. The closure 10 is held on to the ampoule body 2 by pushing on the closure 10 on its upper surface through the hole in the dispenser 100 while the dispenser 100 is removed upwards (i.e. past the upper surface of the closure 10). FIG. 31(*c*) shows the dispenser 100 being fully removed as the skirt portion 11 of closure 10 snaps down into the deployed position in sealing contact with the ampoule body 2 and FIG. 31(*d*) shows the dispenser 100 being fully removed for discard or reuse.

Figures 32A, 32B, 32C, 32D:
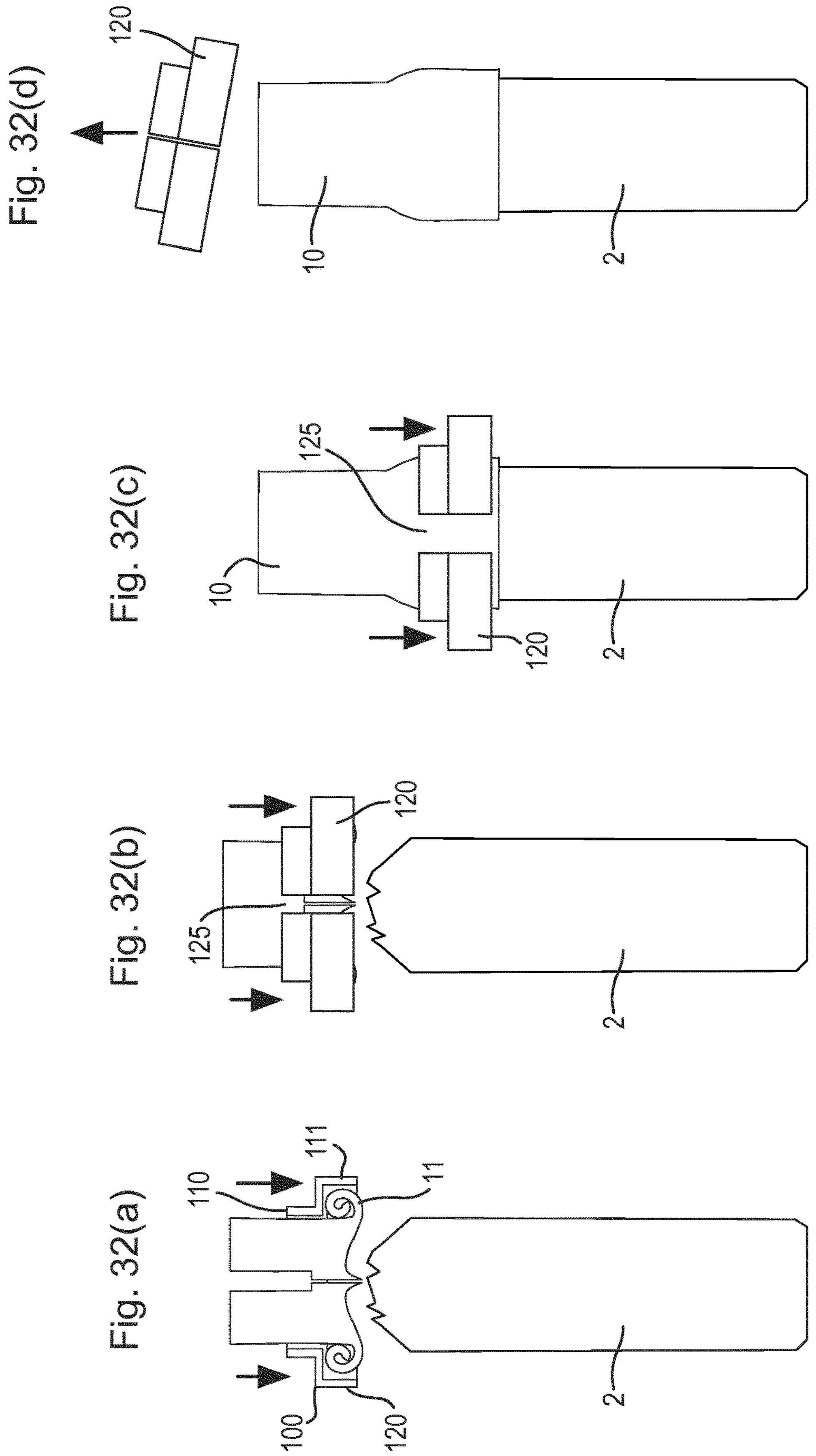
Figure 33:
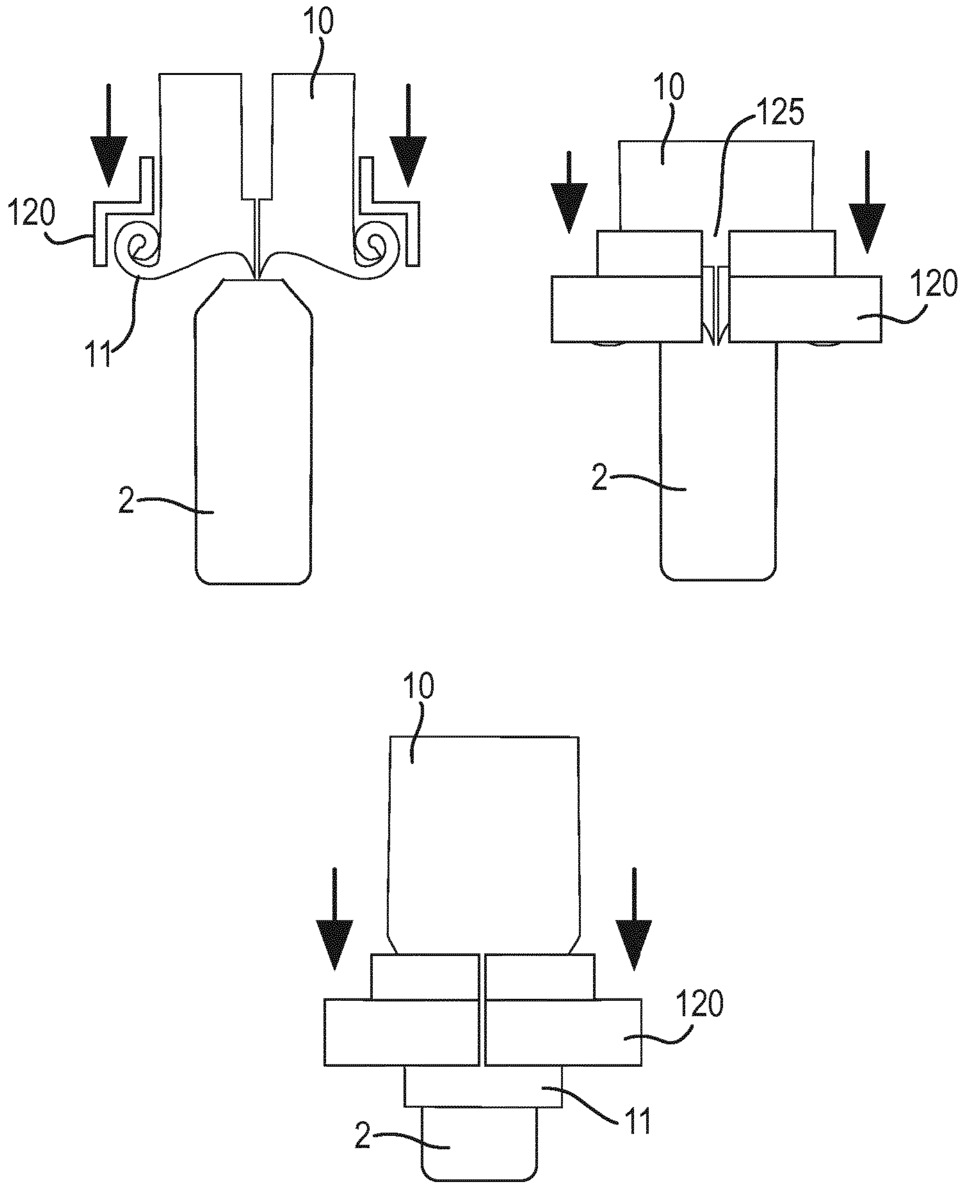

FIGS. 32 and 33 show alternative dispensers 100 in the form of a split ring 120. As shown in FIG. 32(*a*), the dispenser 100 is similar to that described in relation to FIG. 31, having a narrow diameter section 110 sized to contact the closure 10 and a wider (greater diameter) portion 111 sized to hold the folded or rolled up skirt portion 11 for storage, ready for deployment. The narrow section 110 of split ring 120 has a smaller natural (relaxed) diameter than the cap portion 12 such that the split ring 120 must be pried apart a small amount to fit over the cap portion 12, thus leaving a small gap 125 in the ring 120. The ring 120 thus provides a biasing force radially inwardly against the cap portion 12, thus holding the skirt portion 11 securely in position as shown in FIG. 32(*a*). In FIG. 32(*b*), the dispenser ring 120 and closure 10 are in the process of being applied to the ampoule body 2. As shown in FIG. 32(*c*), the split ring 120 can be used to help deploy the skirt portion 11 by helping to roll it out over the ampoule body 2. The increased diameter caused by spreading the skirt 11 over the ampoule body 2 is accommodated by the widening of the gap 125 of split ring 120. In FIG. 32(*d*) the split ring can be removed and discarded or reused.

FIG. 33 shows the split ring 120 being used on a smaller ampoule body 2. In this case, the biasing force of the split ring 120 aids in holding the skirt portion 11 onto the smaller ampoule body 2. For smaller ampoules, the biasing force of the skirt portion 11 may not be sufficient on its own as the skirt will be close to its fully relaxed position. However, with the additional force provided by the split ring 120, a good seal can be maintained. In this example the split ring 120 is not removed after deployment. In other examples, even for small ampoules, where the biasing force of the skirt portion 11 is enough to make a good seal, the split ring 120 can be removed as for larger ampoules.

Figure 34:
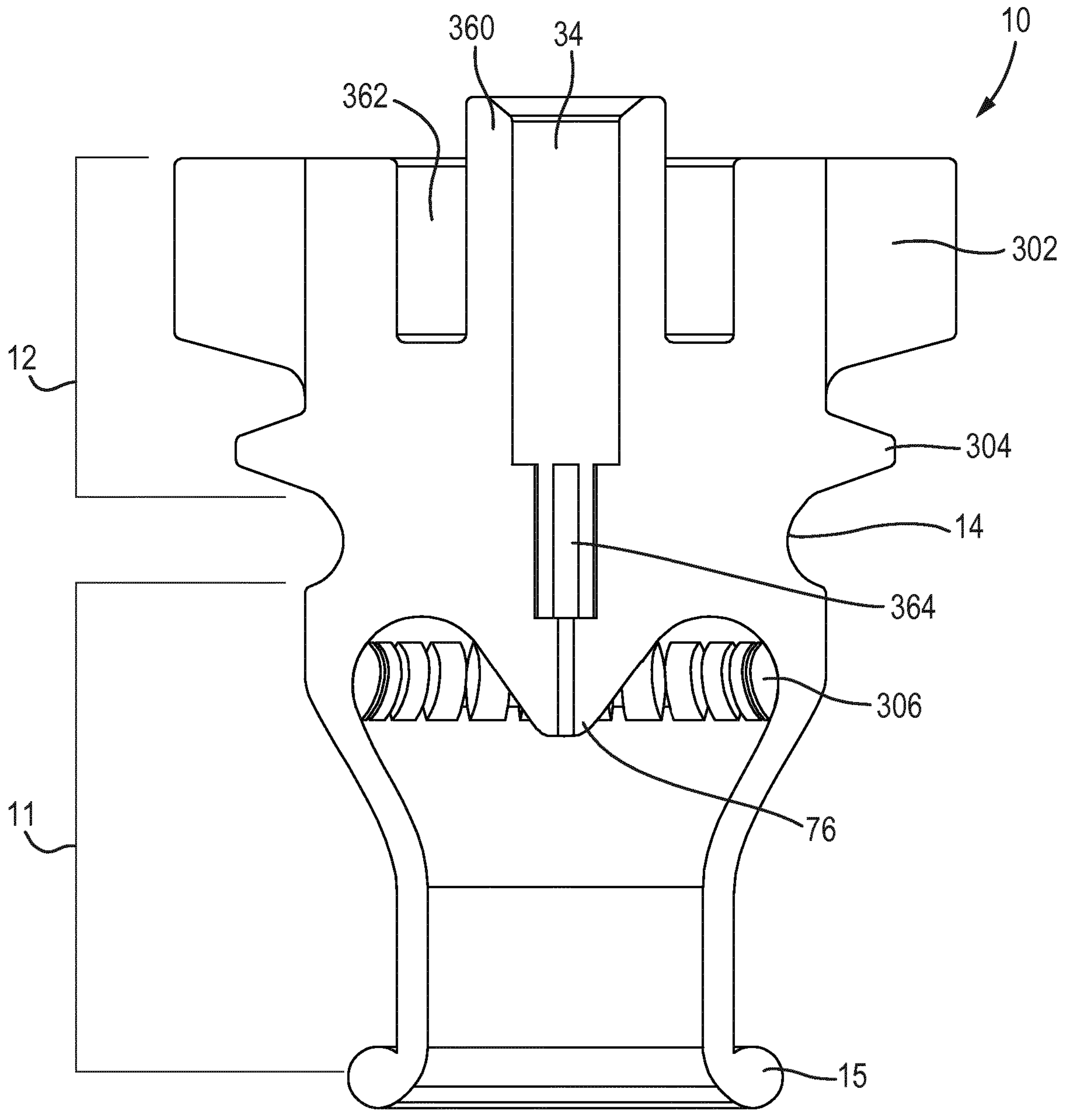
FIG. 34 shows a cross-section of another embodiment of a closure.

FIG. 34 shows a cross-section of another embodiment of a closure 10 with a number of additional features. The closure 10 has some wide ribs (or wings) 302 (also seen in FIGS. 51 and 52) on the cap portion 12 for providing the anti-roll function when the ampoule and closure are set down on their sides. The closure 10 also has a finger shield 304 for protecting the rolled up skirt portion 11 before deployment. The closure 10 also has an adapter ring 306 which facilitates deployment of the skirt portion 11 on different sized ampoules. These features will be further described below.

The closure 10 of FIG. 34 also has a number of the features which have already been described, including the enlarged rim 15 of the skirt portion 11, groove 14 for storing the rolled up skirt portion 11, the conic projection (or dome) 76 and Luer Lock connector 34. In FIG. 34 the Luer Lock connector 34 has a central hole (female luer part) to receive the central tip 360 (male luer part) of the Luer Lock type syringe and has a groove 362 surrounding that central tip 360 for receiving the threaded collar of the Luer Lock type syringe that surrounds the male tip, i.e. the threaded locking portion of a Luer Lock type syringe that engages with wings or threads on the female luer part to lock the two parts (male and female) together. A stopper 364 prevents over-insertion of the syringe tip. In FIG. 34 the groove 362 is formed integrally with the rest of the cap portion 12 and does not have any threads formed therein for engagement with the threads on the collar of a Luer Lock syringe. Instead, the groove 362 merely accommodates the structure (i.e. the collar and threads) of the Luer Lock syringe, allowing it to fit neatly onto the cap portion 12 when the male tip part is inserted into the female part. It will of course be appreciated that threads could be formed in the groove 362 for engagement with the Luer Lock syringe for a more robust, threaded connection.

Figure 35A:
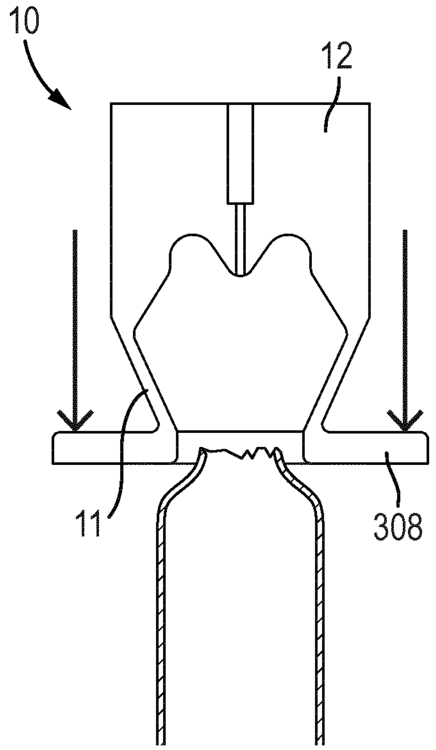
FIG. 35 shows a variant of a push-on type skirt.
Figure 35B:
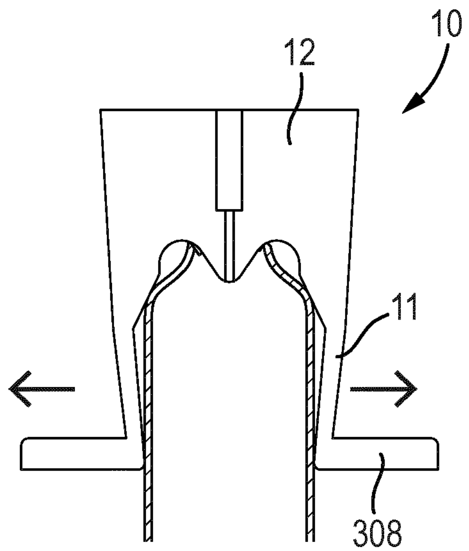

FIG. 35 shows a variant of a push-on type skirt similar to FIG. 27, but with the skirt portion 11 formed from a flexible material that can expand at least radially so that it can provide a good grip against the outer surface of ampoules of different sizes. FIG. 35 shows that the skirt 11 in this embodiment tapers radially inwards away from the cap portion 12 such that the inner diameter at the end of the skirt portion 11 is smaller than the outer diameter of the ampoule body 2. FIG. 35(*a*) shows the closure 10 prior to application while FIG. 35(*b*) shows the closure 10 in place on the ampoule body 2 with the skirt portion 11 duly radially expanded to fit on the ampoule body 2. The closure 2 also has a brim 308 extending radially outwardly from the distal end of the skirt portion 11 to form a push-surface by which the closure 10 can be pressed over the ampoule body 2, e.g. using fingers.

Figure 36A:
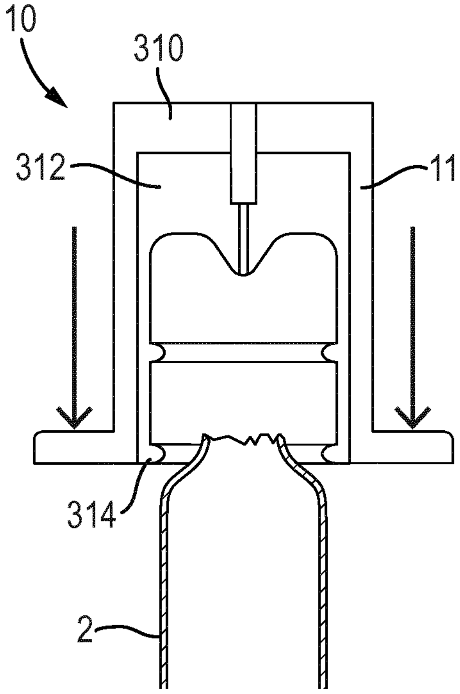
FIG. 36 shows another variant of a push-on type skirt.
Figure 36B:
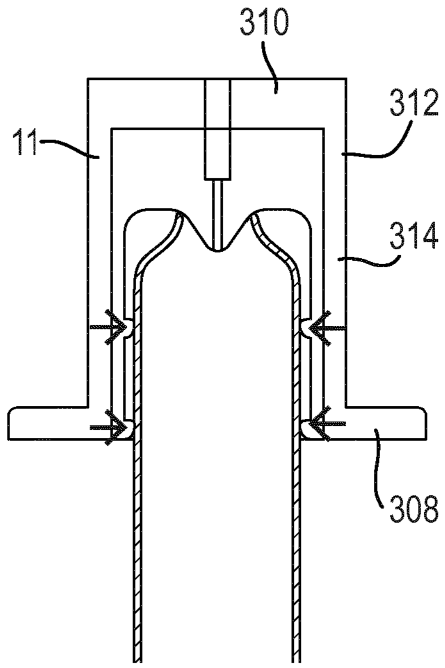

FIG. 36 shows another variant of a push-on type skirt closure. This embodiment has a rigid outer housing 310 with a soft, deformable (e.g. elastic) material 312 provided on the inside thereof. The soft material 312 provides grip through friction against the outer surface of the ampoule body 2, thus holding the closure 10 against the broken neck after it has been pushed on. FIG. 36(*a*) shows the closure 10 just before pressing onto the ampoule body 2 while FIG. 36(*b*) shows the closure deployed onto the ampoule body 2. Flexible ribs 314 are formed on the inside of the skirt portion 11 extending towards the ampoule body 2 so as to provide grip and also allowing the closure 10 to accommodate a small variation in the size of the ampoule body 2.

Figure 37A:
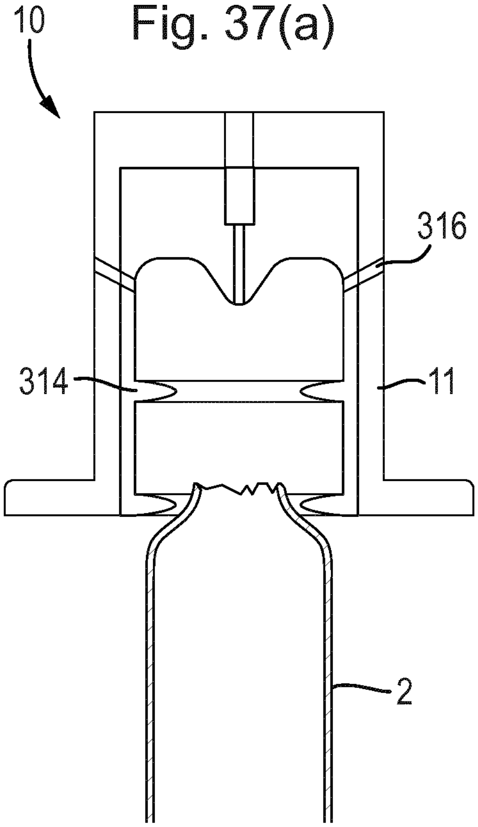
FIG. 37 shows another variant of a push-on type skirt with larger ribs.
Figure 37B:
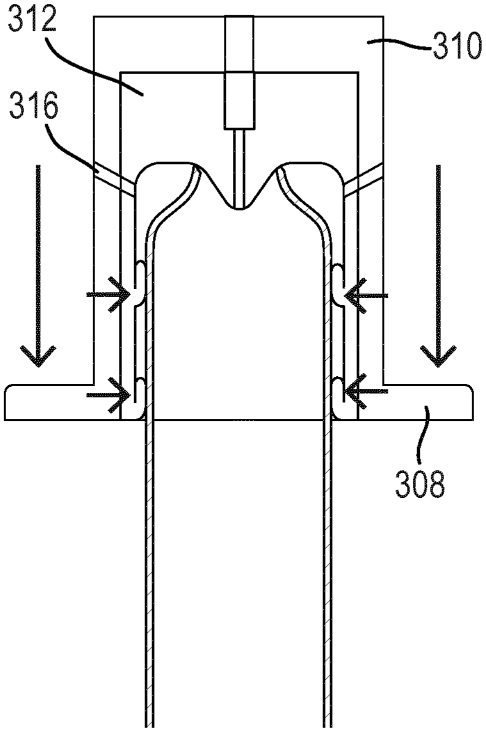

FIG. 37 shows a variant of FIG. 36 with larger ribs 314 in the form of lamellae.

Figure 38:
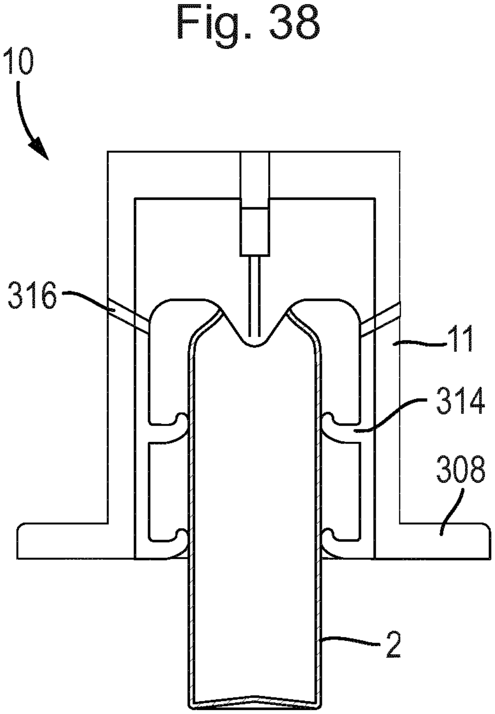
FIG. 38 shows the closure of FIG. 37 on a smaller ampoule.

These lamellae 314 can accommodate a greater range of ampoule sizes. FIG. 37(*a*) shows the closure 10 before installation, FIG. 37(*b*) shows the closure 10 installed on a large ampoule body 2. FIG. 38 shows the same closure 10 installed on a smaller ampoule body 2. It can be seen that the lamellae have bent less against the smaller ampoule body 2, but are still deflected upwards, towards the broken neck by the process of applying the closure 10. This ensures that the frictional forces maintain a pull down of the closure 10 onto the neck of the ampoule body 2 to maintain sealing.

FIGS. 37 and 38 also show an additional feature of air canals 316 that connect the inside of the skirt portion 11 with the outside of the closure 10. These air canals 316 allow air to escape from inside the skirt portion 11 during the process of pressing the closure 10 onto the ampoule body 2 and thereby avoiding a build up of air pressure inside the skirt portion 11 which could otherwise bias the closure away from the neck of the ampoule body 2 (which could reduce the sealing effectiveness).

Figure 39:
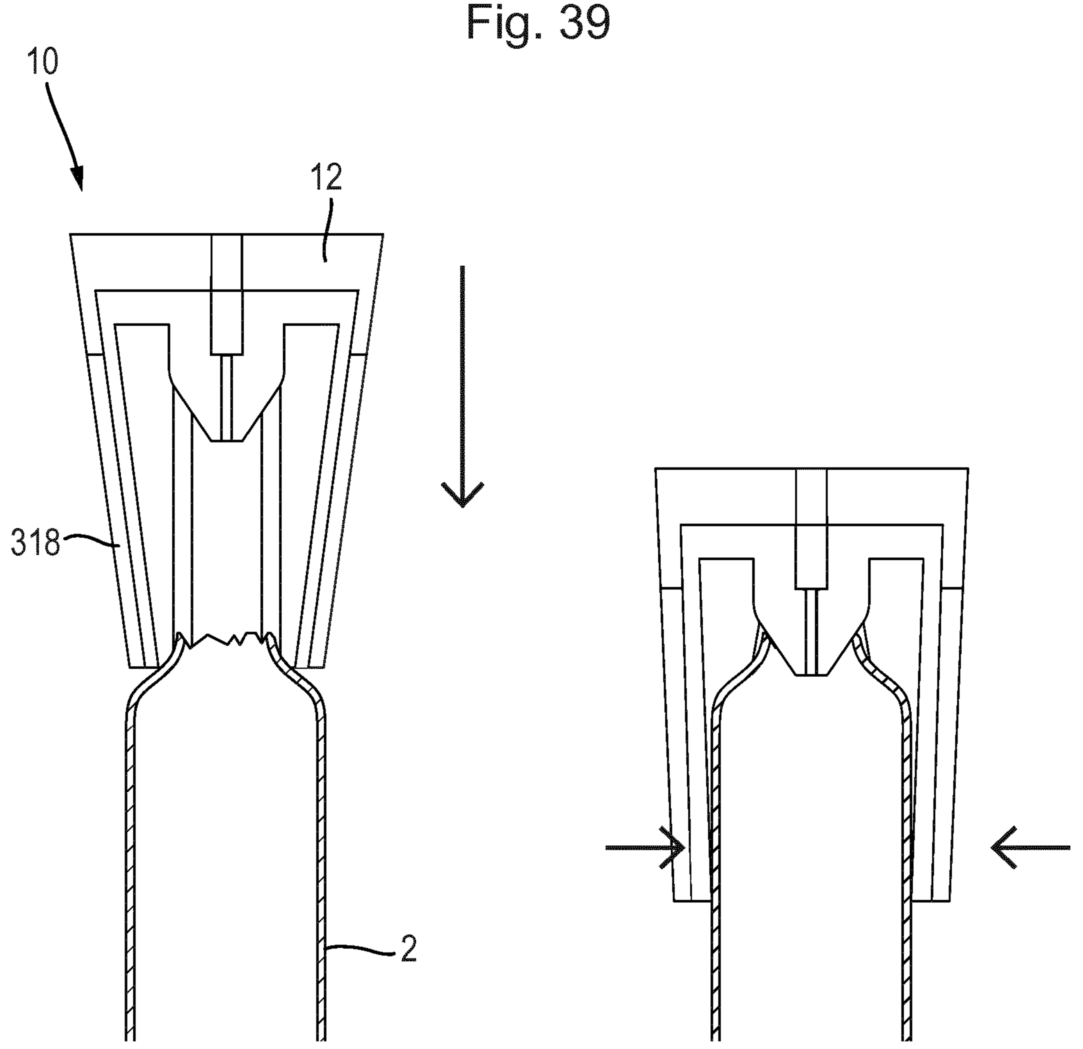
FIG. 39 shows another variant of a push-on type closure.

FIG. 39 shows a variant of a push-on type closure 10 which has a number of stiff gripping fingers 318 extending axially down the ampoule body 2, each finger 318 being capable of radial deflection (e.g. by bending or pivoting on the cap portion 12). As with the variant of FIG. 35, the inner diameter at the distal end (in its natural, non-stretched or deformed state) is smaller than the target ampoule outer diameter, but when pressed onto the ampoule body 2 the fingers separate radially outwardly to accommodate the outer diameter of the ampoule body 2.

Figure 40:
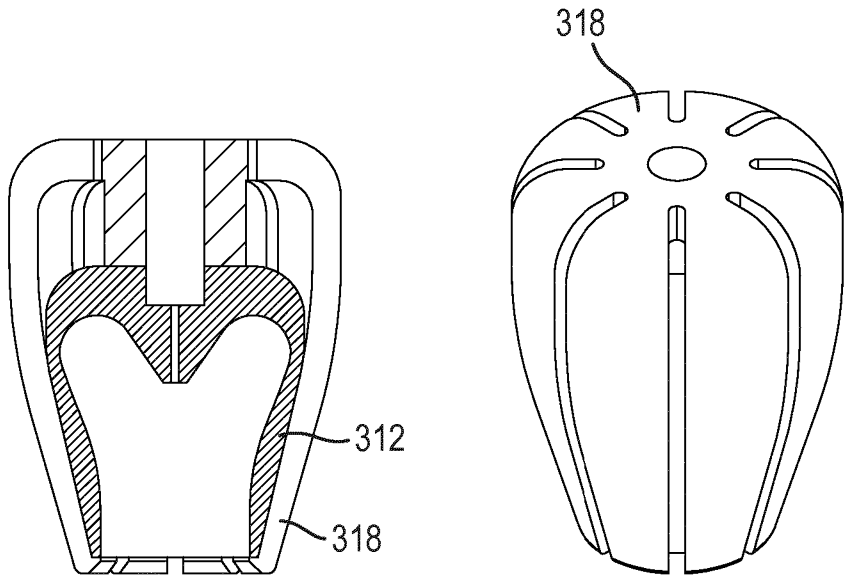
FIG. 40 shows a variant of the closure of FIG. 39.
Figure 41:
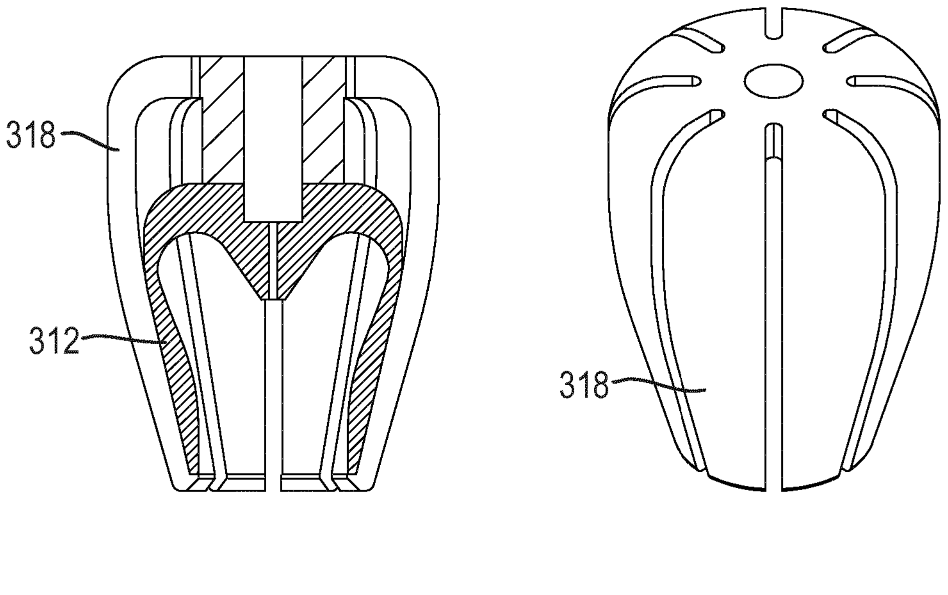
FIG. 41 shows a variant of the closure of FIGS. 39 and 40.

FIG. 40 shows a first variation of FIG. 39 in which the inner soft material 312 inside the fingers 318 forms a complete cylindrical skirt for contact and sealing against the ampoule body 2 (i.e. the soft material 312 is not formed into separate fingers). The second variation shown in FIG. 41 has the soft material 312 formed into fingers, i.e. the soft material 312 is only formed on the inner surfaces of the fingers 318. This embodiment does not necessarily form a seal against the outer diameter of the ampoule body 2 at the point of gripping, but a seal is still formed against the broken neck.

Figure 42A:
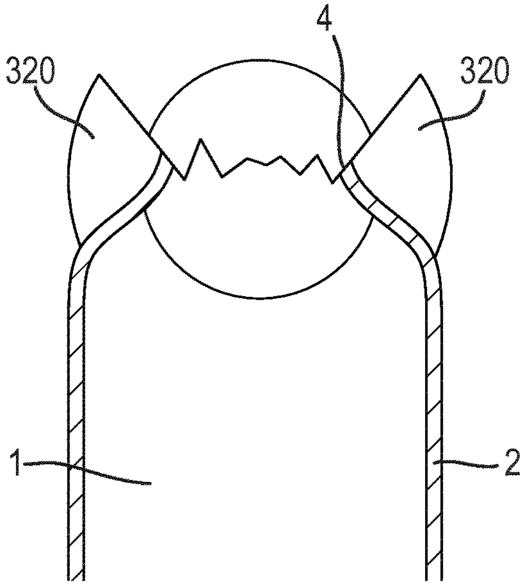
FIG. 42 illustrates the sterile and non-sterile areas of a broken ampoule body.
Figure 42B:
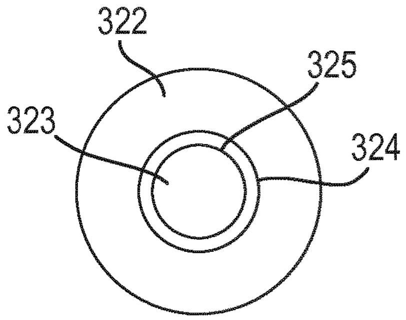

FIG. 42 illustrates the areas of a broken ampoule body 2 (with the top part 3 removed) with a broken neck 4. The ampoule 1 is sterile inside, but may have been contaminated on its outer surface. Therefore it is important if the ampoule is to be reused (e.g. stored for later when it may be further emptied or fully emptied) to prevent any of the contents from coming into contact with any outer surface of the ampoule body 2 in case such contact draws contaminants back into the interior of the ampoule. In FIG. 42(*a*) the diagonal lines that cross the broken neck 4 show the divide between the sterile and non-sterile regions. The shaded area 320 illustrates that everything outside of those lines (they are lines in two dimensions, but are representative of a cone in three dimensions) is non-sterile, while everything between the lines is sterile. Another way to view this is that the ampoule body 2 has a certain thickness which is broken at the neck 4 and therefore the broken neck 4 has a certain thickness itself, separating the inner surface of the ampoule from the outer surface of the ampoule (it may be noted that this particular neck region is often thinner than the rest of the ampoule body 2 to facilitate breaking). The inner surface of the ampoule up to the inner edge of the broken neck is sterile, the surface of the broken neck itself is sterile (as it was previously part of the wall), while everything on the outer surface of the ampoule up to the outer edge of the broken neck is non-sterile. To from a sterile seal on the ampoule, sealing contact must be made around the full circumference of the broken neck against the sterile surfaces, i.e. internally of the outer edge of the broken neck. FIG. 42(*b*) shows a top down view of a broken ampoule with the outer surface (non-sterile) shown at 322, the inner surface (sterile) shown at 323. The outer edge of the broken neck is shown at 324 and the inner edge of the broken neck is shown at 325. The broken region between the inner edge 325 and the outer edge 324 is also sterile and can be used for forming a sterile seal.

Figure 43A:
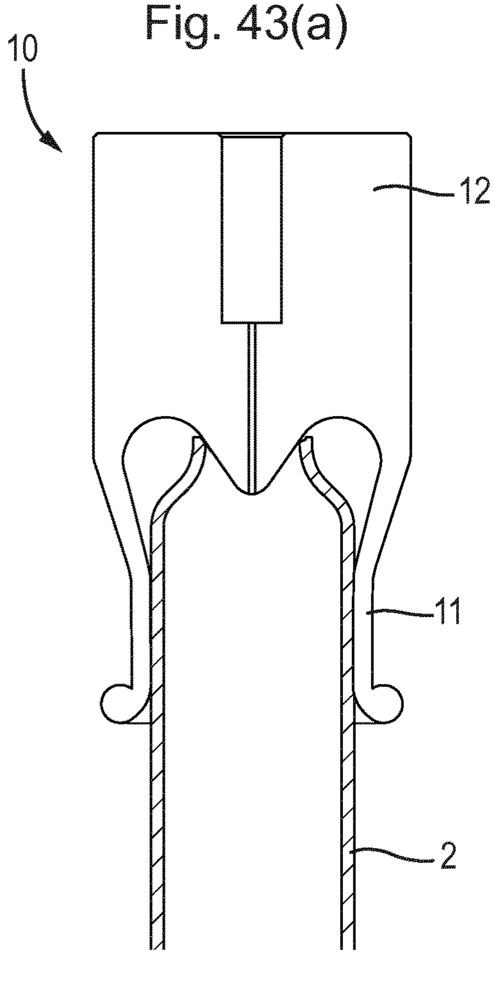
FIG. 43 shows a roll-type closure used on different sized ampoules.
Figure 43B:
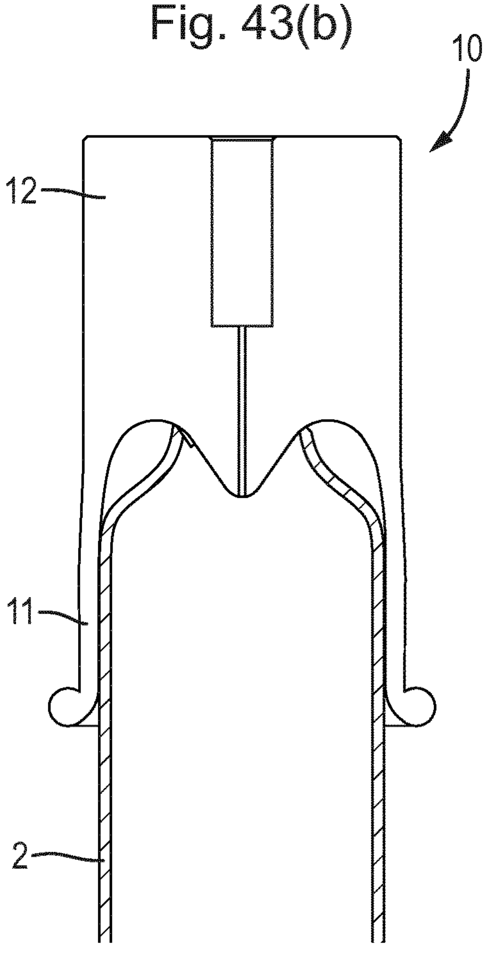
Figure 44A:
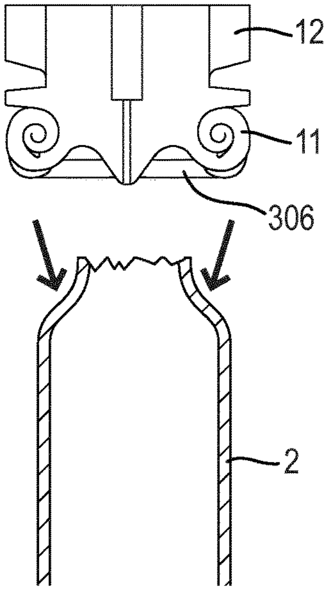
FIG. 44 shows an adapter ring providing a support projection for adapting to different sized ampoules.
Figure 44B:
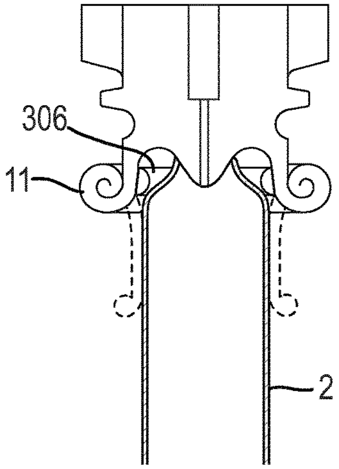
Figure 44C:
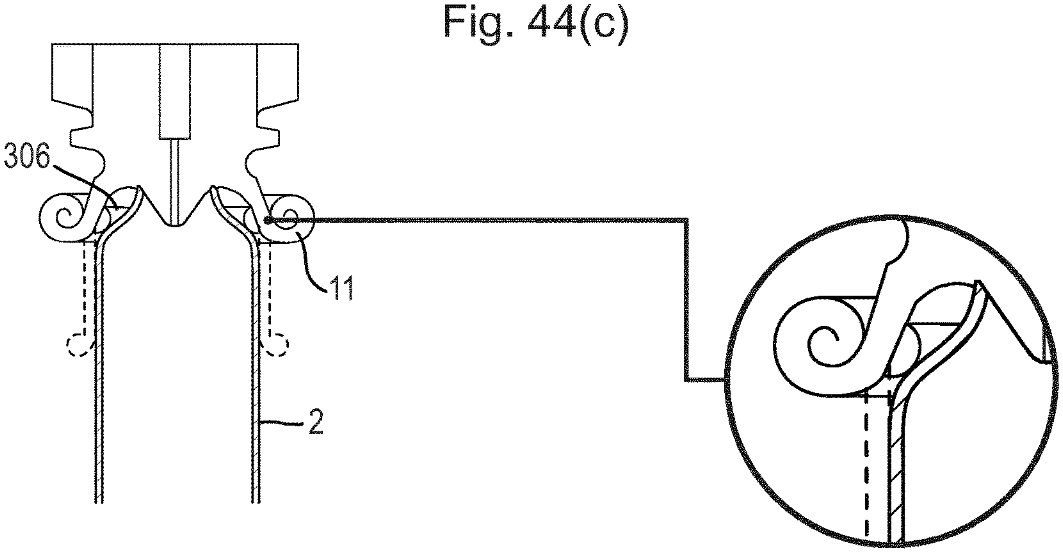
Figure 44D:
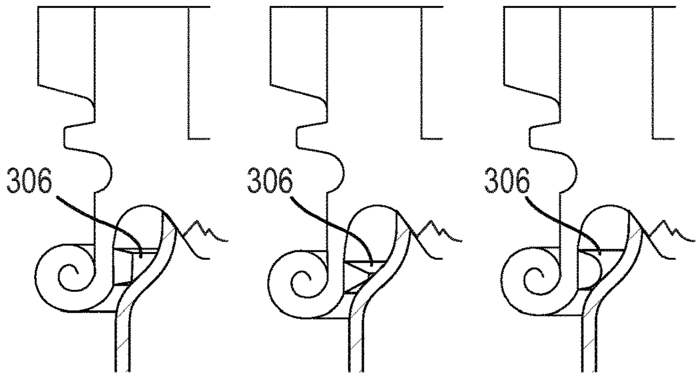
Figure 44E:
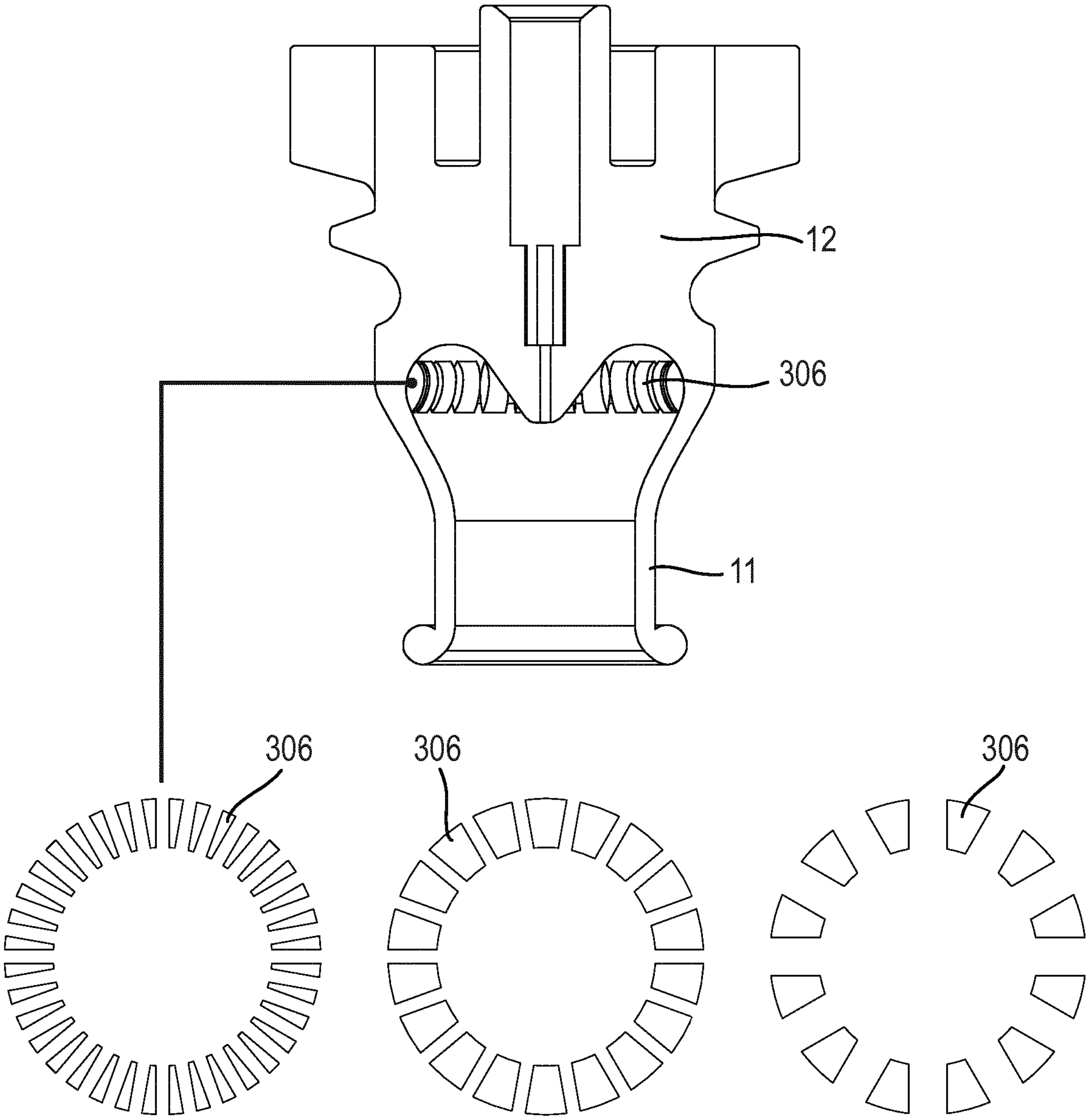

FIG. 43 shows a roll-type closure 10 (i.e. with a flexible skirt portion 11 that can be rolled up prior to deployment and rolls down onto the outer surface of the ampoule body 2 during deployment). FIG. 43(*a*) shows the closure 10 applied to a small diameter ampoule body 2, while FIG. 43(*b*) shows the same closure 10 applied to a larger diameter ampoule body 2. It can be seen that the flexibility of the elastic skirt portion 11 can accommodate a wide range of ampoule sizes.

FIG. 44 shows an adapter ring 306 provided on the inner surface of the skirt portion 11. FIG. 44(*a*) shows the skirt portion 11 in the rolled-up (first) position such that the adapter ring 306 is essentially on the bottom surface of the cap portion 12. The adapter ring is a projection from the inner surface of the skirt portion 11 that helps to ensure that the skirt portion 11 can roll out quickly and easily over larger diameter ampoules as well as smaller diameter ampoules. FIG. 44(*b*) shows the closure 10 being installed onto a small diameter ampoule and FIG. 44(*c*) shows the same closure 10 being installed onto a larger diameter ampoule. It can be seen from FIG. 44(*b*) that when the closure 10 is deployed on a small ampoule, the adapter ring 306 does not interfere with the ampoule shoulder or body 2 and does not interfere with the normal unrolling motion of the skirt portion 11 which narrows slightly as it deploys until it contracts onto the outer surface of the ampoule body 2. By contrast, in FIG. 44(*b*), with the wider ampoule body 2, the adapter ring 306 comes into contact with the shoulder of the ampoule body 2 early on in the deployment of the skirt portion 11. The effect of this is to act as a support projection to hold the diameter of the skirt portion 11, preventing it from contracting early and onto the shoulder which can hinder further unrolling. In the absence of the adapter ring 306, the contracted skirt portion 11 would require further encouragement to re-expand over the shoulder before final unrolling proceeds unhindered. With the adapter ring 306, the skirt portion 11 does not contract above the shoulder and can unroll unhindered (and automatically, once it leaves the groove 14) onto the outer surface of the ampoule body 2, effecting the 'snap' deployment. FIG. 44(*d*) shows some alternative cross-section profiles for the adapter ring 306, illustrating that it does not need to fill the space above the shoulder of the ampoule body 2 so long as it provides radial support to the skirt portion 11 (i.e. in the form of a plurality of support projections).

The adapter ring 306 need not be a full, solid ring and indeed is preferably a set of projections formed into a ring shape. It is only necessary to provide enough support to prevent the shoulder from hindering the 'snap' deployment and therefore a single projection may be enough in some examples. However, some preferred embodiments of the adapter ring 306 are shown in FIG. 44(*e*) illustrating how the adapter ring 306 is preferably formed from a number of individual projections arranged around in a circle. The individual projections may vary greatly in number and in the spacing between them. As shown, the projections are preferably tapered towards the centre of the circle, e.g. as if they were formed by making radial cuts through a circular ring. The use of a smaller number of individual projections (as opposed to a solid adapter ring) reduces the tension that is introduced on the skirt portion 11 by the adapter ring 306, thus making it easier to roll up the skirt portion 11 and retain it in the groove 14. The tapering allows the projections to come together evenly when the skirt portion 11 rolls out and contracts onto a smaller ampoule.

Figure 45A:
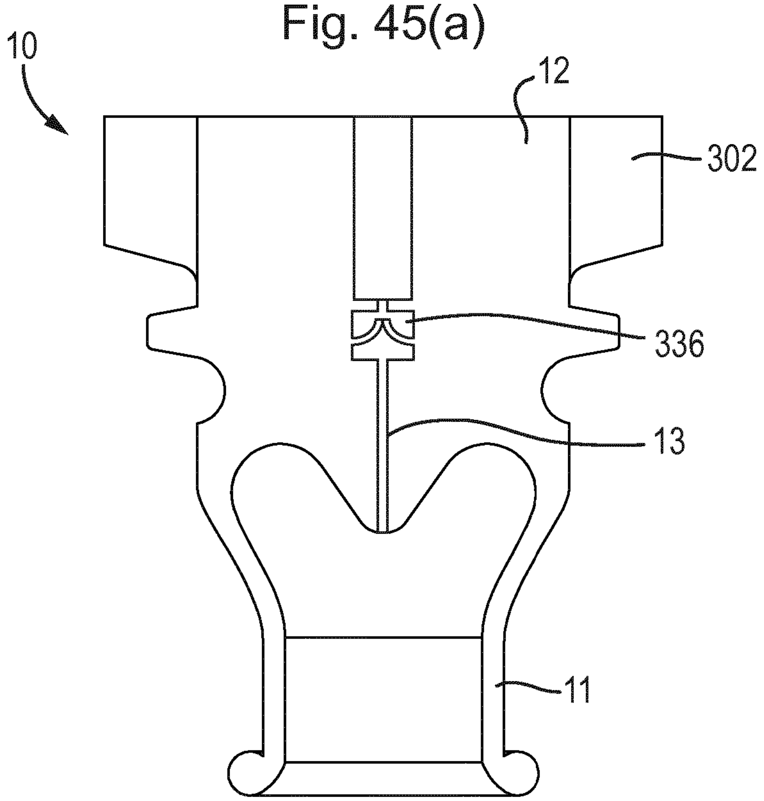
FIG. 45 shows a one-way valve to prevent backflow of extracted content.
Figure 45B:
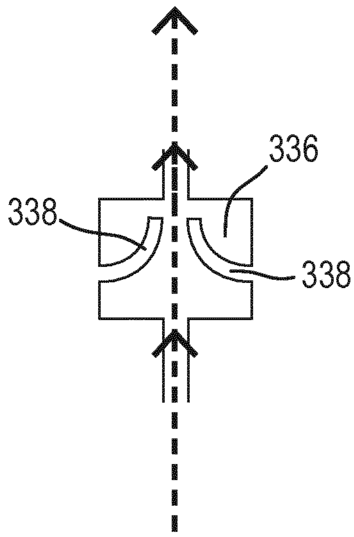
Figure 45C:
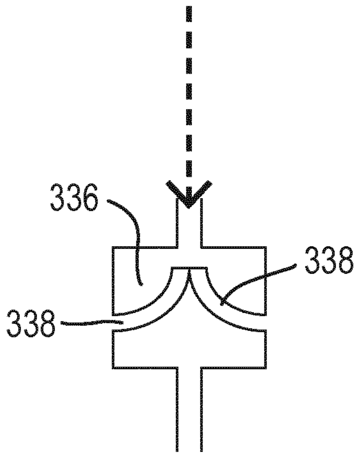
Figure 46A:
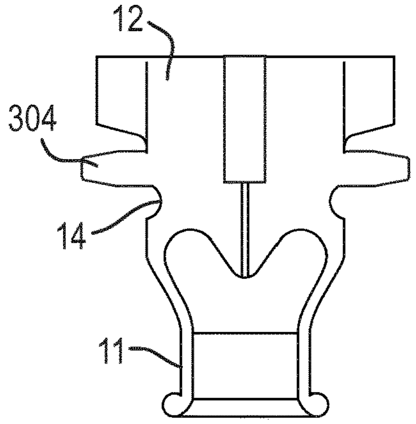
FIG. 46 shows a shield that protects a rolled-up skirt portion.
Figure 46B:
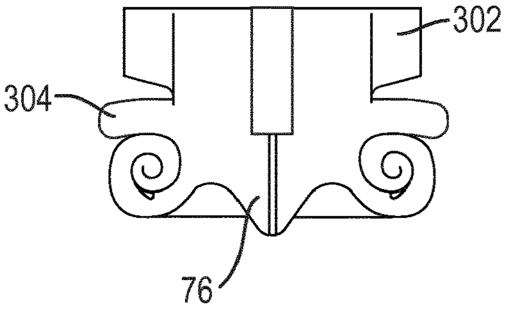
Figure 46C:
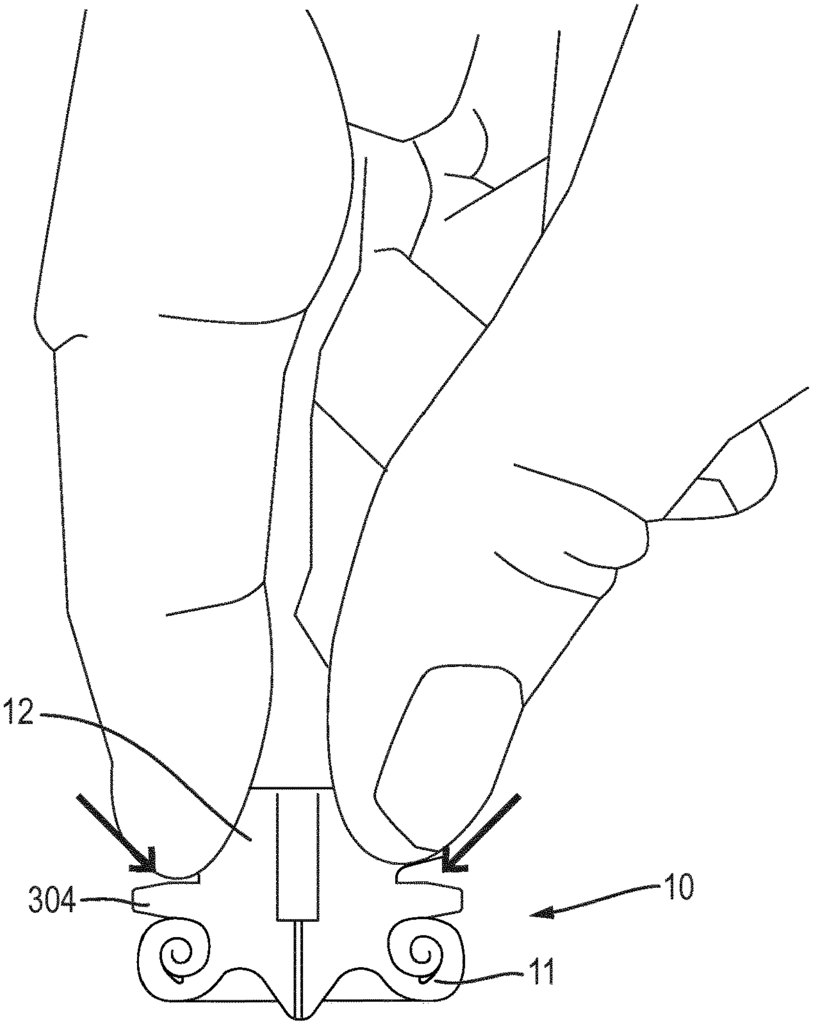
Figure 46D:
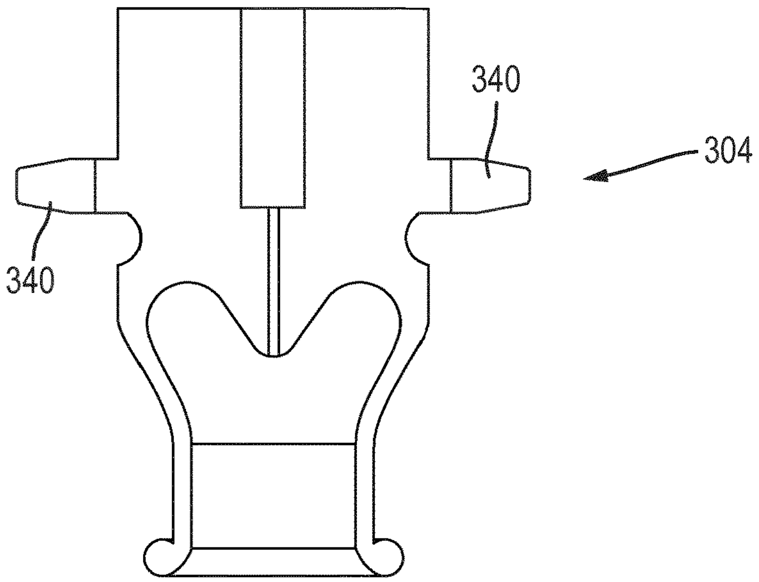
Figure 46E:
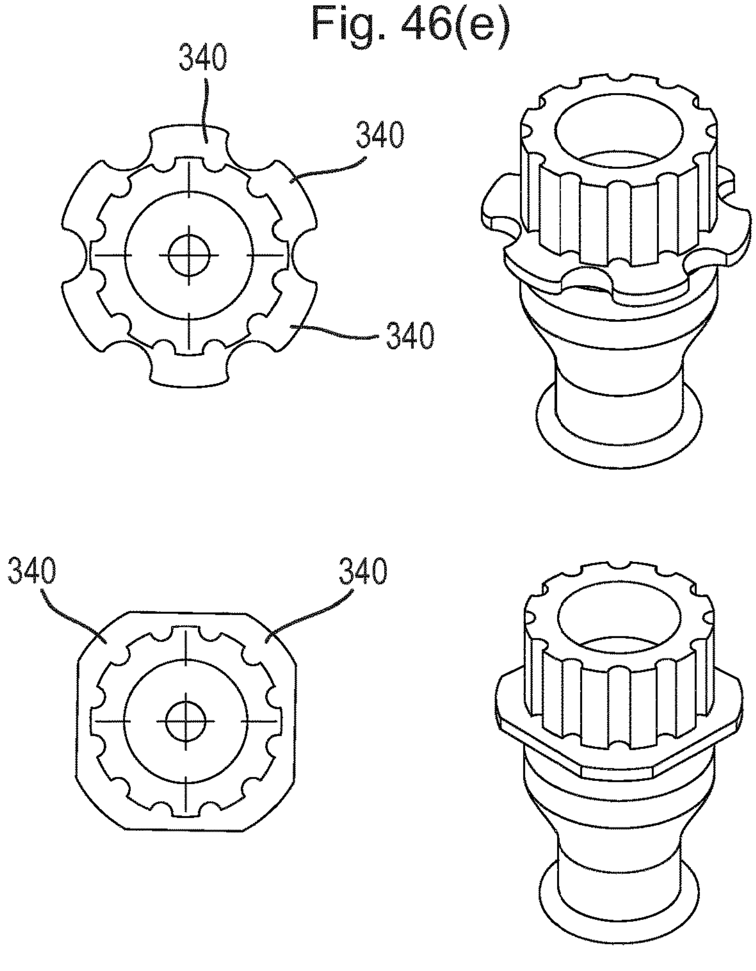

FIG. 45 shows a one-way valve 336 that may be provided in the content transfer channel 13. The one-way valve 336 allows content to be extracted from the ampoule body 2, while preventing transfer in the opposite direction. FIG. 45(*a*) shows the valve 336 in place in the closure 10. The valve 336 may be integrally formed as part of the closure 10 or it may be formed as a separate part that can be inserted into a corresponding cavity formed in the cap portion 12. FIG. 45(*b*) shows a close-up of the valve 336 in an open condition with fluid flowing through and FIG. 45(*c*) shows the valve 336 in a closed condition with backflow prevented. The valve 336 is formed from two opposing flaps 338 angled in the direction in which flow is to be permitted (shown by the dashed arrow in FIG. 45(*b*)). The flow presses on the flaps 338 pushing between them and parting them. In FIG. 45(*c*) flow in the opposite direction presses the flaps 338 together causing them to seal against one another, preventing flow.

FIG. 46 shows a shield 304 that protects the rolled-up skirt portion 11 from being accidentally released by any force other than the intended force to press the closure 10 onto the ampoule body 2. The shield 304 may be formed as a ring around the cap portion 12 and is positioned just above the skirt portion 11 (i.e. closer to the top surface of the cap portion. FIG. 46(*a*) shows the skirt portion in the deployed (second) position, showing the skirt portion 11 in its natural, non-stretched position with a narrower internal diameter than the target ampoule. With the skirt portion 11 in this position, not on an ampoule body 2, it is quite difficult to roll the skirt portion 11 back up into the groove 14. Also, attempting to do so may compromise the sterility of the projection 76 that is for contact with the contents of the ampoule. This accidental deployment of the skirt portion 11 is inconvenient and may render the device unusable, particularly in medical applications where sterility and speed of use are important. As the closure is typically picked up and applied by gripping the cap portion 12 between the user's fingers, the shield 304 protects the rolled-up skirt 11 from the fingers and protects against accidental deployment of the skirt portion 11 before the closure 10 has been duly placed onto the target ampoule. FIG. 46(*c*) shows the closure 10 gripped between two fingers and with the shield 304 intervening between the fingers and the skirt portion 11. It may be noted in FIGS. 46(*a*) and (*b*) that the anti-roll ribs or wings 302 in this embodiment are relatively thin and flexible and while their full width is visible in the cross-section of FIG. 46(*a*), they can easily be bent or squeezed by the fingers in use (their shape can be seen better in FIG. 51(*b*)).

FIGS. 46(*d*) and (*e*) show variations of the shield 304 in which the shield 304 also provides an anti-roll function by being formed to be non-round. For example the shield 304 may be formed as a number of shield projections 340 with cut-outs between them so that when placed on a flat surface the closure 10 is hindered from rolling.

Figure 47A:
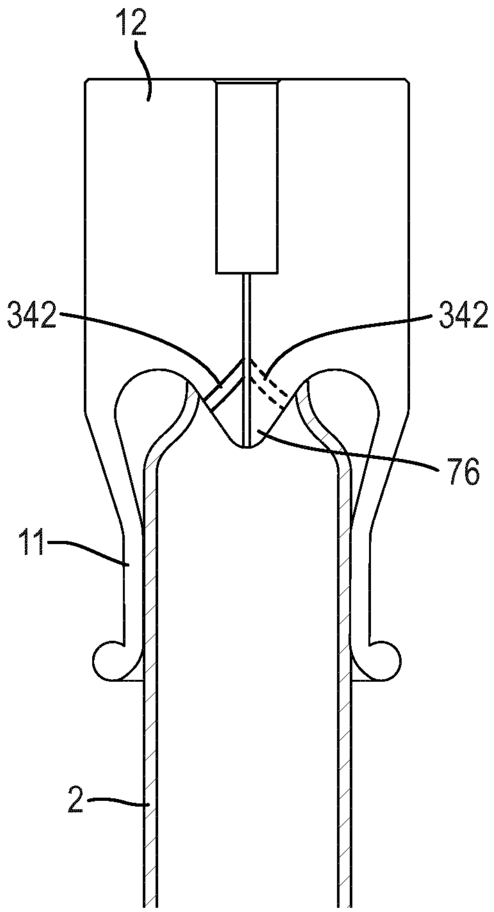
FIGS. 47 and 48 show ways of increasing content extraction from an ampoule.
Figure 47B:
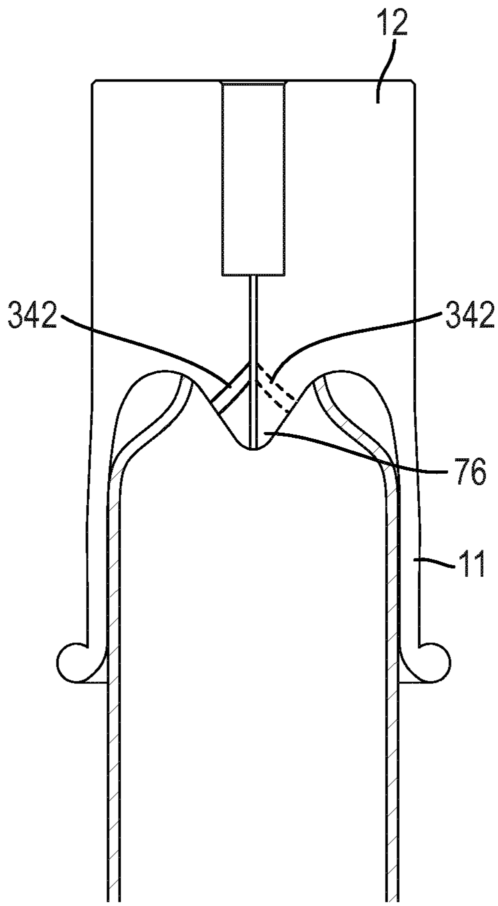
Figure 48A:
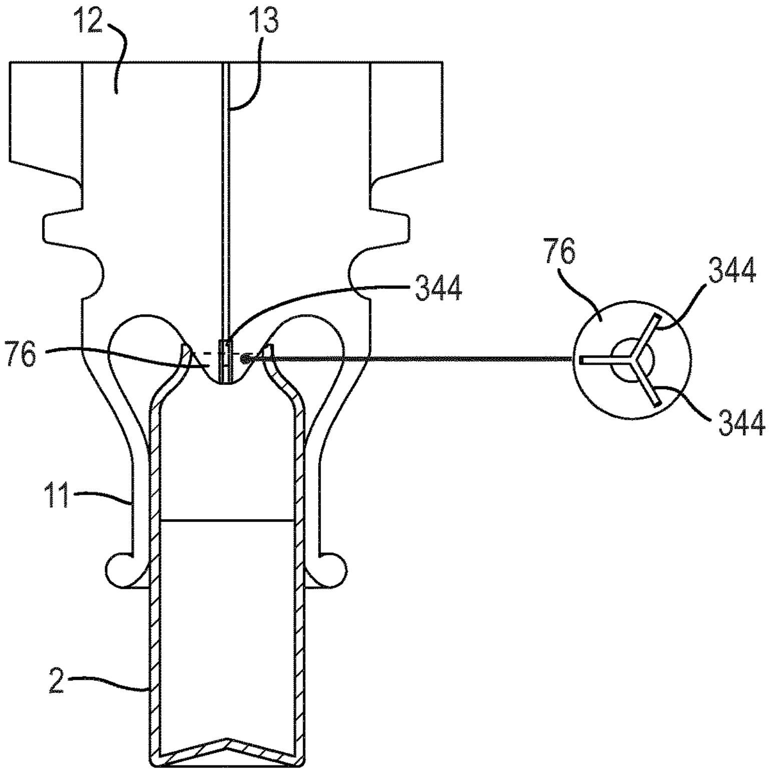
Figure 48B:
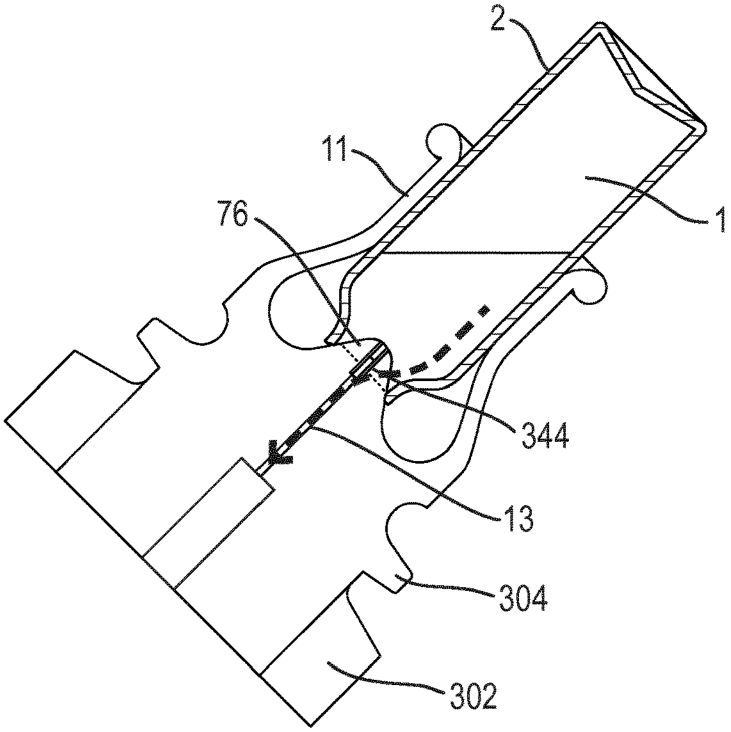
Figure 49A:
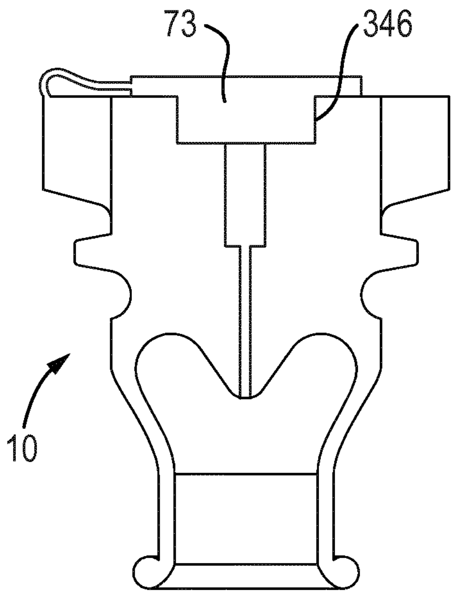
FIG. 49 shows alternative arrangements for a closure lid.
Figure 49B:
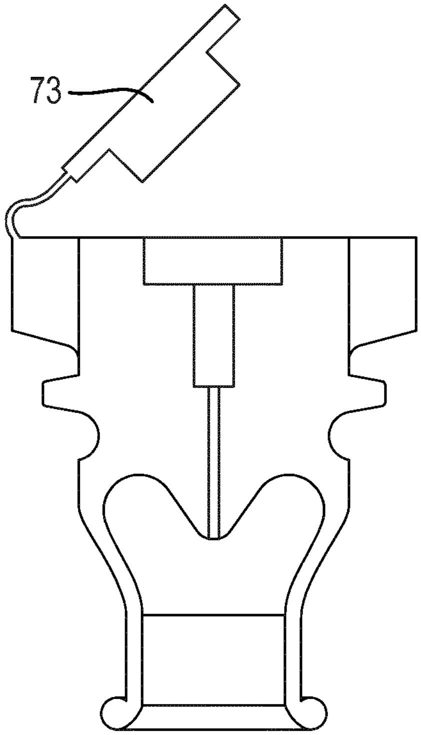
Figure 49C:
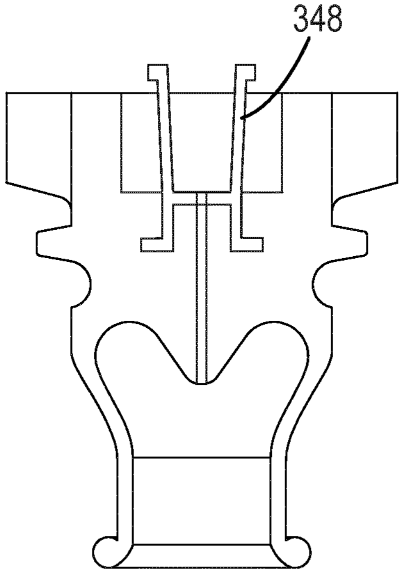
Figure 49D:
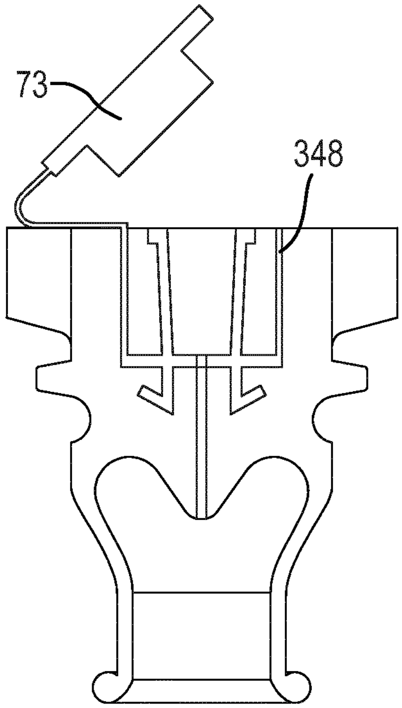

FIGS. 47 and 48 show ways of increasing the amount of content that can be extracted from the ampoule. The problem is best illustrated in FIG. 48(*b*) which shows an ampoule body 2 inverted for liquid extraction through the channel 13. However as the entrance to the channel 13 is at the tip of the conic projection 76, it is above the lowest level at which content can be situated, thus not all of the content can be extracted leading to a small amount of potential wastage. FIG. 47 shows a solution to this problem in the form of through holes 342 which may be bores through the side of the projection 76. These through holes 342 connect the channel 13 to points on the surface of the projection 76 that, when inverted, will be lower than the point at the tip of the projection 76 and thus allow more of the ampoule's contents to reach the channel 13. FIG. 47(*a*) shows the projection 76 engaging with a smaller ampoule with a narrower neck opening, while FIG. 47(*b*) shows the projection 76 engaging with a larger ampoule with a wider neck opening. It can be seen that the wider neck opening allows the projection 76 to be inserted further into the ampoule body 2 such that the through holes 342 are inserted further from the seal inside the neck. FIG. 48 shows an alternative to through holes 342 in the form of gullies or cuts or trenches 344 in the projection 76, i.e. slits that extend from the tip of the projection down the side of the projection 76 and thus provide elongated entrances to the channel 13. A plurality of such gullies 344 may be provided around the channel 13, e.g. three as shown in FIG. 48(*a*) at 120 degree intervals. The axial extent of the gullies is shown by the shaded section of the conic projection 76 in FIGS. 48(*a*) and (*b*).

FIG. 49 shows some alternative arrangements for providing a lid on the closure 10, similar to FIG. 23. FIG. 49(*a*) shows a lid 73 that is part of the moulding (i.e. it is formed integrally with the closure 10 and from the same material) and fits into the upper surface of the closure 10 by an interference fit in a recess 346 in the top of the closure 10. FIG. 49(*b*) shows a hinged lid 73. FIG. 49(*c*) shows a closure 10 with a syringe connector as a separate component 348 inserted into the closure 10. FIG. 49(*d*) shows a hinged lid 73 that is part of the closure 10 (e.g. integrally moulded) and can be press-fit (e.g. interference fitted) to the connector component 348.

The lids may be colour coded to indicate certain properties of the closure such as seal type, filter type, presence of valve, etc.

Figure 50A:
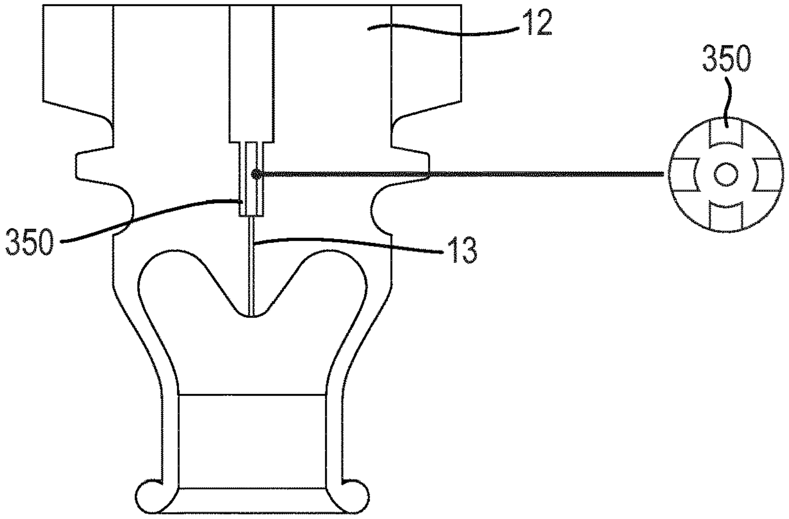
FIG. 50 shows a stopper to define an insertion level of a syringe.
Figure 50B:
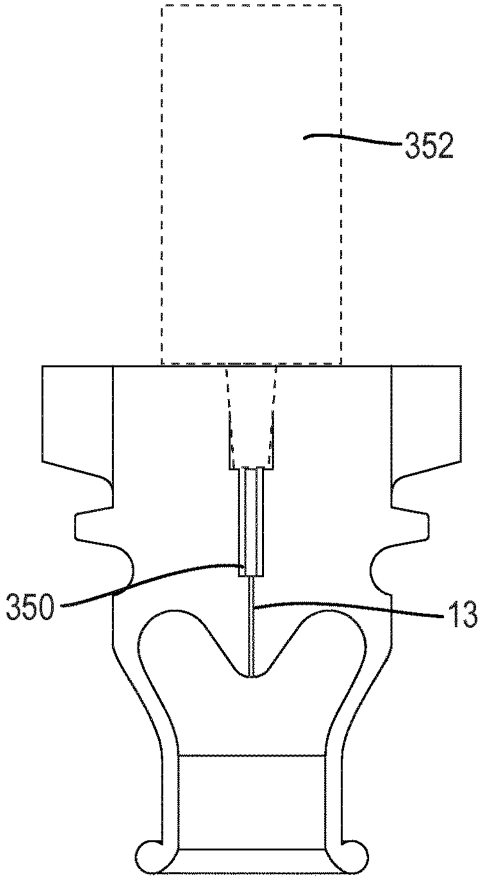

FIG. 50 shows a stopper or shoulder 350 that is provided in the cap portion 12 of the closure 10 to define the insertion level of a syringe 352 (shown in FIG. 50(*b*) in dotted line) or other connector or content extraction device. This may include a luer type connector inserted into the closure 10. The stopper 350 defines the end of a wider bore in which the connector can be inserted. Below the stopper 350 the bore is narrower just to provide the content extraction channel 13.

Figure 51A:
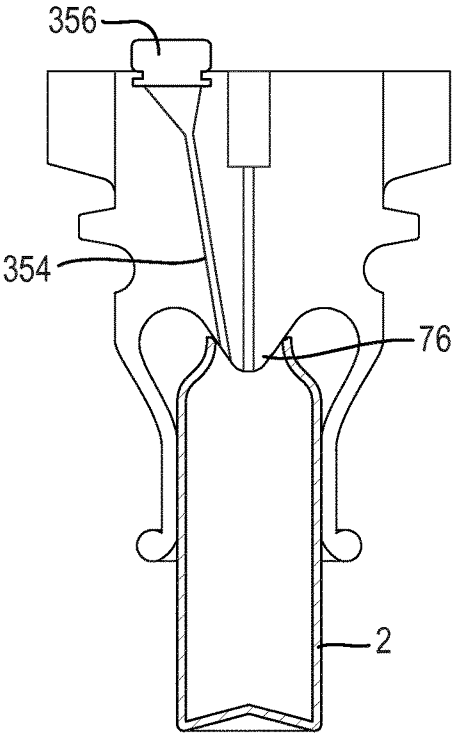
FIG. 51 shows air channels to compensate for pressure drop during extraction.
Figure 51B:
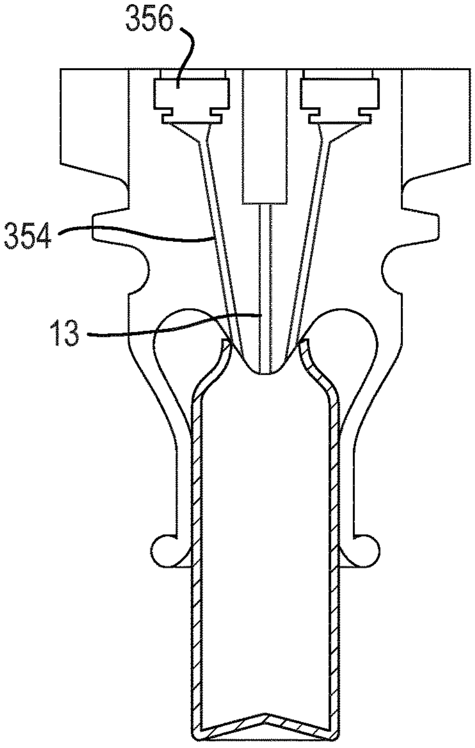
Figure 51B:
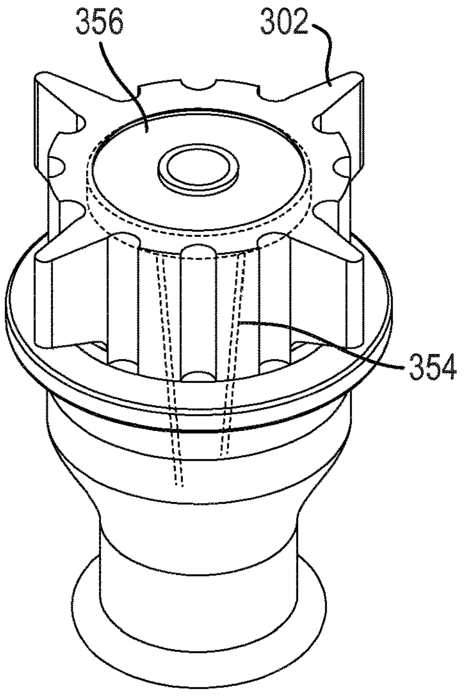

FIG. 51 shows air channels 354 that may be used in cases where the pressure drop within the ampoule body 2 may be inconvenient, e.g. too large to allow one-handed operation. The air channels 354 allow air to enter the inside of the ampoule to relieve the pressure difference. However, in order to maintain sterility of the inside of the ampoule, filters 356 are provided on each air channel 354 to prevent contaminants from entering the ampoule after sealing. As shown in FIG. 51(*a*), the air filter 356 could be provided just on the surface of the cap portion 12 as one or more filter elements 356 linked to the cone 76 by one or more inmoulded or postmoulding channels 354. FIG. 51(*b*) shows a variation in which the filter 356 is recessed into the upper surface of the cap portion 12 and is formed as a ring around the content extraction channel 13. Alternatively, the filter 356 could be attached to or recessed into a side of the cap portion. Recessing the filter 356 may help to protect it from damage or dirt from objects (e.g. fingers) contacting the outside of the cap portion.

Figure 52:
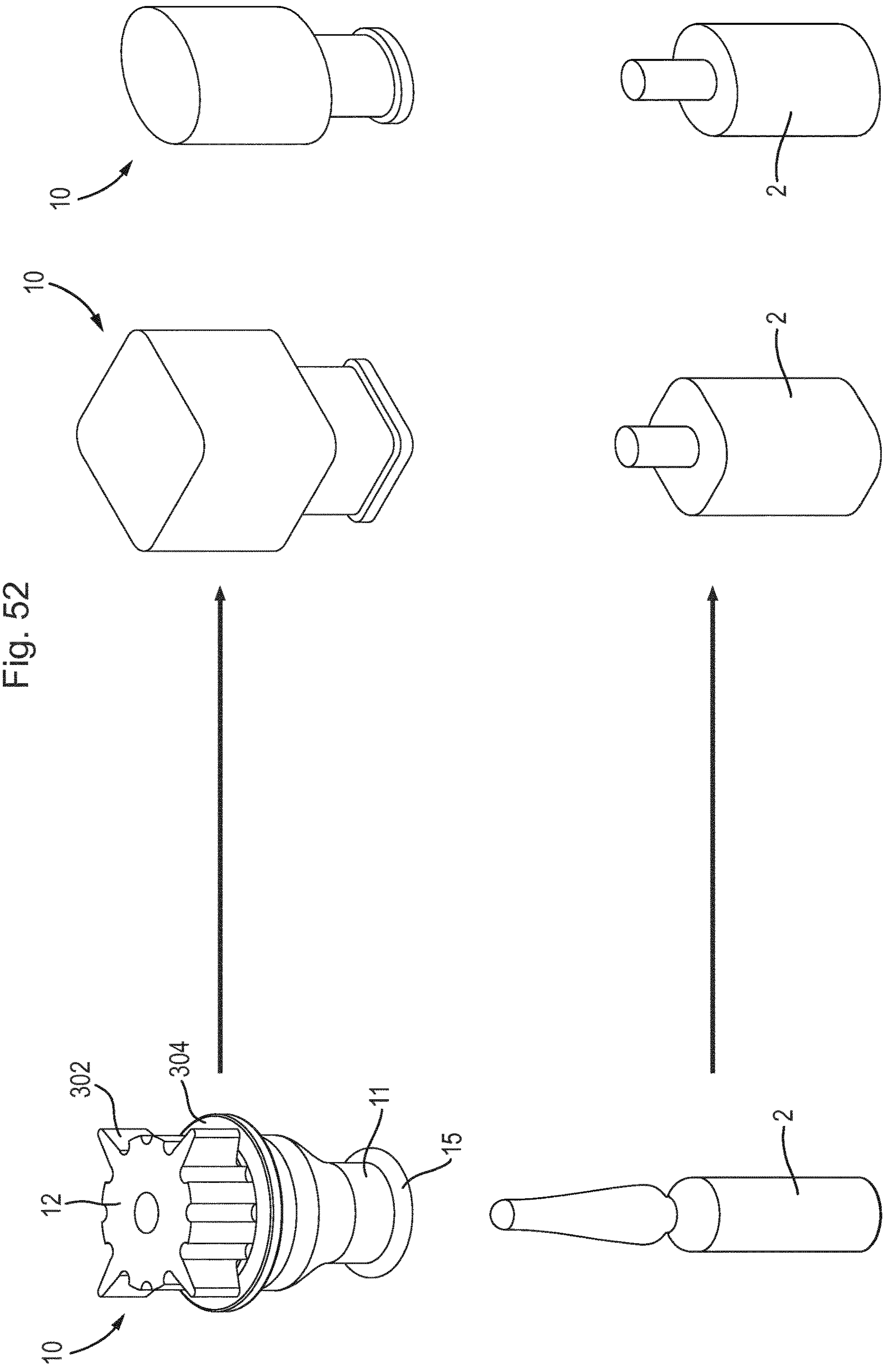
FIG. 52 shows different shapes of ampoule.

FIG. 52 illustrates different shapes of ampoule, e.g. with a square or oval horizontal cross-section and how different shaped closures 10 may be used with corresponding cross-sections.

Figure 53A:
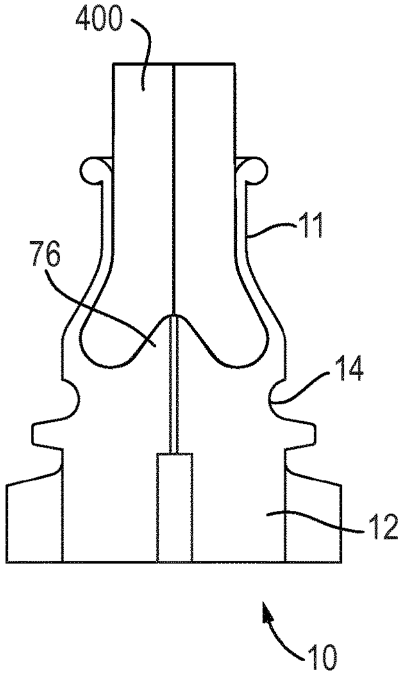
FIG. 53 illustrates a method and apparatus for rolling up a skirt portion.
Figure 53B:
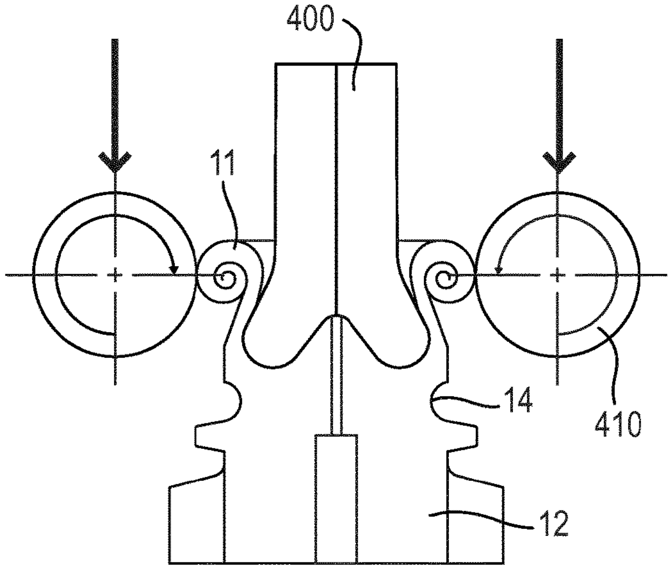
Figure 53C:
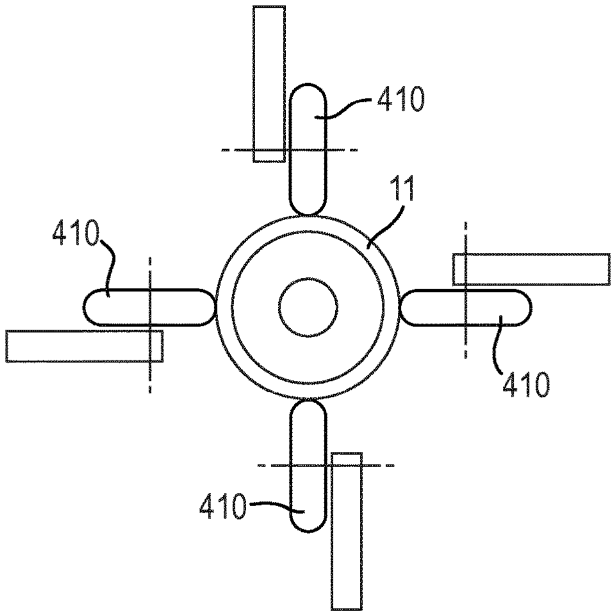
Figure 54A:
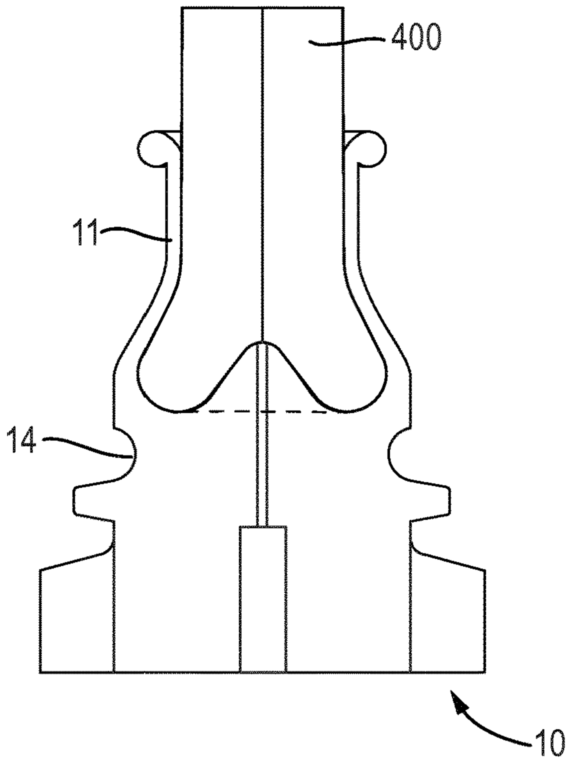
FIG. 54 illustrates a variation of the apparatus and method of FIG. 53.
Figure 54B:
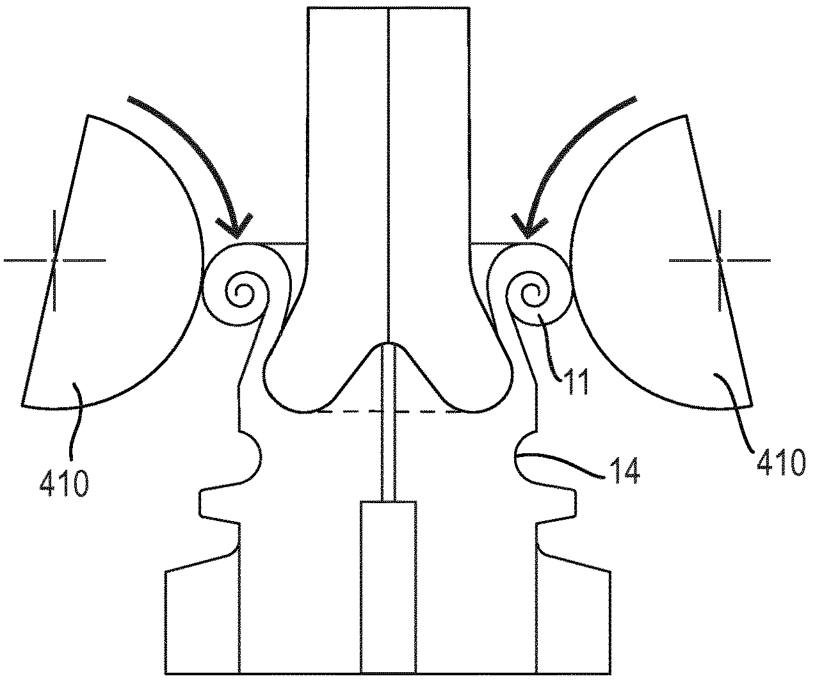

FIG. 53 illustrates a method of rolling up the skirt portion 11 after the closure 10 has initially been formed (e.g. moulded). The skirt portion 11 is moulded around a mould part 400 in the form of a long rod with a shaped end that forms the conic projection 76. The mould part 400 may be used to provide a surface against which a roller such as a wheel 410 can push and rotate to roll up the skirt portion 11 into the groove 14. Without the mould part 400 the wheel would not get enough purchase on the elastic skirt portion to grip it and roll it up. FIG. 53(*a*) shows the mould part 400 inside the skirt portion 11 immediately after moulding. FIG. 53(*b*) shows the wheels 410 in the process of rolling up the skirt portion 11. FIG. 53(*c*) shows an end view in an example in which four wheels 410 are provided, equally spaced around the skirt portion 11. FIG. 54 shows a variation in which instead of full wheels, only partial wheels 410 (semi-circles or half-moons) are used.

Figure 55A:
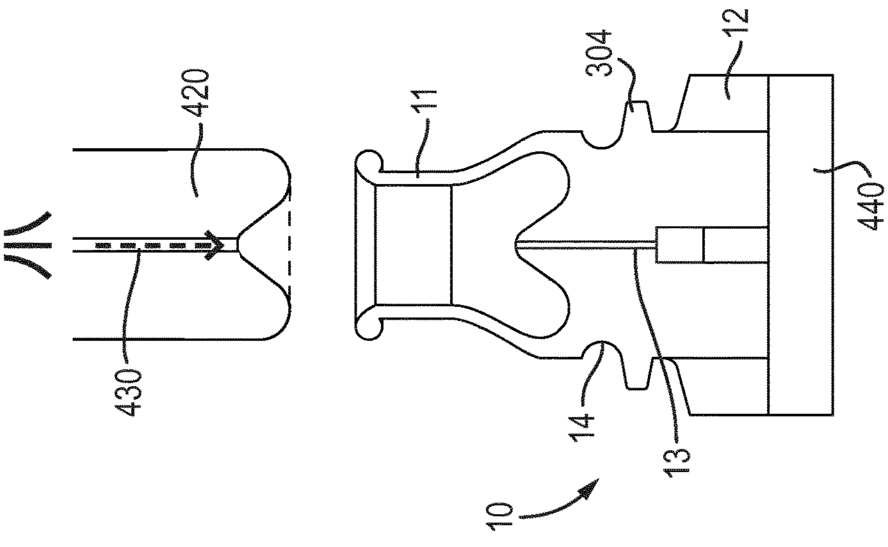
FIG. 55 illustrates an alternative method and apparatus for rolling up a skirt portion.
Figure 55B:
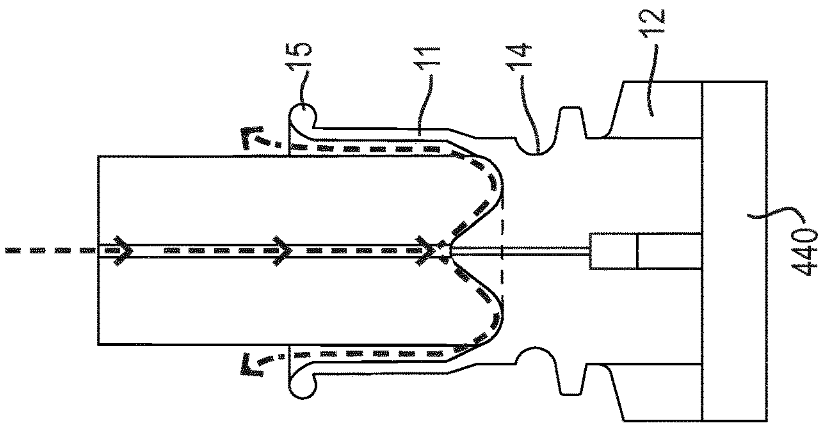
Figure 55C:
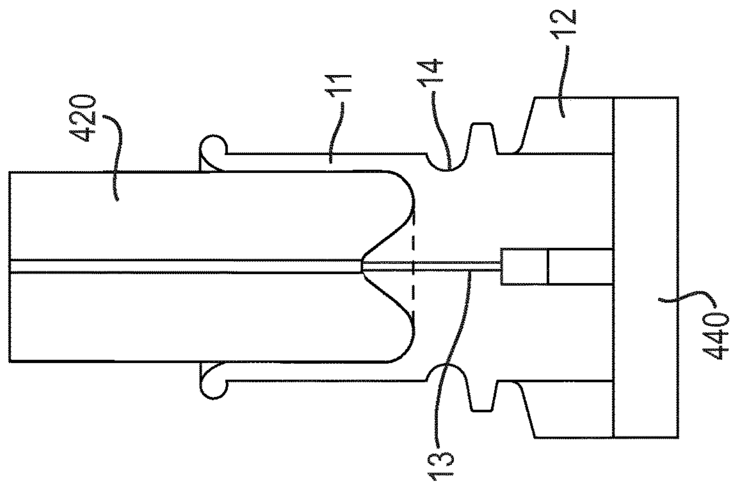

FIG. 55 shows an alternative method for rolling up the skirt portion 11 if the mould part 400 needs to be removed. To provide a surface against which the wheels or half-moons 410 of FIG. 53 or 54 can press, a mounting rod 420 is inserted into the skirt 11. To allow the rod to be pushed inside the skirt portion 11, air is channeled through a bore 430 in the middle of mounting rod 420 towards the closure 10 (as indicated by the dashed arrow). The content transfer channel 13 of the closure 10 is blocked by a lid or other stopper 440 so that the air from the mounting rod 420 is forced to escape between the sides of the rod 420 and the inside of the skirt portion 11, thus expanding the skirt portion 11 and allowing the mounting rod 420 to be inserted inside the skirt portion 11. The rolling up process may then proceed as described above in relation to FIGS. 53 and 54.

Figure 56A:
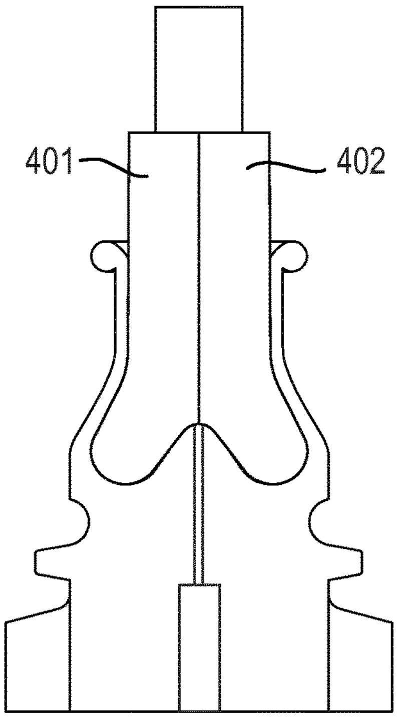
FIG. 56 illustrates another method and apparatus for rolling up a skirt portion.
Figure 56B:
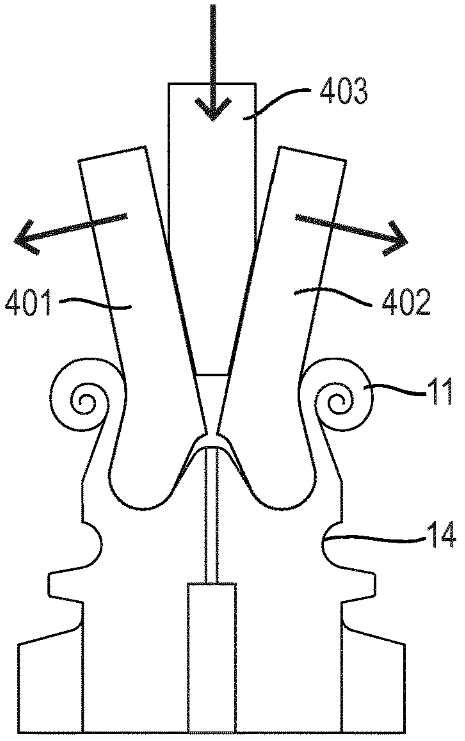

FIG. 56 shows an alternative method for rolling up without the need for wheels. The mould part 400 is divided into a first mould piece 401 and a second mould piece 402 forming two halves of the mould part 400 divided along the axis of the closure 10. As the two mould pieces 401, 402 are splayed apart as shown in FIG. 57(*b*) the skirt portion 11 is stretched more at its distal end, causing it to be biased towards the cap portion 12 in order to lose the stretch and causing it to roll up in the process. The two mould pieces 401 and 402 may be separated and splayed by driving a wedge 403 between them. As the wedge 403 is pressed further between the mould pieces 401, 402 it causes them to splay further apart and push the rolling skirt further towards the cap portion 12 and groove 14.

The invention claimed is:

1. A closure for an ampoule, the closure comprising:

a cap portion arranged to engage with a broken neck of an opened ampoule; and a skirt portion extending from the cap portion, the skirt portion being arranged to grip sides of an ampoule;

wherein a surface of the cap portion that is arranged to engage the broken neck comprises a convex shape projection arranged to project inside an open neck of the ampoule; and wherein the cap portion is formed from a deformable material so as to deform and seal against the broken neck.

2. A closure as claimed in claim 1, further comprising one or more air canals connecting a region inside the skirt portion to an outside of the closure.

3. A closure as claimed in claim 2, wherein the one or more air canals connect the outside of the closure to a point inside the closure radially outward from the convex shape projection.

* * * * *